US008591330B2

(12) United States Patent
Kelly et al.

(10) Patent No.: US 8,591,330 B2
(45) Date of Patent: Nov. 26, 2013

(54) GAMING MACHINE WITH MECHANICAL REELS HAVING FLEXIBLE DISPLAYS

(75) Inventors: Bryan M. Kelly, Alamo, CA (US); Stephen E. Patton, Reno, NV (US); Joseph Lerner, Reno, NV (US); Martin S. Lyons, Henderson, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

(21) Appl. No.: 13/194,765

(22) Filed: Jul. 29, 2011

(65) Prior Publication Data

US 2013/0029748 A1 Jan. 31, 2013

(51) Int. Cl.
*A63F 13/08* (2006.01)

(52) U.S. Cl.
USPC .......... 463/31; 463/30

(58) Field of Classification Search
USPC .......... 463/30–31
See application file for complete search history.

(56) References Cited

U.S. PATENT DOCUMENTS 6,027,115 A * 2/2000 Griswold et al. .......... 273/143 R
7,108,605 B2 * 9/2006 LeMay et al. .......... 463/43
7,452,272 B2 * 11/2008 Walker et al. .......... 463/20
7,771,274 B2 * 8/2010 Walker et al. .......... 463/25
7,862,423 B2 * 1/2011 Walker et al. .......... 463/20
7,972,212 B2 * 7/2011 Iverson et al. .......... 463/37
8,057,305 B2 * 11/2011 Iverson et al. .......... 463/37
2003/0211878 A1 * 11/2003 Walker et al. .......... 463/13
2004/0204228 A1 * 10/2004 Walker et al. .......... 463/20
2006/0223630 A1 * 10/2006 Walker et al. .......... 463/25
2006/0223631 A1 * 10/2006 Walker et al. .......... 463/25
2006/0223632 A1 * 10/2006 Walker et al. .......... 463/25
2007/0054730 A1 * 3/2007 Mattice et al. .......... 463/16
2008/0020827 A1 * 1/2008 Underdahl et al. .......... 463/25
2008/0200233 A1 * 8/2008 Aida .......... 463/20
2009/0082090 A1 * 3/2009 Walker et al. .......... 463/20
2009/0104969 A1 * 4/2009 Paulsen et al. .......... 463/20
2009/0305767 A1 * 12/2009 Rasmussen .......... 463/20

* cited by examiner

*Primary Examiner* — Arthur O. Hall
*Assistant Examiner* — Bach Hoang
(74) *Attorney, Agent, or Firm* — Brooke Quist; Marvin Hein

(57) ABSTRACT

Various embodiments are directed to converting a conventional video-based gaming machine into a mechanical reel gaming machine with physically-spinning stepper reels having video displays affixed thereto. The repurposed gaming machine does not need any further approval by a government regulator because the existing video game software is not changed. In other embodiments, a mechanical reel-based gaming machine is upgraded to provide physically-spinning stepper reels having video displays affixed thereto.

17 Claims, 36 Drawing Sheets

FIG. 2
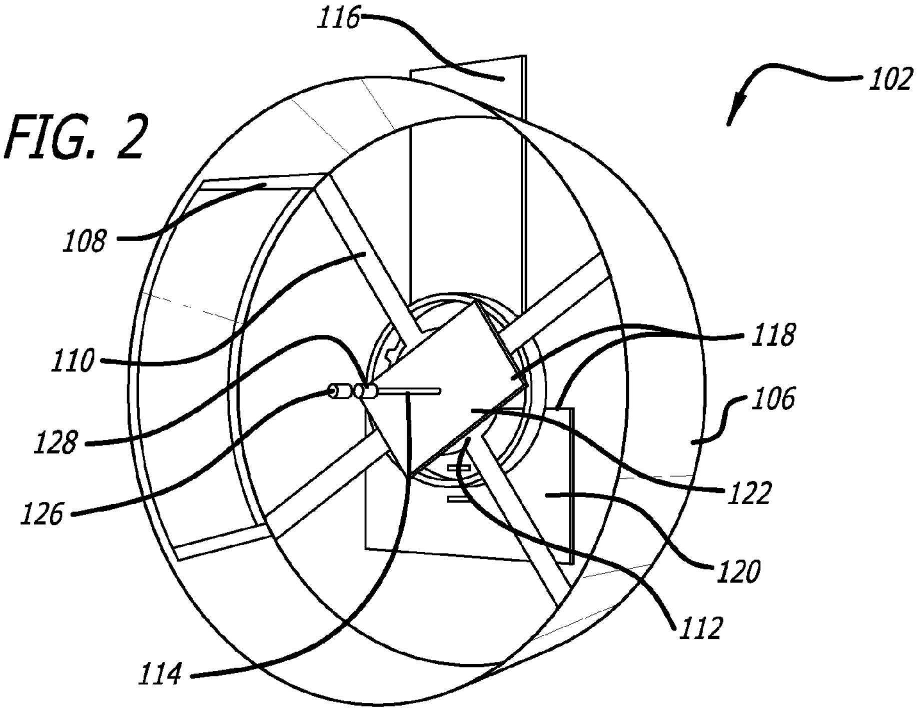
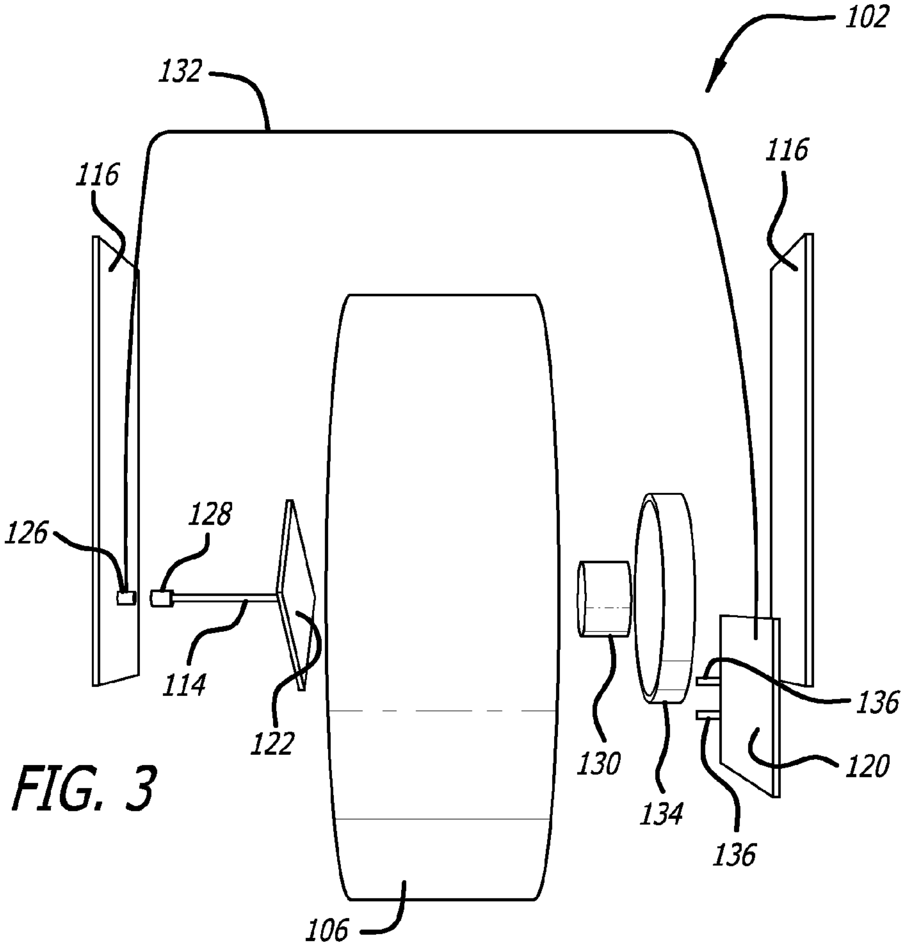
FIG. 3

FIG. 23
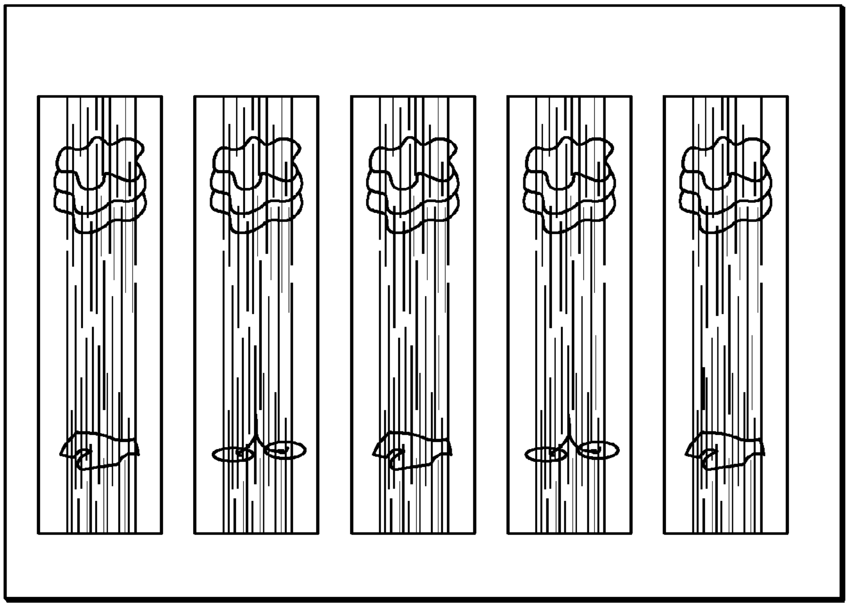
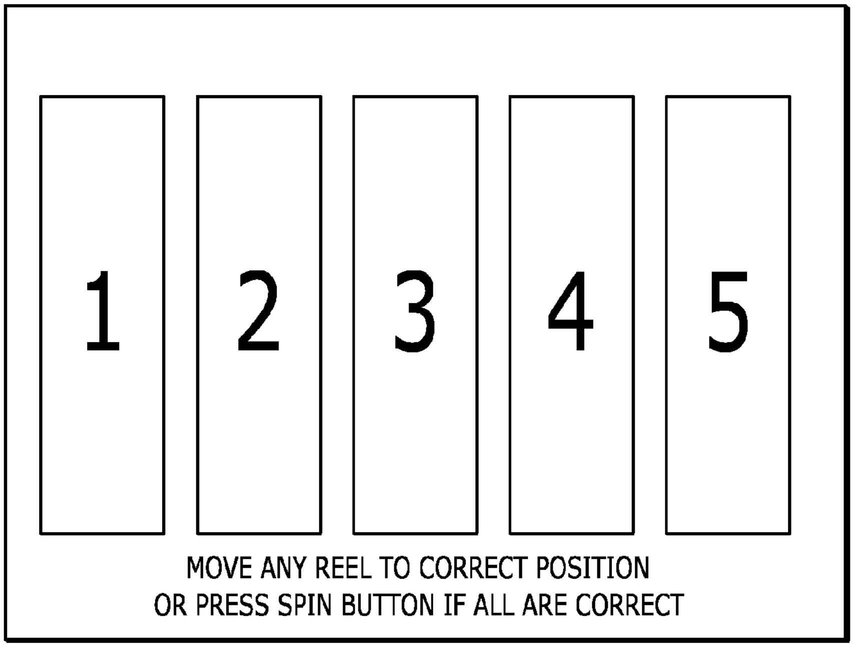
FIG. 24

FIG. 28A
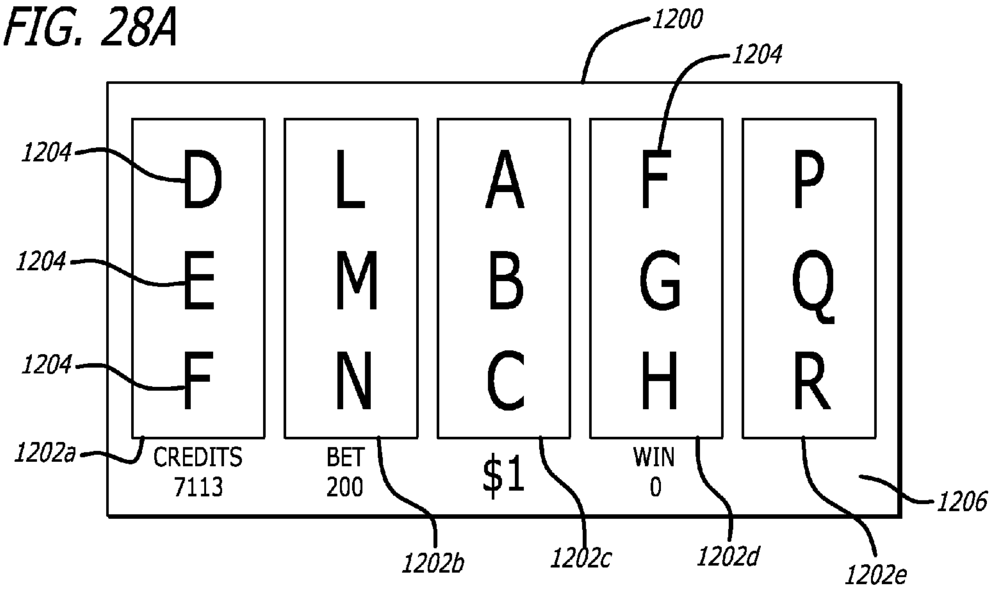
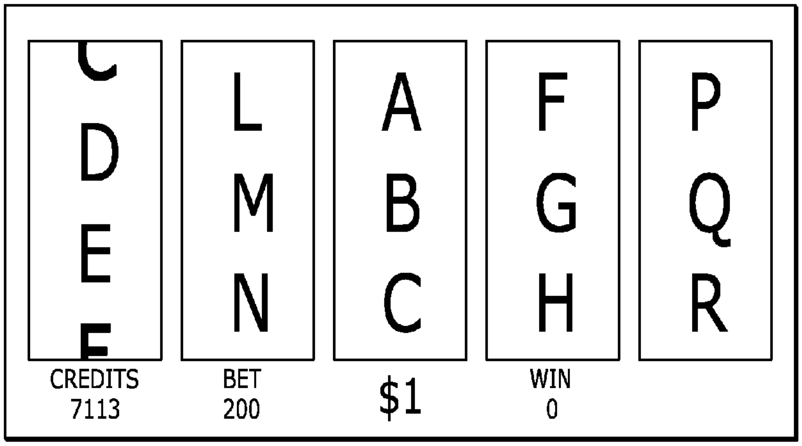
FIG. 28B

GAMING MACHINE WITH MECHANICAL REELS HAVING FLEXIBLE DISPLAYS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Over the years, gaming machines have grown in both sophistication and gaming features to maintain player interest. Gaming machines have gone from relatively simple devices providing a player with an opportunity to win cash awards to sophisticated, multi-media devices. Even more, the games presented on the gaming machines have become increasing intricate. For example, slot-style games include may include five or more reels with twenty or more paylines. Furthermore, games may include one or more bonus games or different game modes that allow a player to participate in a community game or a tournament. While current gaming machines are successful, there is a continuing need for slot machines variants that provide a player with enhanced excitement without deviating from the traditional slots game.

SUMMARY

Briefly, and in general terms, various embodiments are directed to changing gaming machine hardware while maintaining the software component of the gaming machine. In one embodiment, a video-based slots gaming machine is reconfigured into a gaming machine having physical, spinning stepper reels with a flexible display affixed to the each reel. In another embodiment, a conventional mechanical reel-based gaming machine is reconfigured into a gaming machine in which conventional reel strips are upgraded to flexible displays affixed to the periphery of the reels.

For example, one embodiment of a gaming machine includes a plurality of mechanical reels each operatively coupled to a stepper motor. Each mechanical reel further includes a flexible video display affixed to an outer circumference of the mechanical reel. The gaming machine also has a main central processing unit for executing instructions for a native mechanical reel game, and a multiplexer engine that is in communication with the main central processing unit. The multiplexer engine intercepts and converts the native signals into video images for presentation on the flexible displays on the plurality of mechanical reels. The gaming machine also includes a display control system in communication with the flexible video display. The control board system has a central processing unit for decoding and transmitting processed video-based reel game data for display on the flexible video display.

In addition to gaming machines and mechanical reel structures, various methods for presenting an upgraded stepper reel games are disclosed herein. According to one method, an upgraded mechanical reel game is presented on a gaming machine, and the method includes sending a native signal for spinning a plurality of mechanical reels in response to player input initiating game play. Further, the method includes intercepting the native signal and converting the native signal into a video signal, and spinning the mechanical reels while presenting the video signal on the flexible video displays of the spinning mechanical reels.

Other features and advantages will become apparent from the following detailed description, taken in conjunction with the accompanying drawings, which illustrate by way of example, the features of the various embodiments.

Other features and advantages will become apparent from the following detailed description, taken in conjunction with the accompanying drawings, which illustrate by way of example, the features of the various embodiments.

BRIEF DESCRIPTION OF THE DRAWING

FIG. 2 is a perspective view of one embodiment of a reconfigurable reel.

FIG. 3 is an exploded view of reconfigurable reel shown in FIG. 2.

FIG. 23 is a screen shot of showing a composite image of the number, coordinates, and extents of the video images of the reels captured in FIG. 20.

FIG. 24 is a screen shot of an interface allowing an operator to adjust the location of the captured reels of FIG. 23.

FIGS. 28A-28C illustrate screen shots of a convention video slots game.

DETAILED DESCRIPTION

Figure 1:
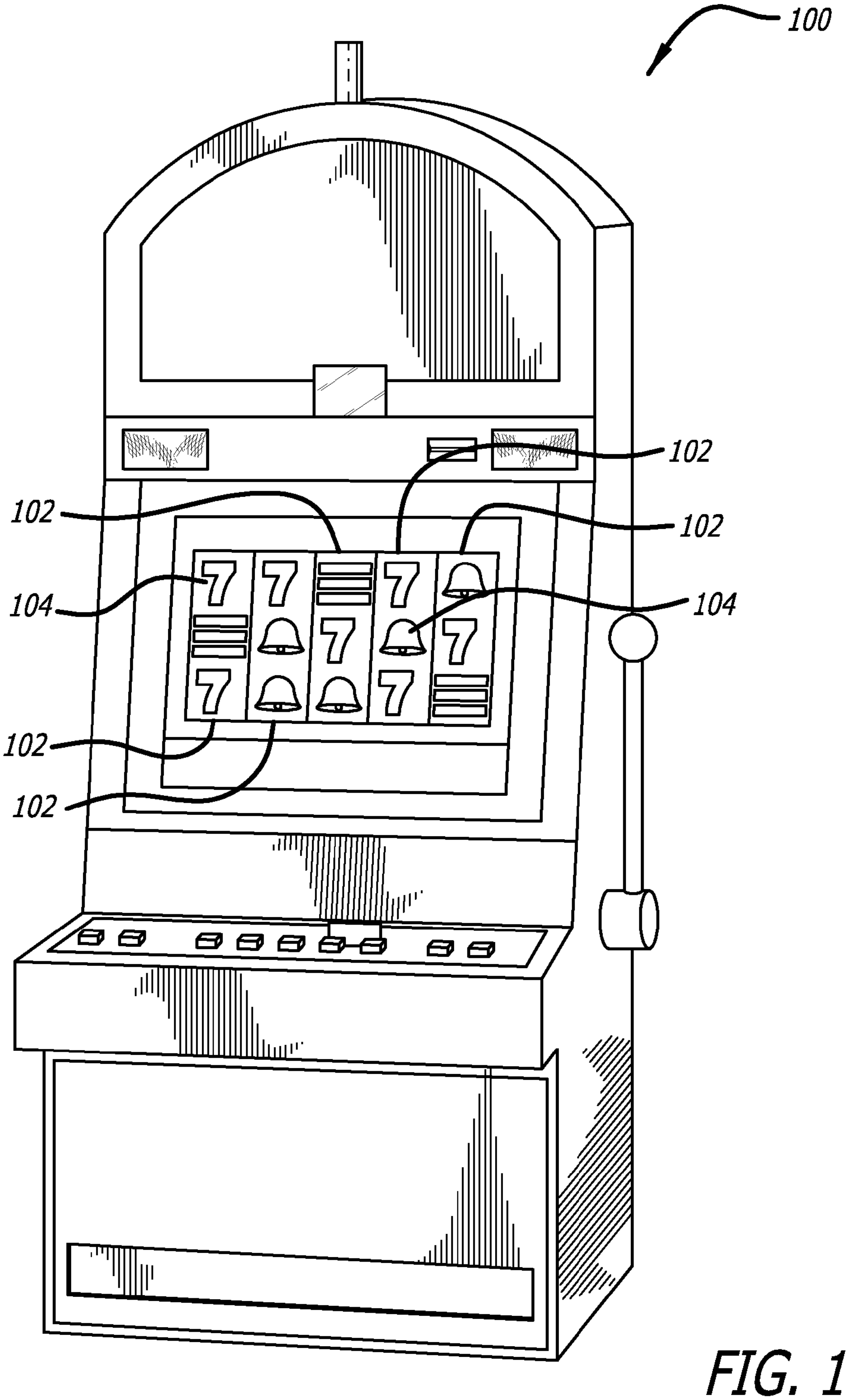
FIG. 1 is a perspective view of one embodiment of a gaming machine having reconfigurable reels.

Various embodiments and methods are directed to repurposing a conventional reel-based gaming machine presenting a slots-style game. In one embodiment, a video-based slots gaming machine is reconfigured into a gaming machine having physical, spinning stepper reels having a flexible display affixed to the each reel. In another embodiment, a conventional mechanical reel-based gaming machine is reconfigured into a gaming machine in which conventional reel strips are upgraded to flexible displays affixed to the periphery of the reels. While the hardware for the gaming machine has been altered, the underlying software running the video game has not been changed. Consequently, the gaming machine may be upgraded and used without further regulatory approval.

Referring now to the drawings, wherein like reference numerals denote like or corresponding parts throughout the drawings and, more particularly to FIGS. 1-39B, there are shown various embodiments of a gaming machine having been converted into a gaming machine having physical, spinning stepper reels with flexible displays affixed to the reels.

More specifically, FIG. 1 is a gaming machine 100 having five reels 102. Each reel 102 has a plurality of symbols 104 appearing on the circumference of the reel. As shown in FIG. 1, three symbols 104 are visible to the player. In other embodiments, the gaming machine (not shown) may have at least three reels and may have one, two, three or more symbols visible to the player.

FIG. 2 illustrates a perspective view of one embodiment of a reel 102 having a single flexible display 106 applied to the periphery of the reel. The flexible display 106 is coupled to a frame 108 of the reel 102. The reel 102 also includes a plurality of spokes 110 for supporting the frame 108. The spokes 110 of the reel 102 are coupled to a reel hub 112. The reel 102 spins about an axle 114, which in turn is attached to a mounting plate 116. The mounting plate 116 is fixed within the gaming cabinet (not shown). The flexible display 106 may be organic light emitting diode (OLED) display or an electronic paper (e-paper) display.

In another embodiment, a reel (not shown) has a plurality of flexible displays applied to the periphery of the reel. The flexible displays are mounted end to end so the flexible displays wrap completely around the physical reel. In one embodiment, there are flexible displays for each symbol position on the reel. In another embodiment, a reel has a plurality of flexible displays layered on top of each other. The layering of the plurality of displays generates a three-dimensional effect to the symbols displayed on the displays. In this embodiment, the displays may be transmissive (i.e., opaque in a first state and transparent in a second state).

As shown in FIG. 2, control circuitry 118 to drive the display 106 is separated into a fixed portion 120 and a rotating portion 122. In one embodiment, the rotating portion 122 is fixed to the spokes 110 of the reels. In other embodiments, the rotating portion 122 of the control circuitry 118 may be coupled to the hub, spoke, reels or any other portion of the reel. In FIG. 2, the rotating portion 122 of the control circuitry 118 is fixed to the inside of the reel 102 and rotates with the reel. The rotating portion 122 of the control circuitry 118 drives the flexible display and also includes an MPEG decoder or video and audio compression methods. Additionally, a network interface, such as an Ethernet interface, may be associated with the control circuitry allowing for wired or wireless communication of data to the control circuitry.

Power for the rotating portion 122 of the control circuitry 118 and the display 106 is transferred across a slip ring from the fixed control board 120. In another embodiment, a commutator transfers power to the control circuitry 118 and display 106. Alternatively, power may be supplied to the rotating portion 122 of the control circuitry 118 and the display 106 through inductance methods know or developed in the art.

As shown in FIGS. 2-3, an infra-red (IR) transmitter 126 and receiver 128, such as but not limited to the Agilent Technologies Models HSDL-3020/3021, is used to transfer control signals to the rotating control board 122 and the flexible display 106. Alternatively, a transmitter receiver using wireless transmission technology such as, but not limited to, ultra wideband is used to transfer control signals to the rotating control board 122 and the flexible display 106. Optionally, the slip ring 130 also transfers control signals for the operation of the flexible display 106. In one embodiment, a mercury-based electronic slip ring, such as the Mercotac (Model 830), is used to transmit control signals. Alternatively, conventional slip rings in combination with an electrical filter may be used to transfer control signals to the flexible display.

As shown in FIG. 3, the IR transmitter 126 is coupled to the mounting plate 116 that is adjacent to the reel 102, and the IR receiver 128 is coupled to the end of the shaft of the reel axle 114. Alternatively, the locations of the IR transmitter 126 and receiver 128 may be swapped. As shown in FIG. 3, an IR transmitter data cable 132 is used to couple the IR transmitter 126 and the stepper control board 120. This configuration reduces the need for extra physical components and ensures that the upgraded physical reel can fit in a conventional arrangement.

As shown in FIGS. 2-3, the reel 102 includes a stepper optical wheel 134 and sensors 136 that are used to locate the designated "top" of the OLED display. The optical wheel 134 is coupled to the reel 102, and the sensors 136 are coupled to the control board 120 or alternatively, the mounting plate 116. Each reel is also associated with a stepper motor 130 that causes the reel to move a fixed angle of rotation for a fixed time duration.

Figure 4:
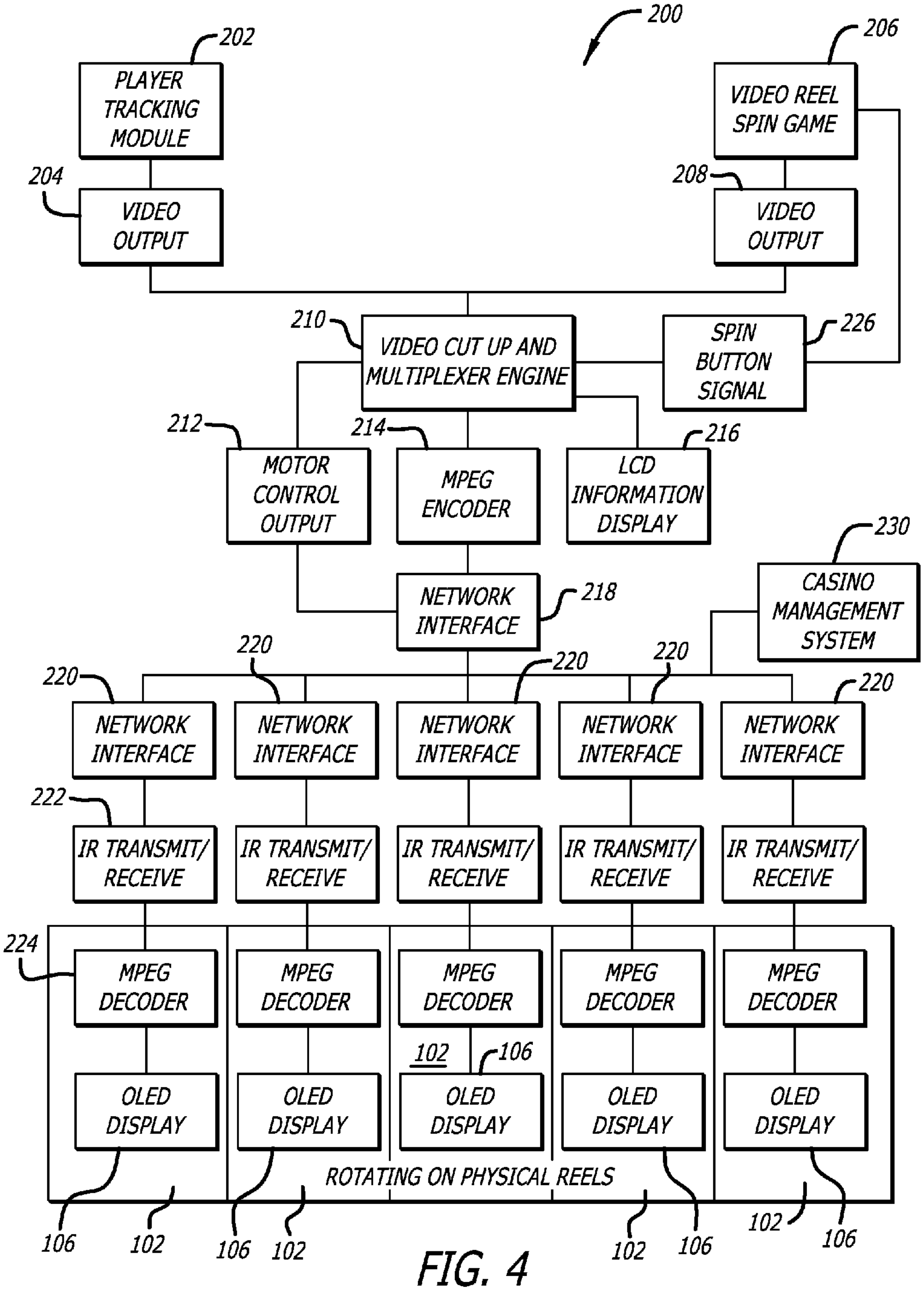
FIG. 4 is a block diagram showing the various components of a reconfigurable reel system.

FIG. 4 is a block diagram showing the various components of a reconfigurable reel system 200. In this embodiment, the video output 204 from a player tracking module 202 and the video output 208 from a video reel spin game 206 are sent to a video cut up and multiplexer engine 210. These video outputs may be analog or digital. In those embodiments in which the video output is analog, the video cut up and multiplexer engine 210 may include a digitizing module (not shown) to convert the analog signal into a digital signal.

The video cut up and multiplexer engine 210 is able to process video outputs 204, 208 for presentation on the reconfigurable displays 106. The video cut up and multiplexer engine 210 receives the video output 208 from the original video reel spin game and divides the video into individual spinning reel portions for display on the displays of the separate physical reels. By way of example and not of limitation, if the original video reel spin game is a three-reel game, the engine 210 divides the original image into three separate video streams and each video stream is presented on a flexible display 106.

Figure 5:
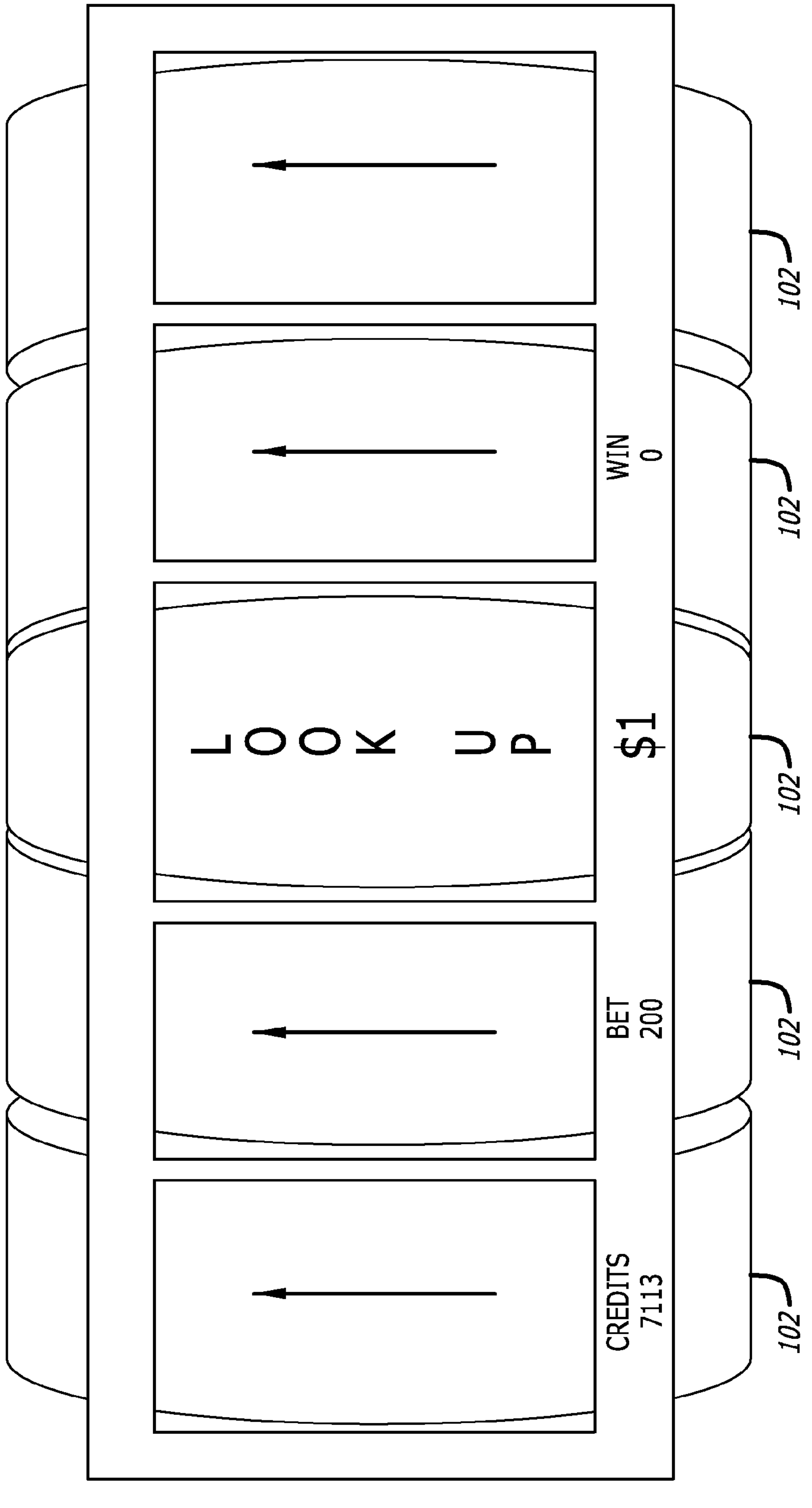
FIG. 5 illustrates one embodiment of external content being displayed on a plurality of reconfigurable reels.

Additionally, the video cut up and multiplexer engine 210 also receives video output from the player tracking system 202. As shown in FIGS. 4 and 5, the video content can be reformatted and presented on the flexible displays 106. The flexible displays may present multiplier values and award values. In one embodiment, a bonus prize is the product of the multiplier value and the award value. In other embodiments, promotional game and bonus awards that are presented on the player tracking system may be presented on one or more flexible displays. Also, the player's loyalty account status may be presented on the flexible displays. For example, a meter showing the player's point status and the point goal to the next level may be shown on the displays 106.

Referring back to FIG. 4, the video cut up and multiplexer engine 210 is also communication with a motor control unit 212 that is used to control the stepper motors for each reel. The video cut up and multiplexer engine 210 also is in communication with a MPEG encoder 214 to convert the video streams into the proper format for presentation on the flexible displays 106. In an alternate embodiment, the reconfigurable reel system does not include the MPEG encoder because the video streams are in a format directly playable on the flexible displays 106. As shown in FIG. 4, the video cut up and multiplexer engine 210 outputs data to the LCD information display 216. The output sent to the LCD information display 216 includes all the game-associated information that does not include the video reels. The game associated information includes, but is not limited to, player's credits, wager denomination, credits won, credits wagered, wagers per payline, or active paylines.

As shown in FIG. 4, the system 200 includes a first network interface 218 in communication with the MPEG encoder 214 and the motor controller unit 212. The first network interface 218 communicates video image data to the network interfaces that are associated with each reel. As shown in FIG. 4, each reel 106 has its own network interface 220. In other embodiments, two or more reels may share a network interface. In those embodiments, the network interface may include a multiplexer to send the appropriate video signal to each reel.

As shown in FIG. 4, each physically-rotatable reel includes a flexible display 106. The images provided on the flexible displays are provided by a MPEG decoder 224. The MPEG decoder 224 is associated with the rotatable control circuitry 120. As shown in FIG. 4, an IR transmitter and receiver 222 are in communication with the MPEG decoder 224. Additionally, each video stepper reel is associated with a network interface 220. Each reel is also given an IP address. The network interface may pass data to the MPEG decoder over a wired or wireless Ethernet network. FIG. 4 also depicts a casino management system 230 in communication with the flexible displays 106 via the network interface 220 and may even provide the content to be presented on the flexible displays.

In one embodiment, standard MPEG, MPEG2 or MPEG4 encoders and decoders (such as the DaVinci TMS320DM355) are modified to only generate I and P frames and eliminate the use of bidirectional encoding (i.e., B frames which are generally used to increase the perceived visual quality for a given bitrate). Bi-directional encoding is not used because it typically introduces a delay of anywhere up to 15 frames (which could be as much as half a second) in video passing through the encoder/decoder. That is, when using B-frames, each group of pictures (GOP) is encoded and decoded out of order—frame 15 of a GOP may be decoded before it is possible to decode frame 1. A potential delay of half a second would be unacceptable to a player of a slot machine because the delay would be introduced at the point when the player presses the "spin" button and before the video images are presented on the video display to the player. The delay may create apprehension in the player that the game is not properly operating properly.

The Video Cut Up and Multiplexer engine 210 takes the output from a video reel spin game 206 and cuts out the spinning reel portions for display on the separate physical reels. The Video Cut Up and Multiplexer engine 210 also receives a spin button signal 226 along with the video reel spin game, which allows the multiplexer engine to stay in sync with the video output from the video reel spin game. As a spin button is pressed, the multiplexer 210 is immediately able to change state to anticipate the movement of video reels.

In FIG. 4, the network interfaces 220 for the reconfigurable reels 102 are in communication with a casino management system 230. The casino management system 230 allows the individual reels 102 to be remotely controlled provided that the external system is an authorized system. Accordingly, an authentication system (not shown) confirms that an associated casino management system 230 is an authorized system. In one embodiment, the casino management system 230 generates a certificate that is compared to a certificate stored in the memory of the video stepper reel 102. The generated certificate must exactly match or be signed by the certificate stored in the video stepper reel memory. The authentication system prevents any rogue system from displaying illegal content to the player.

If an external system such as the central management system 230 wishes to take control of one or more video stepper reels 102, the external system needs to further perform a negotiation process with the associated multiplexer 210 so that only one video content is shown at one time. Alternatively, a priority system within the video stepper reel software that prioritizes video content from the multiplexer or an external system so that video content from one source is presented at one time.

FIG. 5 illustrates one example of content being displayed on the reels from an external system. All the components in the system are networked together. As shown in FIG. 5, traditional reel symbols have been replaced with upwardly pointing arrows and a message for the player to look up. In one embodiment, for example, the player is directed to view overhead signage or another monitor to view a community game display that presents a game that is played amongst a subscribed active player that has been initiated. The external system may send the notification message of FIG. 5 to the network interfaces of the reels to direct the player's attention to overhead signage or another display (on the same or a different gaming machine). In order to ensure that players are aware of the community game, the system sends content to at least one reel on all of the gaming machines connected to the community game. This content, as shown as in FIG. 5, displays a message to the players to look up towards the community signage.

Figure 6:
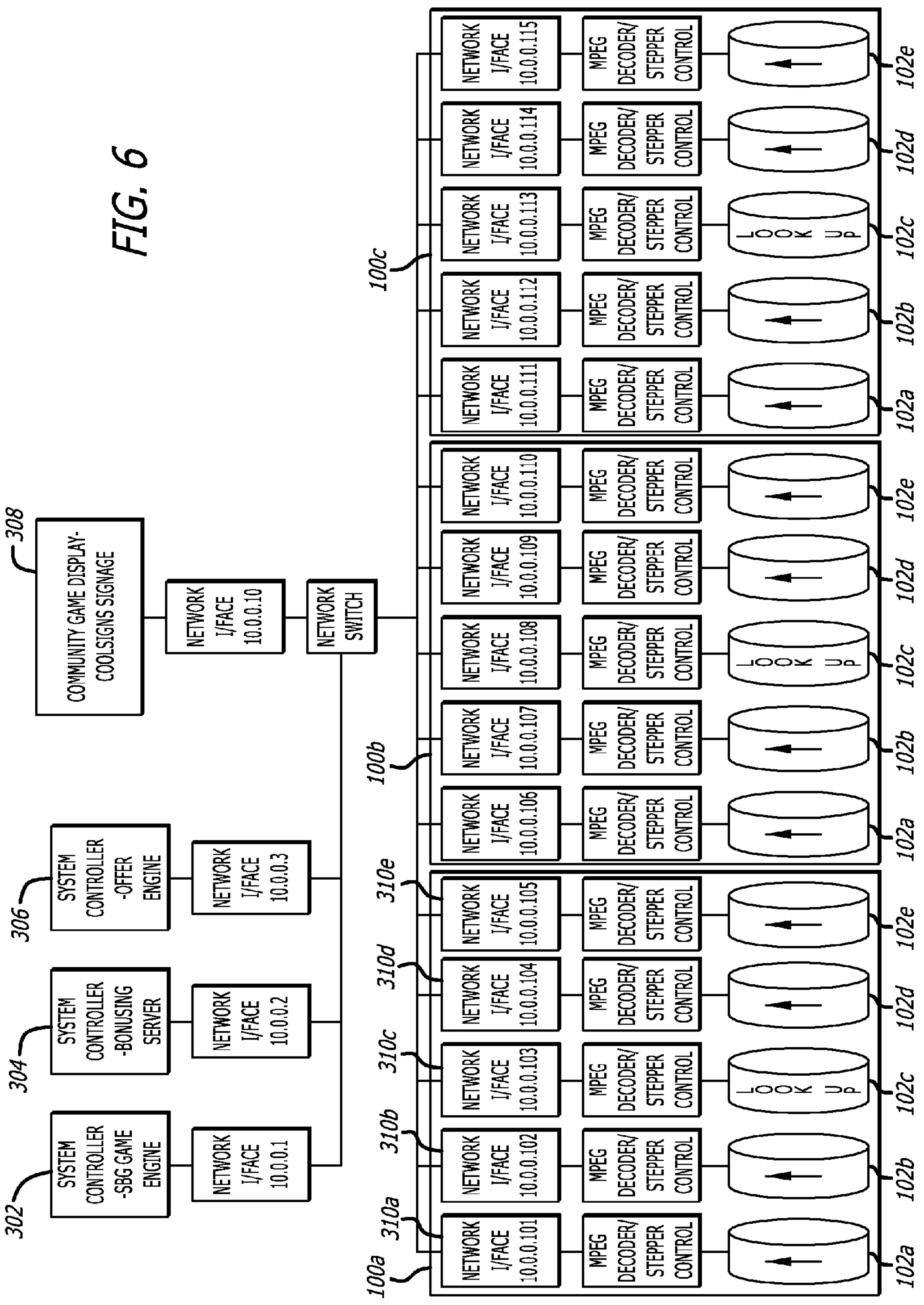
FIG. 6 is a block diagram of a gaming system having a plurality of gaming machines having reconfigurable reels.

FIG. 6 illustrates another example of external content and external control of the each reconfigurable reel. In FIG. 6, each gaming machine 100*a-c* have five reconfigurable reels 102*a-e*. Each of the reels 102*a-e* is individually connected to one or more system controllers. Each reel 102*a-e* has a network interface 310*a-e* and is assigned an associated IP address. Each reel 102*a-e* is addressed by a system controller directly, for the purpose of sending MPEG encoded video and/or controlling the rotation of the associated stepper wheel. Additionally, as shown in FIG. 6, each reel can also be addressed by any of the three system controllers: a server-based gaming (SBG) game engine for controlling the reels for SBG games 302; a bonusing server for controlling reels for providing progressive jackpots 304; and an offer engine 306 for displaying targeted offers on the reel displays based on the player's status.

Figure 7:
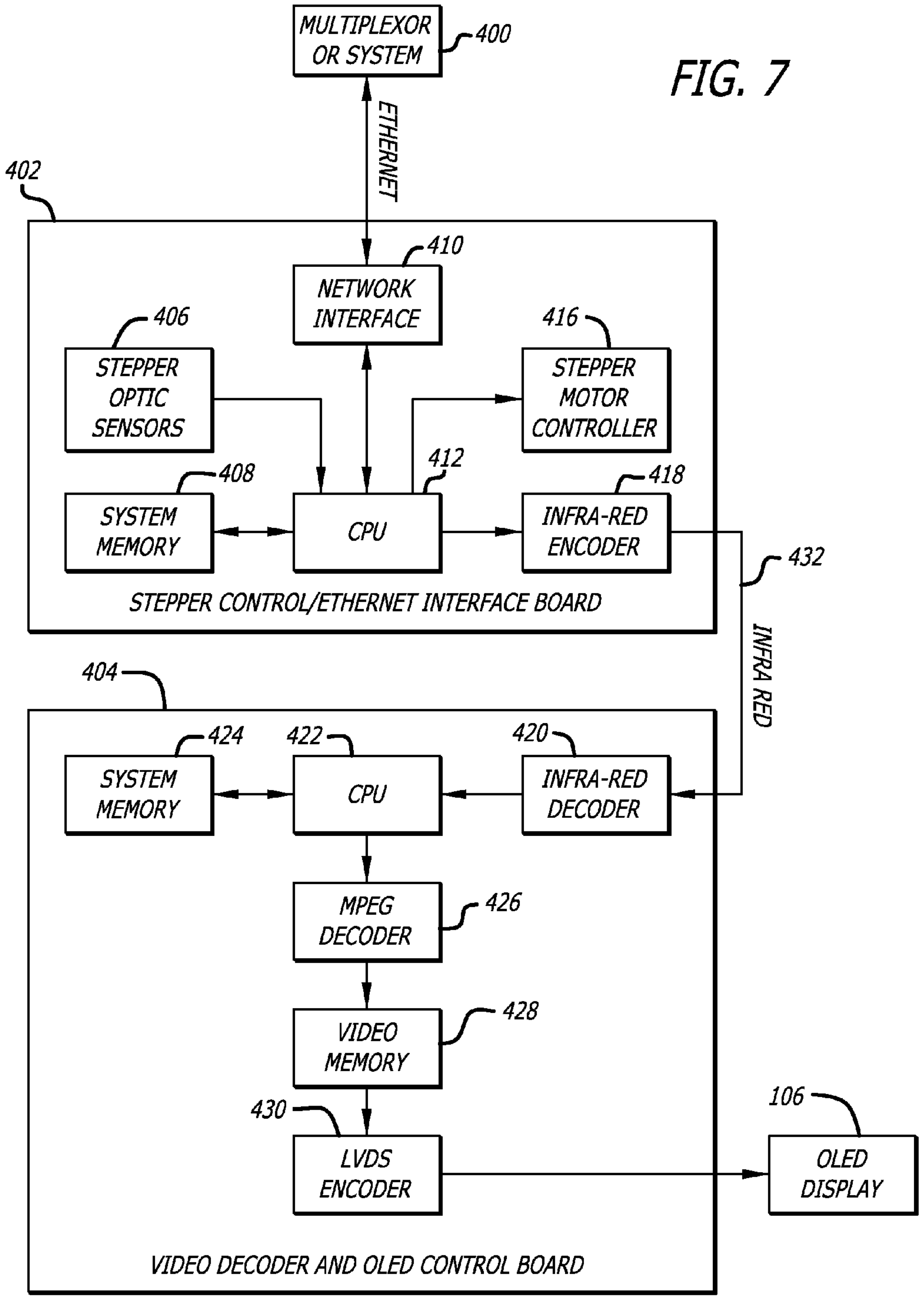
FIG. 7 illustrates data flow for one embodiment of a gaming machine having video stepper reels.

FIG. 7 illustrates the data flow for a video stepper reel. The arrows in this diagram indicate the direction of data movement. As shown in FIG. 7, a controlling device 400 is in communication with the stepper control/Ethernet interface board 402 via an Ethernet connection to the network interface. The controlling device 400 may be the local video engine or, alternatively, an external system controller. The controlling device 400 sends data to the stepper control/Ethernet interface board 402 to control both the video on the video stepper reel and the position of the stepper via the stepper motor controller. The stepper control/Ethernet interface board 402 is able to send data to the controllers 400 regarding the state of the stepper optical sensors 406 (i.e., positioning of the reel). Also, as shown in FIG. 7, the CPU 412 of the stepper control/Ethernet interface board 402 receives information from the stepper optical sensors 406, sends and receives data from the system memory 408, sends data to the stepper motor controller 416, and sends information to the infra-red encoder 418.

Data is transmitted via the infra-red link 432 from the encoder 418 on the stepper control/Ethernet interface board 402 to the infra-red decoder 420 on the video decoder and display control board 404. As shown in FIG. 7, the CPU 422 on the display control board 404 sends and receives data from the system memory 424, and receives data from the infra-red decoder 420, and sends data to the MPEG decoder 426. The data received from the infra-red decoder 420 may be processed by the CPU 422, and the processed data is then sent to the MPEG decoder 426. The data is sent to and may be stored in the video memory 428. The data is then sent to a low-voltage differential signalling (LVDS) encoder 430, which in turn, sends the data to the flexible display 106 for presentation.

Figure 8:
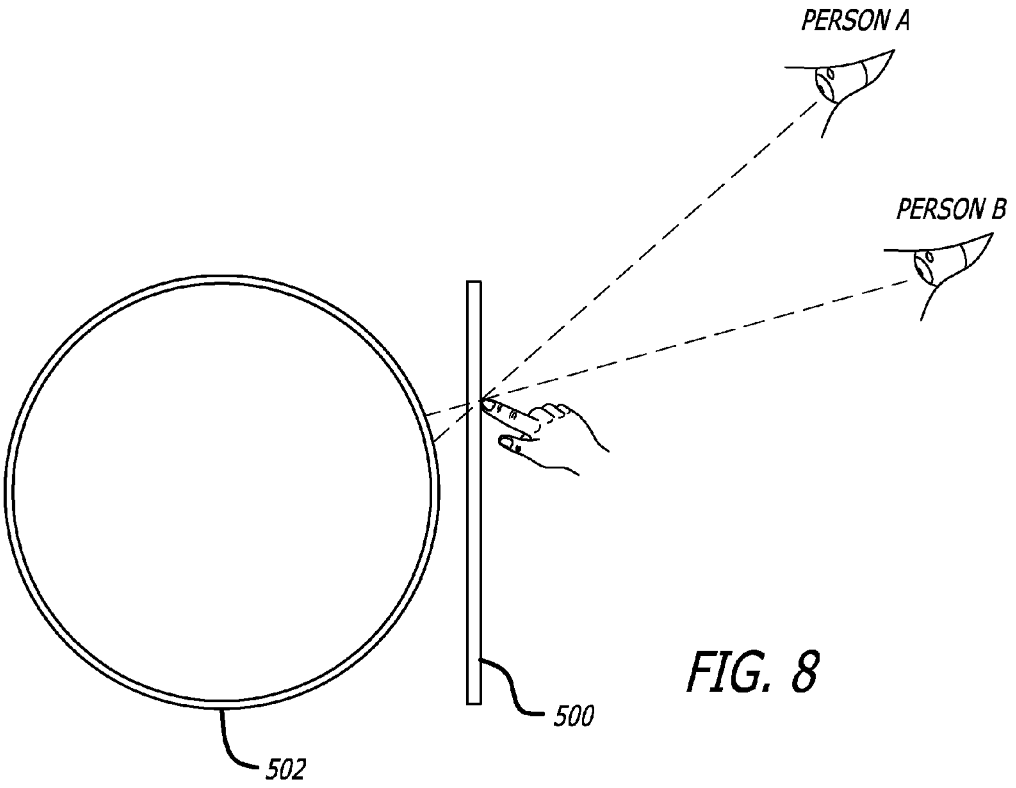
FIG. 8 illustrates one embodiment of a gaming machine having a touch screen positioned in front of the reconfigurable reels.

FIG. 8 illustrates another embodiment of a gaming machine having a touch screen 500 positioned in front of the physical reels 502. In this embodiment, one or more sensing devices (not shown) such as, but not limited to, cameras are positioned within the gaming machine and directed towards the direction of the player (i.e., camera is pointing away from the gaming machine). As shown in FIG. 8, the intended coordinate for the same touch point varies based on the player's perspective (i.e., the location of the player's eye). For instance, Player A is intending to contact a point on the reel that is lower than the intended contact point on the reel for Player B. The sensing device is used to locate the player's eye in space (i.e., height and distance) from the touch screen display. Based on this information, the gaming machine can more accurately determine the symbol and/or reel the player intended to touch.

In use, the sensing device (not shown) first determines the location of the player's eyes. According, to one method, the CPU of the gaming device computes a ray from the located eye through the point touched on the touchscreen to a point on the video stepper reel. In an alternate method, the CPU first computes a ray from the player's eye location to the point touched on the touch screen. Next, the CPU determines the point at which the ray contacts the video stepper reel. In either method, a more accurate position on the video stepper reel is determined because the height and distance of the player from the point of contact is accounted for. As a result, the gaming machine is able to use smaller contact areas. Alternatively, these methods provide for finer gesture control, which can lead to a plurality of games.

Conversion of Existing Stepper Game/Cabinet to Video Stepper

In another embodiment, the physical stepper reels in an existing are upgraded to a stepper reels having one or more flexible displays applied to the circumference of the reels. That is, the static reel strips are replaced with one or more flexible displays. The displays may be layered one on top of the other, end to end so that the entire circumference of the reel is covered, or a combination thereof. In this embodiment, the original signals may be repurposed and/or supplemented to provide an enhanced gaming experience. For example, the original stepper motor signals may be supplemented so that the artwork of the original stepper game is enhanced by downloading a new symbol bitmap images into the video memory associated with the CPU. Accordingly, when the original stepper motor signal is sent, the new symbol bitmap images are presented on the flexible displays. Optionally, new mathematics and other control logic may be incorporated into the game without swapping out the physical reels.

Generally, the CPU intercepts the various signals sent by the native/original program, and the CPU may send new or supplemental images, sound effects, or any combination thereof. Alternately, the original signal may be passed through the CPU without any decoding. Examples of these originals include, but are not limited to, stepper motor signals may be sent to the stepper motors, the original game signals that drive the light sources (e.g., lamps or LEDs) used to backlight a reel, and/or to highlight a winning payline are repurposed as inputs for the flexible displays.

Figure 9:
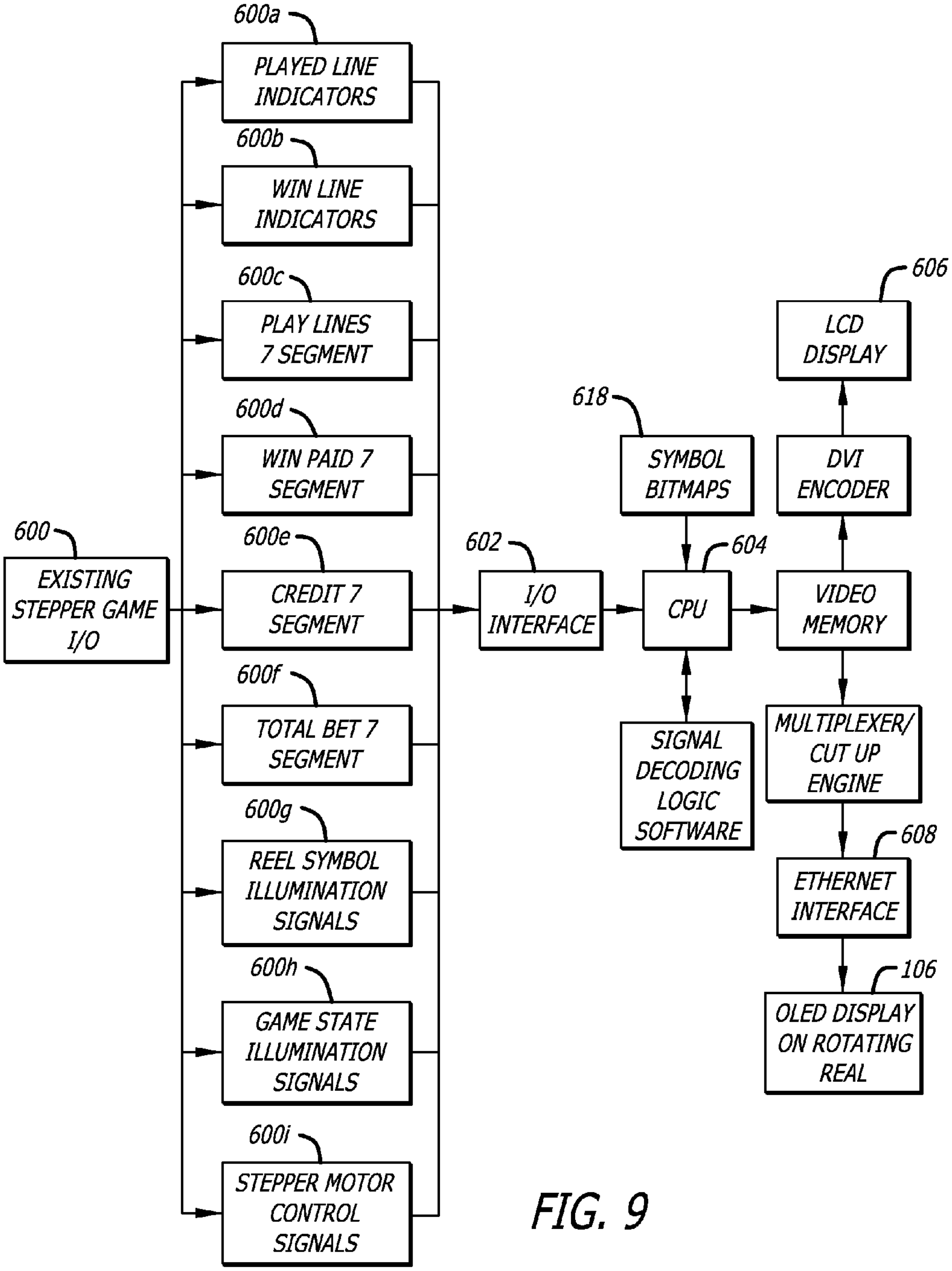
FIG. 9 is a block diagram of existing stepper motor input and outputs interfacing with LCD displays and reconfigurable stepper reels.

FIG. 9 illustrates a set of outputs 600*a-h* from a conventional stepper game being fed through an I/O interface 600 back into the video stepper system.

As shown in FIG. 9, the existing stepper output 600 includes outputs for the mechanical reels and information displays. The mechanical reel outputs include played line indicators 600*a*, win line indicators 600*b*, reel symbol illumination signals 600*g*, game state illumination signals 600*h*, and stepper motor control signals 600$i$. The information displays are typically 7 segment displays that present information regarding number of lines played 600$c$, win amount paid 600$d$, credits on gaming machine 600$e$, and total bets 600$f$. Each of these outputs is processed by the CPU 604 and interpreted as video to be displayed either on the LCD information display 606 or on one or more of the OLED displays 106 on the video stepper reels (via the Ethernet interface 608).

By way of example but not of limitation, the reel symbol illumination signals are used to illustrate the conversion of illumination signals into video output signals for the flexible displays. Each visible symbol on the reels of a reel stepper game is associated with a reel symbol illumination signal. In a five-reel game in which three symbols from each reel are visible, there is a total of 15 reel illumination signals. In one embodiment, the CPU includes decoding software having tables associated with each possible payline. The following tables are provided by way of example but not of limitation:

Line 1:

| | Reel 1 | Reel 2 | Reel 3 | Reel 4 | Reel 5 |
|---|---|---|---|---|---|
| Row 1 | 0 | 0 | 0 | 0 | 0 |
| Row 2 | 1 | 1 | 1 | 1 | 1 |
| Row 3 | 0 | 0 | 0 | 0 | 0 |

Line 2:

| | Reel 1 | Reel 2 | Reel 3 | Reel 4 | Reel 5 |
|---|---|---|---|---|---|
| Row 1 | 1 | 1 | 1 | 1 | 1 |
| Row 2 | 0 | 0 | 0 | 0 | 0 |
| Row 3 | 0 | 0 | 0 | 0 | 0 |

Line 3:

| | Reel 1 | Reel 2 | Reel 3 | Reel 4 | Reel 5 |
|---|---|---|---|---|---|
| Row 1 | 0 | 0 | 0 | 0 | 0 |
| Row 2 | 0 | 0 | 0 | 0 | 0 |
| Row 3 | 1 | 1 | 1 | 1 | 1 |

Line 4:

| | Reel 1 | Reel 2 | Reel 3 | Reel 4 | Reel 5 |
|---|---|---|---|---|---|
| Row 1 | 0 | 0 | 1 | 0 | 0 |
| Row 2 | 0 | 1 | 0 | 1 | 0 |
| Row 3 | 1 | 0 | 0 | 0 | 1 |

Line 5:

| | Reel 1 | Reel 2 | Reel 3 | Reel 4 | Reel 5 |
|---|---|---|---|---|---|
| Row 1 | 1 | 0 | 0 | 0 | 1 |
| Row 2 | 0 | 1 | 0 | 1 | 0 |
| Row 3 | 0 | 0 | 1 | 0 | 0 |

Figure 10:
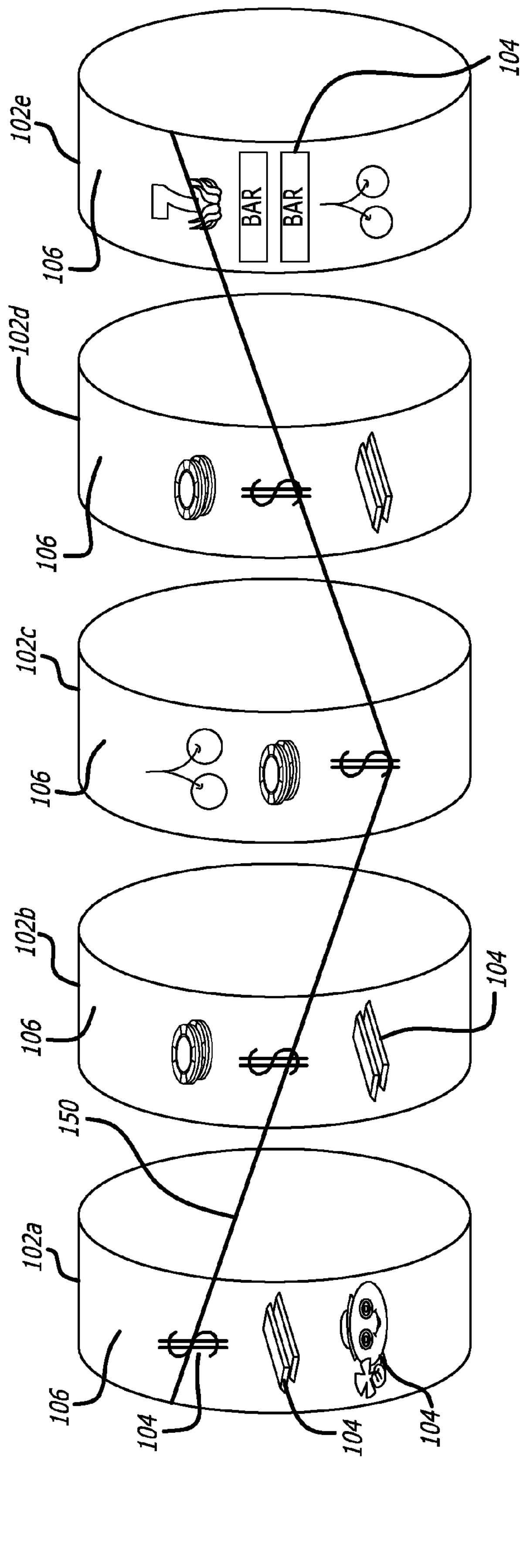
FIG. 10 illustrates video images presented on a plurality of reconfigurable stepper reels.
Figure 11:
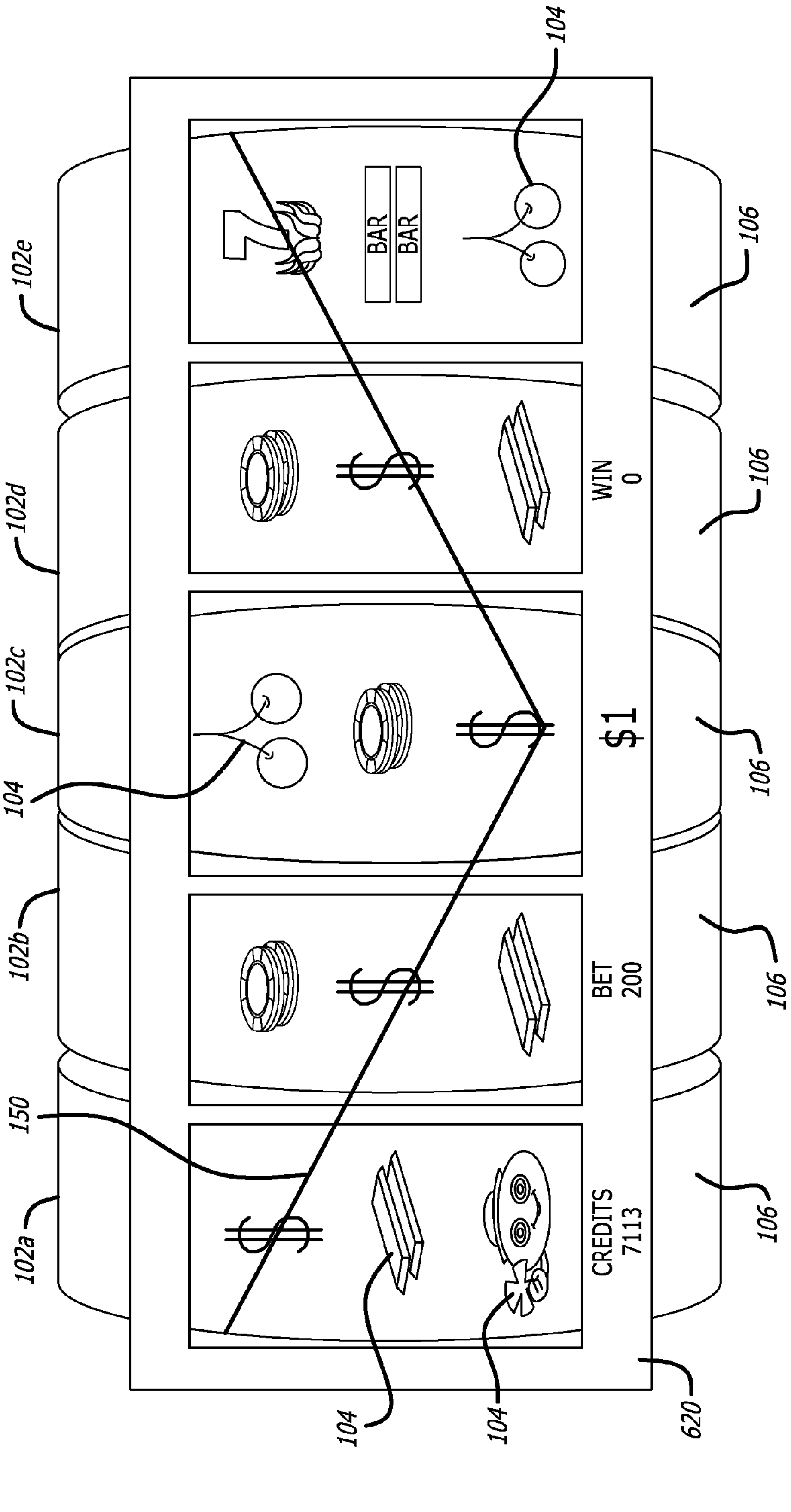
FIG. 11 illustrates an informational display and a plurality of reconfigurable stepper reels.

At the end of each reel spin, the inputs are interpreted, and the appropriate payline graphic image(s) 150 are overlaid on the video stepper reels 102$a$-$e$ as shown in FIGS. 10-11. For example, if Line 5 were to be illuminated, the signals would be as above, and the interpretation logic would be:

IF (Row1-Reel1)=1 AND (Row1-Reel5)=1 AND (Row2-Reel2)=1 AND (Row2-Reel4)=1 AND (Row3-Reel3)=1 AND (All other reel illumination signals)=0 THEN Display Payline 5.

This condition being met would result in the control logic retrieving the overlay images for payline 5. The overlay image 150 is then delivered to each of the video stepper reels 102$a$-$e$ as shown in FIGS. 10-11.

Referring back to FIG. 9, the win/played line indicator lights 600$b$ are used to indicate that a line is being played. When player input increases or decreases the number of lines to be played (via a physical button or virtual control panel), light sources associated with the paylines are either turned on or off. The CPU takes the existing output signal and converts the signal into a video image. Alternatively, the CPU receives the existing output signal and determines a corresponding video image(s) and sends the image to the LCD information display and/or the flexible displays via the multiplexer/cut up engine and Ethernet interface. Accordingly, the video image presented on the flexible display and/or the LCD information display reflects the active play lines. Similarly, the CPU may also be used to convert player input into signals that may be converted into a signal that the existing gaming machine can process. For example, if player input is received by a touch-screen selecting active play lines, the signal may be re-routed to the back to the stepper game as if the physical line or bet button were pressed on the gaming machine.

As shown in FIG. 9, game state illumination signals may also be converted to a video image that is presented on the LCD display and/or flexible displays. The game state illumination signals are used to illuminate the reels in order to signify to the player that the game is in an altered state (e.g., bonus game is activated). For example, in Bally's "Instant Spin" game, the game state illumination signal is sent to illuminate all of the reels with a red tint to indicate to a player that the instant spin feature is active and to look up at the Instant Spin wheel. Upon receipt of the original game state illumination signal, the CPU 604 can send instructions to instead display content on the video stepper wheels such as shown in FIGS. 10-11. Alternatively, the CPU 604 may send a signal to cause the flexible displays 106 to be tinted red and present any message to notify the player that the game state has changed.

As shown in FIG. 11, the CPU 604 can decode 7 segment signals to represent the data on the LCD information display 620. Additionally, the CPU 604 can determine the state of the stepper game based on the 7 segment signal received at the CPU. The CPU 604 can then send one or more additional signals to provide additional effects and/or information. By way of example and not of limitation, if the CPU 604 receives a "win paid" signal which indicates a winning event has occurred, the CPU 604 may provide an additional animation sequence on the OLED display or sound effects to augment the winning event provided by the underlying stepper game. Alternately, the CPU 604 may sample sound output from the gaming machine to determine the state or operation of the stepper game rather than decoding the signals.

In some embodiments, the flexible display is an electronic paper (e-paper) display. Various methods are contemplated to account for the comparatively long refresh times associated with e-paper displays. According to one method, a portion of the e-paper display is updated rather than updating the entire display. For example, a portion of the display corresponding to one, two, or three game symbols on the display is only updated. In yet another method, the portion of the display that is directly below the visible portion is refreshed. Because this portion of the reel has to travel the longest distance, the e-paper is given the maximum time to refresh before it becomes visible to the player.

Refreshing the portion of the video display that has just left the player's view is useful for those games having a "virtual reel," which includes more symbol positions than physical spaces for such symbols. That is, a physical reel may have, for example, twenty-two spaces for game symbols, yet the "virtual reel" includes, for example, 100 symbols. The CPU includes an algorithm that allows an e-paper display to refresh itself during the spin cycle of the reel. Using the above reel configuration, if symbol positions 9-11 are currently visible, then the spin algorithm would (1) determine the final stopping position of the reel; (2) determine the number of symbols to be rotated through and reel spin speed (e.g., if the reel spin speed is one rotation per second, and the spin time is three seconds, the number of symbols to be rotated would be 66); (3) start spinning the reel; (4) replace the lowest symbol with the final stopping position symbol (e.g., the symbol from position 11 moves downward as the reel spins and is replaced with the symbol from the "from" position, which is initially the (final stopping position 47)); (5) increment the "from" position in the reel by one; (6) repeat steps (4) and (5) for 66 iterations; and (7) end with the correct final position. In this example, the final stopping position 47 is calculated by taking the number of symbols to rotate (66) and subtracting one revolution (22) and adding the number of visible symbols (3).

In another method, the reels are programmed to spin faster so that the symbols on the display are not discernable so that the display has adequate time to refresh to the image to be shown to the player when the reels stop. In another method, the reels spin slower in order to provide the maximum time for the display to refresh.

When implemented as a replacement output for a stepper game, the images displayed on the reels 102 can use the video methods described above, or alternatively static bitmap images 618 can be sent once to the video steppers over the infra red link. In another embodiment, a preferred solution is to use a hybrid approach; each video stepper has static symbol bitmaps drawn over the whole of the OLED display 106. When rotating, this appears to a player as very similar to a conventional stepper reel display. Once stopped, however, the reel displays are fed MPEG streams so that system and/or player tracking content may be rendered onto the reels and/or more animation may be shown on the display as compared to a conventional reel.

Touch Gestures

Figure 12:
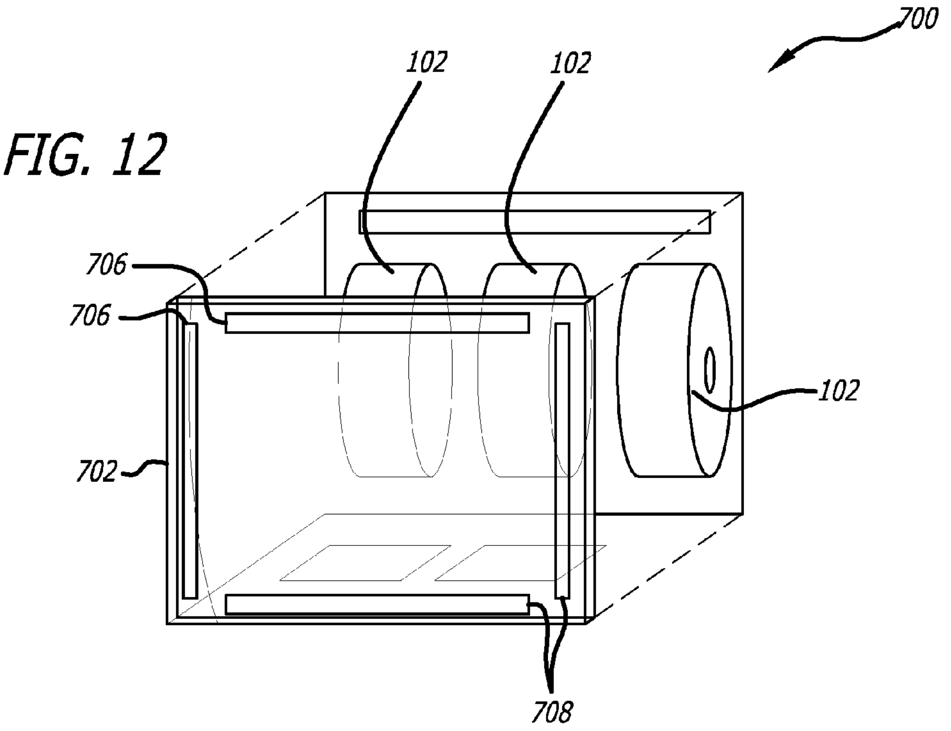
FIG. 12 is one embodiment of a perspective view of a touch panel system.
Figure 13:
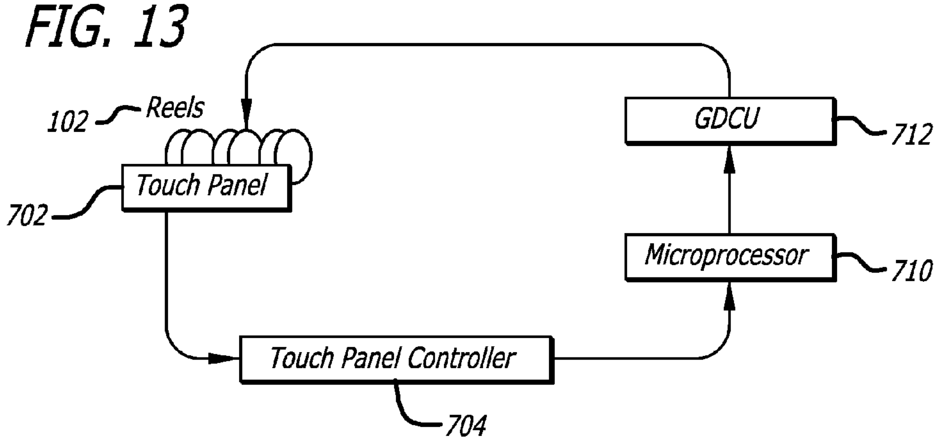
FIG. 13 is an operational flow diagram of a gaming machine having a touch panel system.
Figure 14:
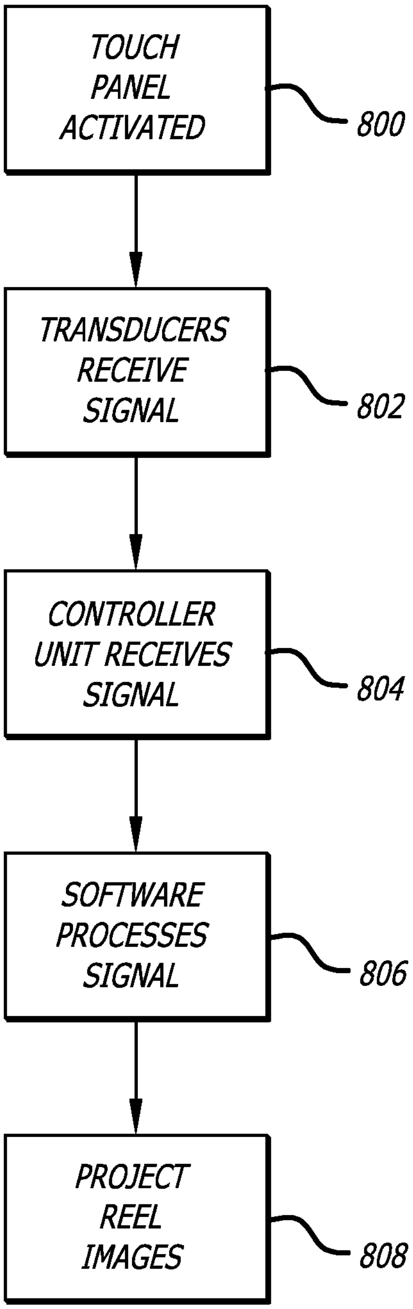
FIG. 14 is an operational flow diagram of a gaming machine having a touch panel system.

FIGS. 12-14 illustrate one embodiment of a touch sensor assembly 700 incorporating a substantially transparent touch panel 702, a touch controller 704, and touch panel software. As shown in FIG. 12, the touch panel 702 utilizes a touch sensor assembly 706 to produce touch data when touched or activated, as well as allowing substantially unobstructed viewing of the video images presented on the reels behind the touch panel. The touch sensor assembly 706 includes one or more touch pad areas (not shown), one or more touch transducers 708, wave reflectors (not shown), cabling (not shown), a bezel (not shown), a touch panel controller 704, touch panel driver software, and touch panel application software. The material for the touch pad areas (not shown), is either glass or other polymeric material suitable for propagating surface acoustic waves.

Additionally, the transducers 708 are able to adhere to the skin of the glass-like materials of the touch panel 702 sufficiently to pass around curves. This allows a curved touch panel (not shown) to be utilized without detrimental effects. Accordingly, in one embodiment, the touch panel 702 has a radius of curvature similar to the reels 102. Also, one of ordinary skill in the art will appreciate that while the touch panel 702 is shown to be rectangular in shape with respect to FIG. 12, the touch panel may be designed to accommodate the shape of any gaming machine configuration (e.g., circle, semi-circle, triangle, and the like).

As shown in FIG. 13, the touch panel 702 is placed in front the video stepper reels 102. Touch panel data received by the touch panel 702 is transmitted to the touch panel controller 704. The touch panel controller 704 acts to control and interpret touch data from the touch panel 702. The controller 704 typically includes a printed circuit board assembly, often encased inside a metal or plastic housing with mounting holes. In one embodiment, the controller 704 is mounted to the inside of the gaming machine door or cabinet, and is preferably within reach of the touch panel wiring (not shown). The controller 704 is wired to the appropriate power and communication connections within the gaming machine. The controller 704 outputs a data stream consisting of touch coordinate information.

In one embodiment, the microprocessor 710 runs an application that translates the touch panel controller 704 serial touch information into reel control commands for a GDCU reel controller 712. The application uses drivers to communicate with the GDCU 712 which controls the projection of the image onto the OLED display 106 of the reels 102. The GDCU 712 is a communications portion of the gaming machine 100 which "talks" to the different components of the gaming machine.

FIG. 14 illustrates the operational flow of a gaming machine including a touch panel system. As shown in FIG. 14, the logical operations of the various embodiments of the touch screen system are implemented (1) as a sequence of computer implemented steps or program modules running on a computing system and/or (2) as interconnected machine logic circuits or circuit modules within the computing system. The implementation is a matter of choice dependent on the performance requirements of the computing system implementing the touch panel system. Accordingly, the logical operations making up the embodiments of the touch panel system described herein are referred to variously as operations, structural devices, acts or modules. It will be recognized by one skilled in the art that these operations, structural devices, acts and modules may be implemented in the system, in firmware, in special purpose logic, analog circuitry, or any combination thereof.

As shown in FIG. 14, the logical operations of a touch panel system 700 utilize the components of the system in a logical sequence. In the panel activation step 800, the touch panel 702 is activated. This occurrence produces a signal that is received by the transducers 708 associated with the touch panel 702 in the transducer signaling step 802. In the controller signaling step 804, a signal is sent to the touch panel controller 704 reporting the activation of the touch panel 702. From the touch panel controller 704, a signal is then sent to, and interpreted by, the touch panel software (which is in the microprocessor 710) in the signal processing step 806. Finally, the touch panel software sends a signal to the GDCU reel controller 712 to project reel images onto the OLED display at step 808.

The touchscreen receives various inputs (e.g., single touch, multi-touch, single or multi-touch gesturing, or any combination thereof) that correspond to coordinates on the LCD display. The input from the touchscreen corresponds to a selection of games for play, number of games to play, paylines, bonus symbols, wager amounts, wager denominations, spinning one or more reels, stopping one or more reels, or any other input associated with the game. For example, the coordinates of the touchscreen portion overlaying the reels is mapped to the underlying physical video stepper reels. As a result, the touchscreen is able to receive player input that will cause the reel and/or symbols on the reels to change in appearance.

Figure 15A:
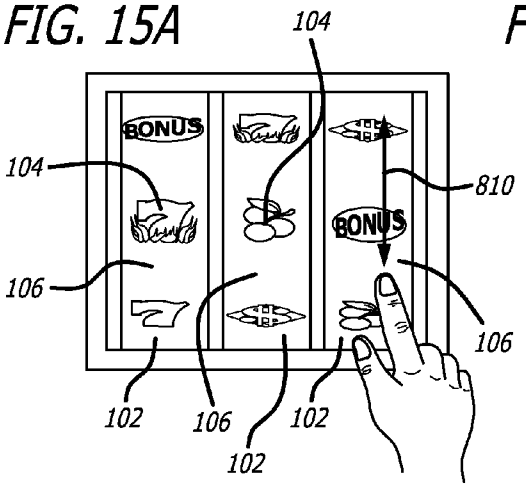
FIGS. 15A-15B illustrate one embodiment of a touch gesture for initiating a game presented on a gaming machine.
Figure 15B:
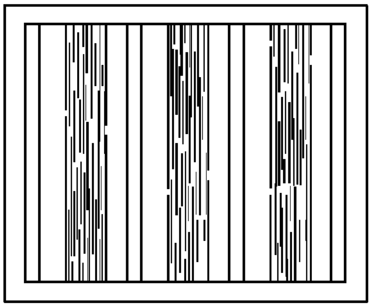

For example, FIGS. 15A-15B illustrate one embodiment in which touch data in the form of a touch gesture 810 generally parallel to the reels will cause the projected image of the reels to spin. The touch gesture in a "slide up" or "slide down" motion will initiate the spinning of the reels as shown in FIG. 15B. The gesture causes the reels to spin in the particular direction of the gesture. For example, if the gesture moves top-down on the touch screen, the reels spin in a top-down direction. Alternatively, if the gesture moves bottom-up on the touch screen, the reels spin in a bottom-up direction. Additionally, the speed of the gesture may affect the speed of the spinning of the reels. For example, if the gesture is fast, the reels spin fast whereas the reels will spin slower for a slower gesture. Generally, any gesture on the touch screen that is parallel to the image of the reels will cause all the reels to spin. In another embodiment, the player needs to make a gesture at a particular area adjacent to the image of the reels in order to cause the image of the reels to spin. In yet another embodiment, the player can gesture to control each reel. Accordingly, the player may vary the order and/or speed of each reel spun.

Optionally, the "slide up" or "slide down" gesture may be used after the reels have stopped. The player may select one or more reels and attempt to nudge or move the reels one or more positions so that a game symbol appears or is removed from a payline. These gestures may be provided to the player (for purchase, as a bonus, or in response to particular game outcome) so that the player may attempt to improve the game outcome.

Figure 16A:
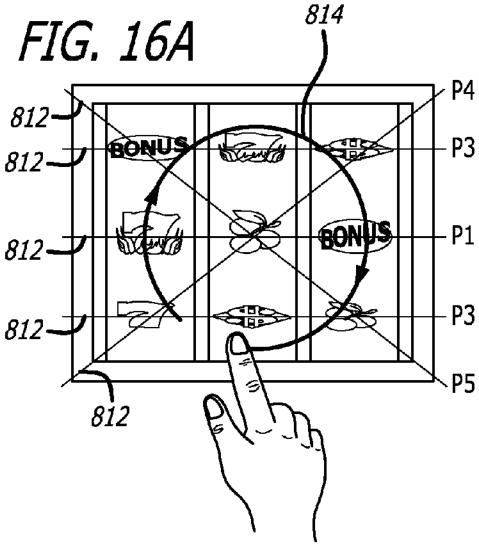
FIGS. 16A-16B illustrate one embodiment of a touch gesture for selecting active pay lines.
Figure 16B:
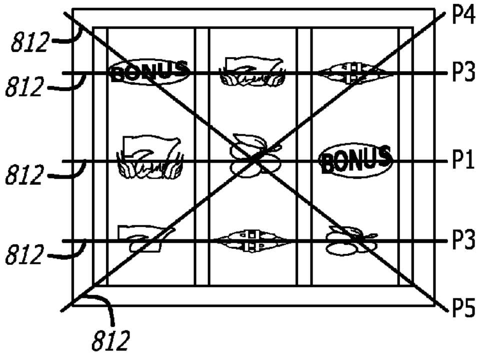

FIGS. 16A-16B illustrate touch gestures related to placing a wager or selecting a pay line. For example, in one embodiment, touch data sensed at the location near a pay line will result in the selection of the pay line for play. If the touch data is a circular motion 814 that covers one or more paylines 812, this touch gesture is interpreted as selecting two or more pay lines, as shown in FIG. 16A. For example, the circular gesture encompasses or touches all pay lines, then all the pay lines are selected. Alternatively, if the circular gesture only encompasses three pay lines, those three pay lines are selected for play. As shown in FIG. 16B, the pay lines located within the touch gesture are highlighted on the screen and active for game play.

Figure 17C:
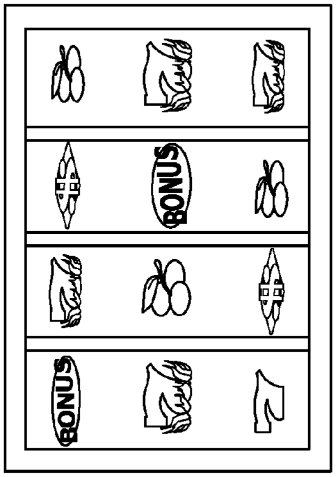
FIGS. 17A-17C illustrate touch gestures for adding and removing reels from a game.
Figure 17B:
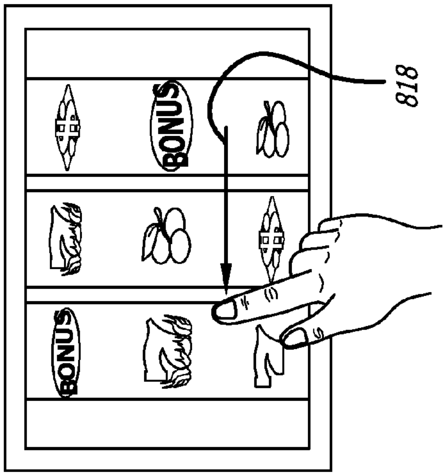
Figure 17A:
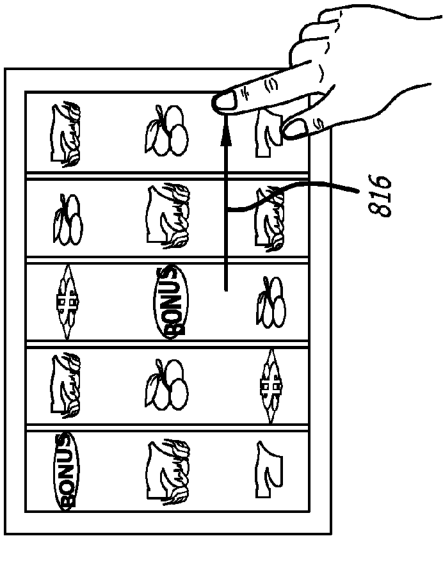

FIGS. 17A-17C illustrate various screen shots of touch gestures that add or remove reels from the game. A generally-perpendicular, touch gesture 816 in a direction away from the reels is interpreted as a player request to remove reels. FIG. 17A shows a five-reel game and a player touch gesture 816 (away from the reels toward the edge of the screen). As a result, two reels are removed from the game, and a three-reel game is presented on the video stepper reels as shown in FIG. 17B. According to one embodiment, each generally perpendicular touch gesture in a direction away from the reels causes one reel to be removed. In another embodiment, each generally perpendicular touch gesture causes a predetermined number of reels (e.g., two reels) to be removed from the game. As those skilled in the art will appreciate, the game is configured to have a predetermined minimum number of reels for a particular game.

As shown in FIG. 17B, a generally-perpendicular touch gesture 818 from the edge/side of the curved display toward the center of the display causes one or more reels to be added to the game. As shown in FIG. 17C, the touch gesture 818 of FIG. 17B causes one reel to be added to the game to form a four-reel game. A gesture 816, 818 may be programmed to add/remove one reel or add/remove a predefined group of reels (e.g., two, three, or more reels per gesture).

Those video stepper reels that are not used in FIGS. 17A-17C may be left blank, darkened, present player tracking information, game status information, advertisements, instructions, or the like.

Figure 18A:
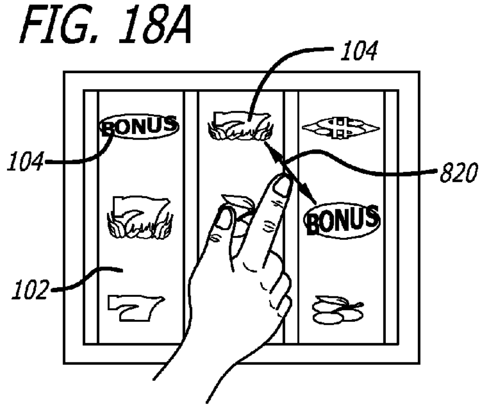
FIGS. 18A-18B illustrate one embodiment of a touch gesture for moving symbols between reels of a game.
Figure 18B:
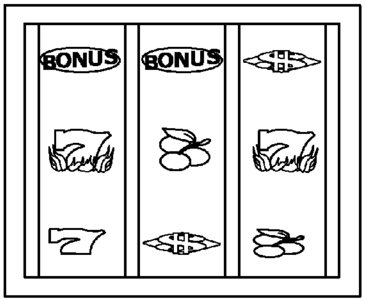

FIGS. 18A-18B illustrate another embodiment of a touch gesture 820 that allows a player to move symbols 104 from one reel 102 to another. As shown in FIG. 18A, the gesture is touching the positions on the touch screen corresponding to two game indicia (e.g., with the thumb and middle finger) and drawing the thumb and middle finger together. This gesture will cause two symbols to swap positions on the reels as shown in FIG. 18B.

As shown in FIGS. 18A-18B, a player is able to swap symbols between adjacent reels. Alternatively, the player may be able to swap symbols between non-adjacent reels. In another embodiment, the touch data may be a gesture that allows a player to change the order of symbols on the same reel. In one embodiment, only adjacent symbols on the same reel may be swapped. Alternatively, any symbol on the same reel may be swapped. The touch screen may be activated during certain portions of a game to allow a player to swap symbols. For example, the touch screen may be activated for a predetermined period of time after a game has completed. Accordingly, a player may attempt to achieve a winning outcome or improve a winning outcome by swapping symbols.

In various embodiments, the ability to swap symbols may be a feature of the game or the player must have satisfied some predefined criteria to permit this feature of the game. For example, the predefined criteria may be one or more maximum wagers, a predefined period of continuous play, a particular player club level, accrual of a particular number of player club points, or any other trigger events known or developed in the art. As those skilled in the art will appreciate, the game may be limited to only allow the player to swap certain game indicia. Alternatively, the game may allow any swapping of game indicia between reels or on the same reel. Optionally, the game may allow more than one swap per game.

Figure 19A:
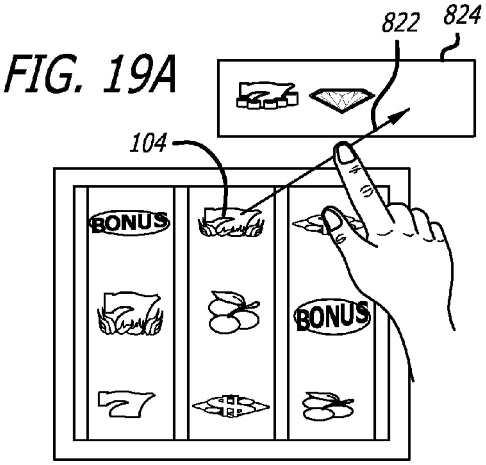
FIGS. 19A-19D illustrate touch gestures for adding and removing symbols from reels of a game.
Figure 19B:
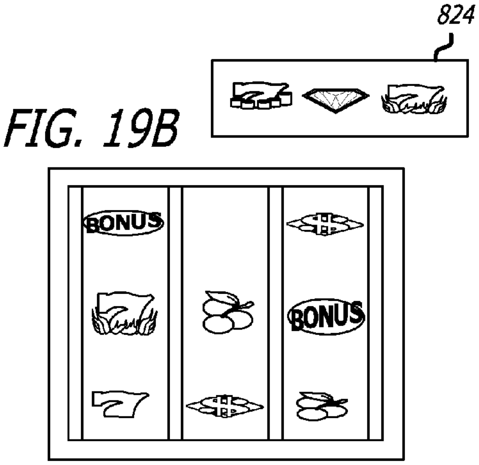
Figure 19C:
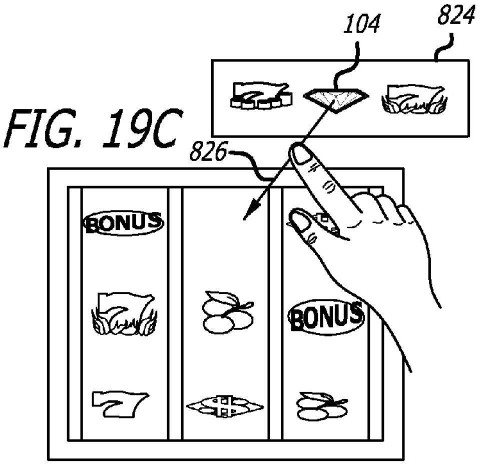
Figure 19D:
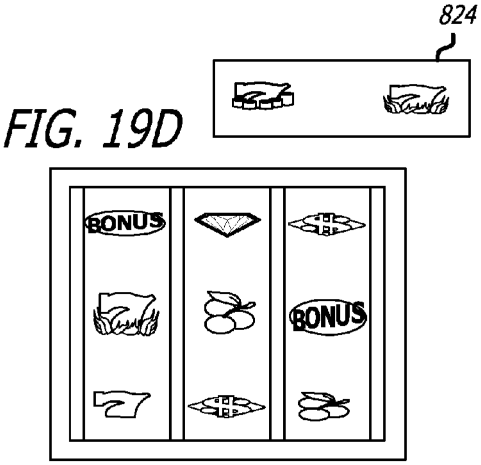

In yet another embodiment, the touch screen is configured to accept touch data that allows a player to add game indicia onto one or more reels or remove one or more indicia from a reel as shown in FIGS. 19A-19D. FIG. 19A illustrates one embodiment in which a touch gesture 822 from a game indicia 104 on one of the reels to a symbol bank 824 causes the game indicia to be moved from the reel to the symbol bank as shown in FIG. 19B. FIG. 19C illustrates one embodiment in which a touch gesture 826 from a symbol bank 824 to a reel 102 causes a game indicia 104 to be added to a reel at the position in which the touch gesture terminates, as shown in FIG. 19D. In another embodiment, the game indicia may be randomly added to a reel. Generally, the game indicia is added or removed prior to game play or after a game has ended. Optionally, the game indicia may be added while the reels are spinning. The touch screen may be activated to allow such gestures in response to a wager, game outcome, some player characteristic, or a trigger event.

In another embodiment, the touch screen is configured to accept touch data that allows a player to define a pay line. Accordingly, a player may drag a finger across the screen to connect a number of positions on one or more reels to form a pay line. For example, in a three-reel game having three pay lines (i.e., display shows three symbols on each reel), the player may define a pay line that is composed of two symbol positions on the first reel and one symbol position on the second reel. These symbol positions are generally composed of three adjacent symbol positions. Alternatively, the pay line is composed of three non-adjacent symbol positions. In another embodiment, the pay line may be composed of merely three symbol positions on any number of the reels. As those skilled in the art will appreciate, a five-reel game having a touch screen may also allow a player to define pay lines.

Figure 19E:
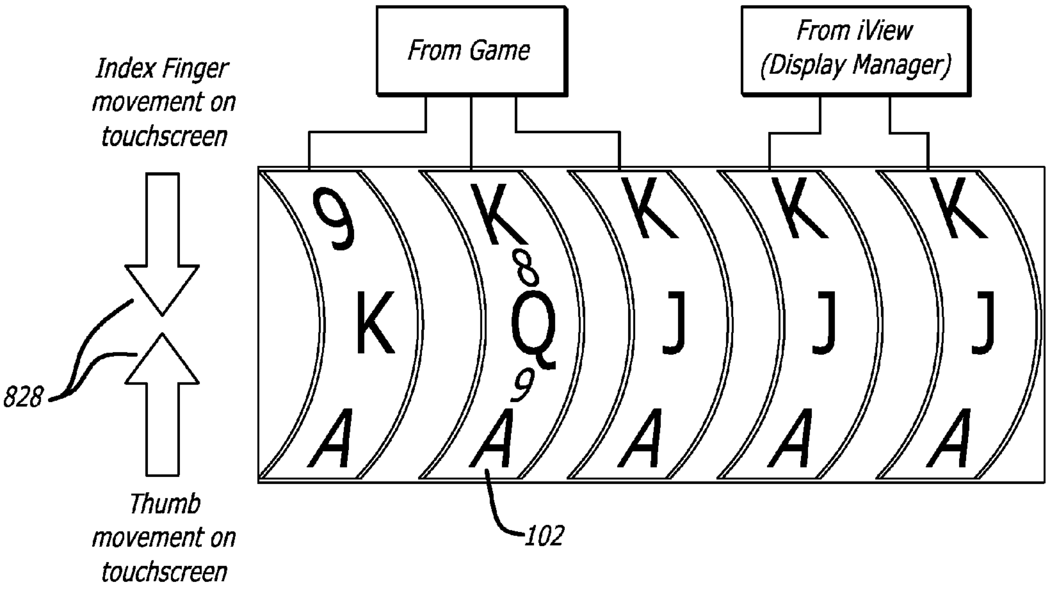
FIG. 19E illustrates a touch gesture for enlarging one or more symbols on a reel of a game.

FIG. 19E illustrates one embodiment in which the touch screen is configured to accept touch data that allows a player to alter the size and/or number of symbols appearing on a reel. For example, a “pinching” gesture 828 over a reel 102 causes the video stepper reel to shrink the visible symbols, thereby increasing the number of symbols on the particular reel. Thus, the increased number of symbols provides the player with another opportunity to form a winning outcome as a new symbol may appear on the payline may form a winning outcome. As shown in FIG. 19E, a reel normally shows three symbols, but the pinching gesture has shrunk the game symbols so that five symbols are now visible. Alternatively, an “expanding” gesture in which a player separates his fingers to increase the size (or zoom in) on a particular game symbol. Accordingly, the game symbol appears larger on the reel. Allowing a player to increase the number of symbols on a reel (via a pinching gesture) or to expand the size of the symbol (via an expanding gesture), the player is given an additional opportunity to obtain a winning outcome on a payline. For example, the player may expand the symbol to span between two or more paylines, and the appearance of the expanded symbol may complete a winning outcome.

In various embodiments, the gesturing feature may be a standard feature of the game or the player must have satisfied some predefined criteria to permit this feature of the game. For example, the predefined criteria may be one or more maximum wagers, a predefined period of continuous play, a particular player club level, accrual of a particular number of player club points, or any other trigger events known or developed in the art. Alternatively, the player may need to purchase the ability to use the touch gesturing. In yet another embodiment, touch gesturing may be activated in response to a particular game outcome such as, but not limited to, a particular game symbol appearing on a payline.

Rendering of Conventional Video Game on Stepper Reels

For the purposes of this disclosure, a conventional video gaming machine presents a five reel game in which three symbol positions from each reel are visible to the player when the reels are stopped. However, those skilled in the art will appreciate the conventional video game may have any number of reels, wheel, or any combination thereof.

Figure 20:
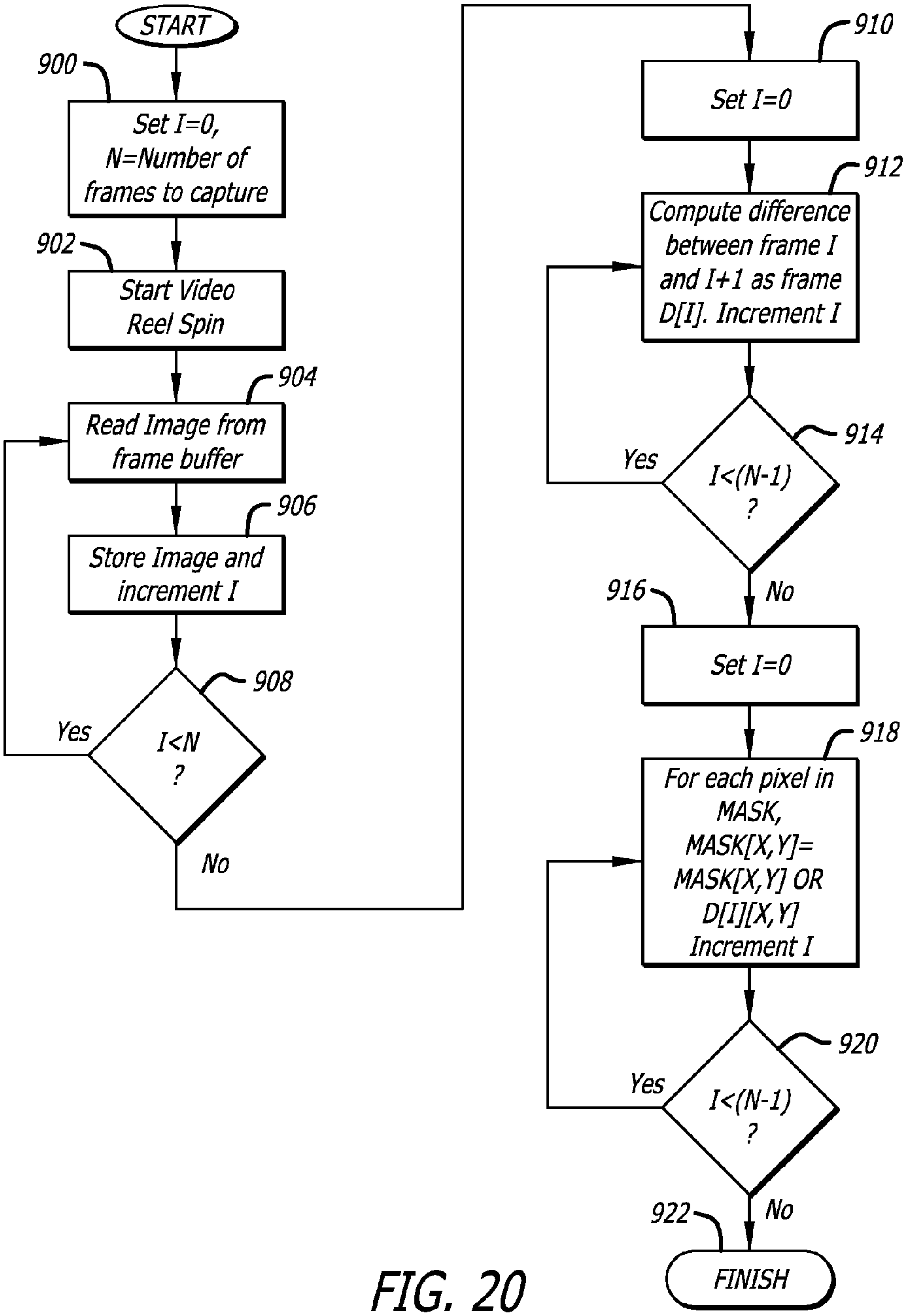
FIG. 20 illustrates one method for capturing data from an original video slots game.

The following is one method for reconfiguring a convention video slots machine into a mechanical stepper motor game having reconfigurable displays. First, the areas of the video screen occupied by the video reels are identified. FIG. 20 illustrates one process for gathering data during one or more video spins. At step 900, a suitable number of video frames are chosen to be sampled or captured. By way of example and not of limitation, the number of frames to be captured (N) is selected to be thirty. In other methods, more or less frames may be selected to be captured. More frames may be captured with the requirement of adequate memory.

At step 902, video reel spin is started by either manual intervention or via a signal from the video capture software. Once the video reel spin is initiated, the video images are read from the frame buffer at step 904. For the required number of N frames, a video image is captured every time the video screen updates. Screen updates occur at a rate of either 30 Hz or 60 Hz, depending upon the game. The captured image is stored and an image counter (I) is incremented at step 906. At step 908, this process continues until the required number of video images are captured. In this example, thirty images would need to be captured and stored in memory.

Figure 21:
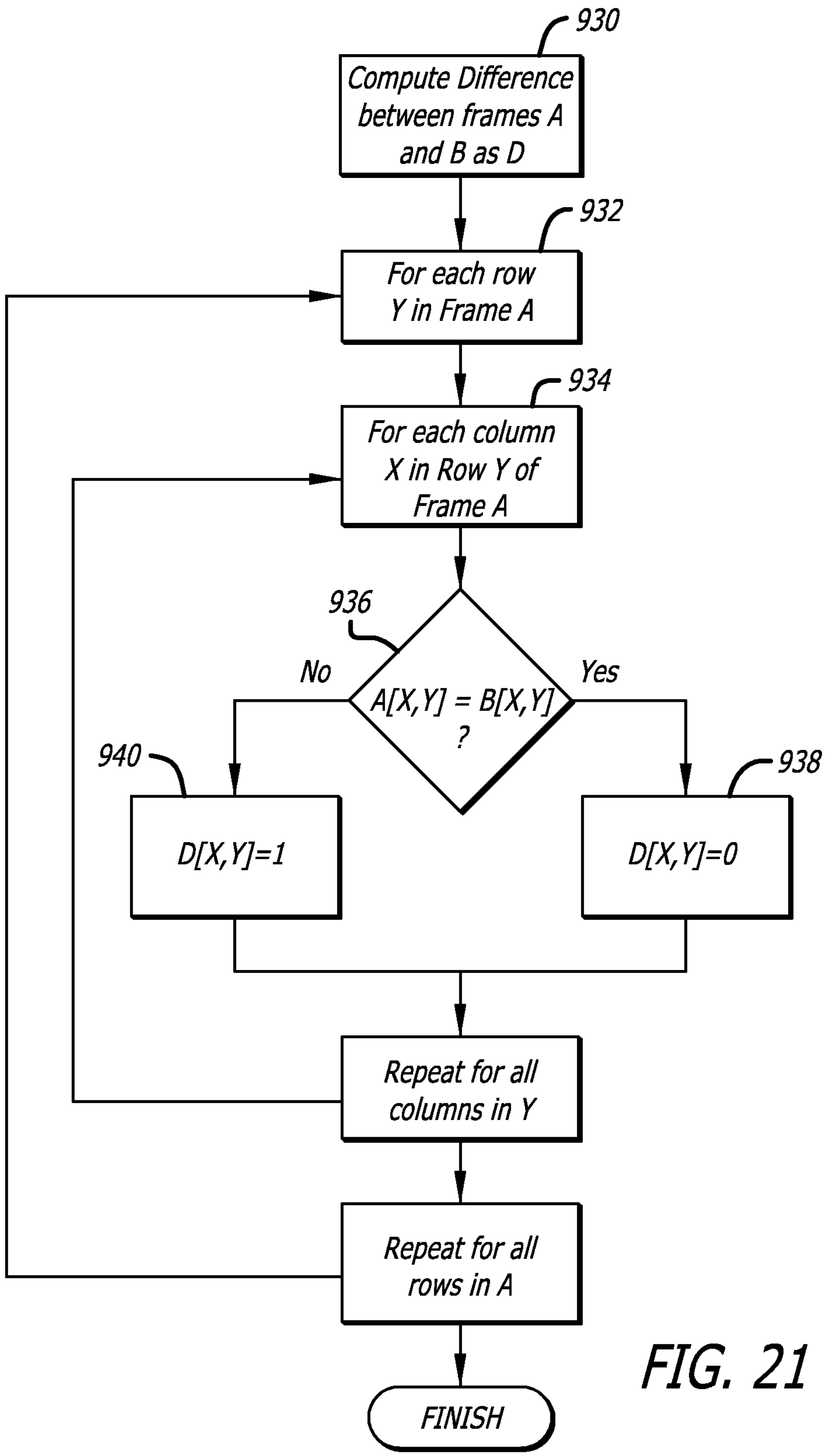
FIG. 21 illustrates one method for calculating differences between video frames captured in method shown in FIG. 20.
Figure 22:
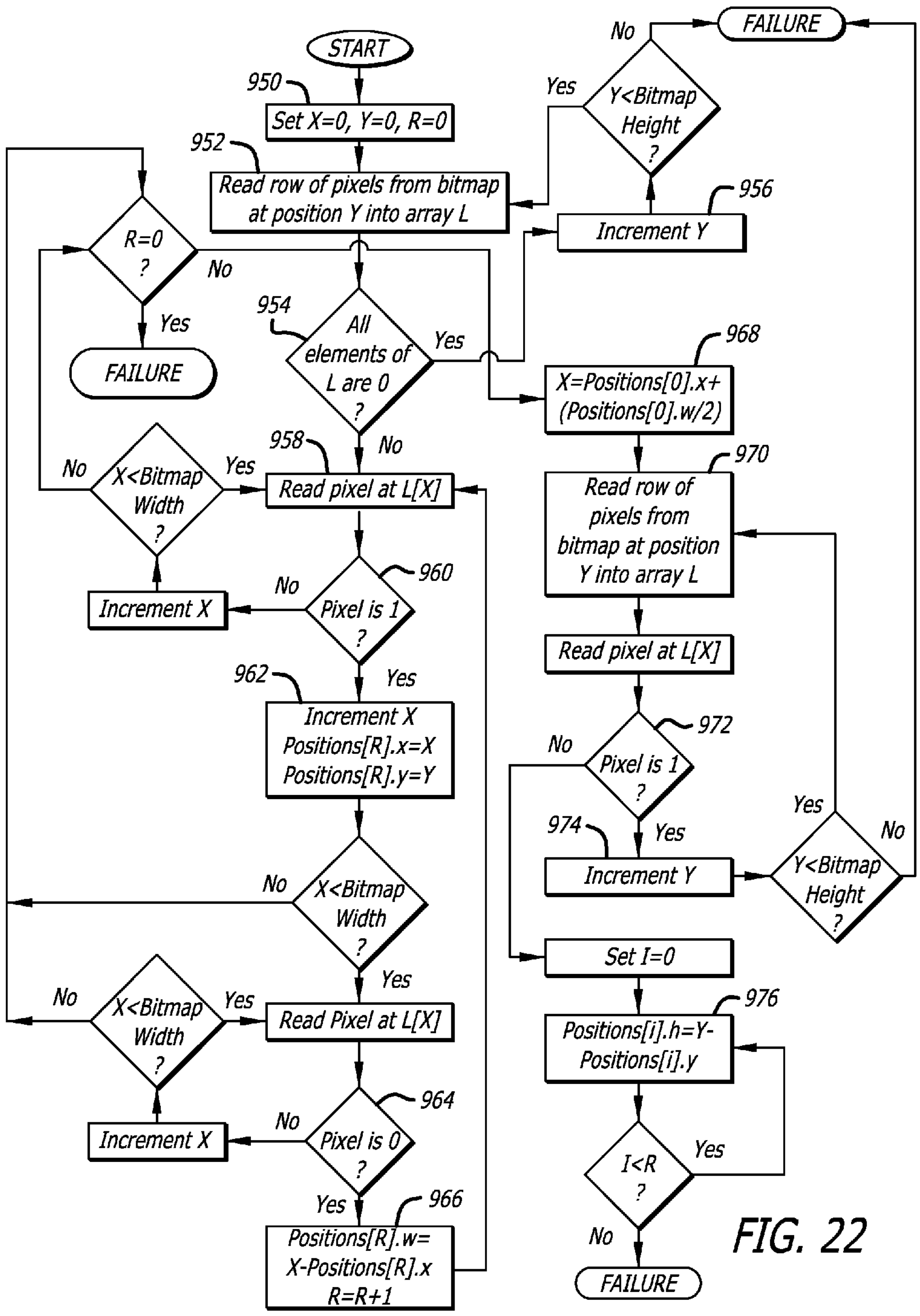
FIG. 22 illustrates one method for identifying reel positions and symbol locations on a video slots game.

Once the N frames, thirty frames in this example are captured, the differences between the frames are calculated. Steps 910-922 provide an overview of one method of calculating the differences between the frames. By calculating frame differences, the parts of the image that have changed from frame to frame are isolated and stored. FIG. 21 provides one process for calculating the differences between frames. In this process, frame I is assigned to frame A and frame I+1 is assigned to frame B. The pixels between frame A and frame B are compared at step 930. At steps 932, 934 each pixel in frame A (i.e. by iterating across each row in A, and within each row, iterating across each column) a comparison is made against the equivalent pixel in frame B. If the pixels match at 936, then most likely no movement took place at this location in the image, and a 0 is stored at the equivalent position in the difference frame D at step 938. If the pixels do not match, then some movement has occurred at this position, and a 1 is stored at the equivalent position in the difference frame D at step 940.

Referring back to FIG. 20, this comparison process, shown in FIG. 21, is repeated for every pixel in the image for each frame N. Once all the different frames (D) are calculated and stored for each N frame, a mask frame is produced at step 918. The mask frame is produced by iterating over each pixel in the mask frame (both in the X and Y directions), and setting that pixel to be the logical OR of the corresponding pixel in the all of the stored difference frames. So, for example, if there were 5 different frames of 2×2 size:

| | | | | |
|---|---|---|---|---|
| 0 0<br>1 1 | 0 0<br>0 1 | 1 0<br>0 0 | 0 0<br>0 0 | 0 0<br>1 0 |

Then the top left pixel in the mask would be:

0 OR 0 OR 1 OR 0 OR 0=1

And the mask for all 4 pixels would therefore be:

1 0

1 1

Optionally, when the mask image is complete, an operator can review the mask image and to mark off areas that are not part of the reels. For example, if the game display presents incrementing progressive values, the operator can manually intervene to mask these changing pixels. Alternatively, after the mask image is complete, a process automatically filters the inputs to only sensible values. For example, the process discards rows of less than 20 pixels.

Once the mask images are completed, the mask image data is processed to identify reel positions. The reel positions and extents may be identified using the method shown in FIG. 22. X and Y are used to iterate across the pixels in the mask bitmap, and R is the number of reels detected. This process begins by setting X, Y and R (the number of reels) to 0 at step 950. A row of pixels at position Y are read from the mask image into array L at step 952. Each of the pixels is tested in turn at step 954, and if all are zero, then Y is incremented at step 956 and the next row is tested at step 952. Once a non-empty row is found, this row is assumed to be the row containing the top most pixels of the reels.

The next task is to find each of the reels in this row. Each pixel in the row is tested at step 958 in turn again to see if X=0. If X is zero for a pixel row, X is incremented until the first 1 is found at step 960. At this point, the top left hand corner of the Rth reel has been found (R initially being zero). X and Y are stored for this reel at step 962. The incrementing of X and pixel testing continues until a zero is found at step 964. This indicated the top right hand corner of the Rth reel at step 966. The width of the reel is therefore set to be the current X minus the X coordinate of the top left hand corner of the reel. After incrementing R to identify that a reel has been successfully found, iteration continues across the row with these comparisons to identify the top corners of each of the reels.

The final parameter needed to identify the size and extents of the video reels is the height, which is identified by setting X to be in the top middle of the first reel found at step 968. Next, each row of pixels at this position is read 970, determining whether the pixel is a 1 at step 922, and incrementing Y between each read 974, until a pixel with a zero value is found. The zero value indicates the bottom row of the reels at step 976. The height of the reel is computed by subtracting the Y coordinate for the top of the reel from the Y coordinate for the bottom of the reel.

Having identified the number of reels (R) and the coordinates and extents of these reels, an image is generated showing these identified reels and presenting it to the operator as shown in FIG. 23. FIG. 23 is the cumulative output of the processes at FIGS. 20-22 combining thirty (30) iterations of the difference frames. This allows the operator to confirm that the process has accurately identified the correct number, order and position of reels. In one embodiment, FIG. 24 is generated by the Display Manager hardware as a semi-transparent overlay allowing the operator to see the existing reels behind the generated mask. The operator can make fine-tuning adjustments to the image using either a touchscreen or any other user input interface to adjust the automatically generated positions. Once confirmed by the operator, the positions and extents of the reels are stored for use later.

Figure 25:
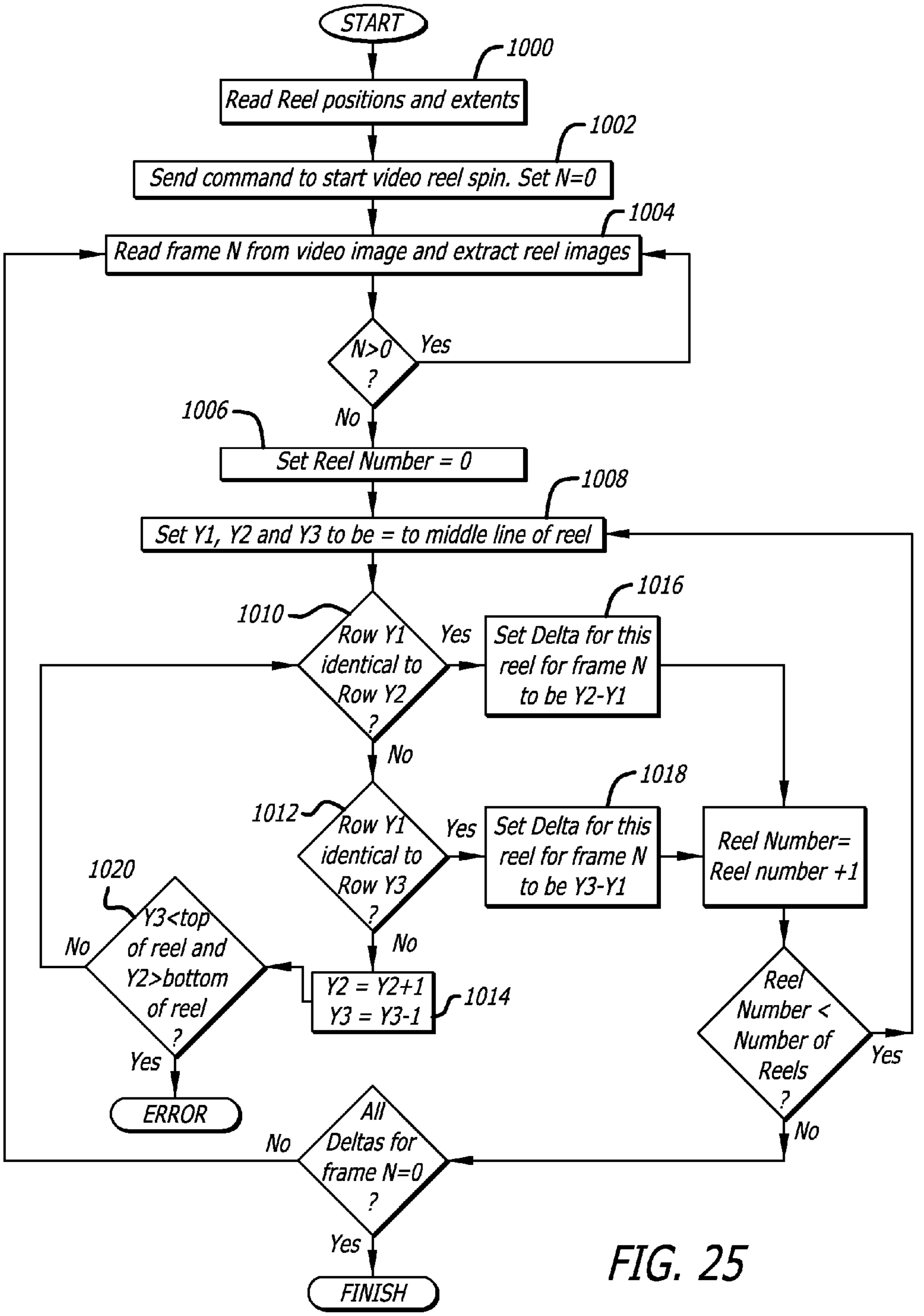
FIG. 25 is a method for determining the characteristics of a reel spin in order to convert and present video slots games on physical reels having reconfigurable displays.

FIG. 25 illustrates one method for determining the characteristics of the reel spin in order to convert video games into the reconfigurable displays on physical reels. This process is executed once by an operator at the initial installation or deployment of a video game into a video stepper product. At step 1000, the reel extents and positions (generated by the process described in FIG. 22) are read. At step 1002, a signal is then sent to the video game to commence a reel spin, and N is set to be 0, in which N is the number of video frames in a video reel spin. Frame N is then captured into an image buffer at step 1004. After more than one frame has been captured by using the reel extents and positions, each portion of the screen occupied by a reel image is analyzed.

For each reel on the screen, the analysis process works by setting the reel number to zero at step 1006. At step 1008, the middle row of the reel is set, which is the row that is half way between the top and bottom of the reel. Y1, Y2, and Y3 are set to the middle row. At step 1010, the row of pixels in the reel indicated by Y1 in frame N is compared to those indicated by Y2. The row of pixels in reel Y1 in frame N is also compared to the row of pixels in Y3 in frame N−1 at step 1012. If the rows of pixels are not identical, Y2 is incremented and Y3 are decremented at step 1014. If the row at Y2 in frame N−1 is the same as the row at Y1 in frame N, the image has moved by (Y2−Y1) pixels. This result is then stored as a delta for frame N at step 1016. If the row at Y3 in frame N−1 is the same as the row at Y1 in frame N, then the image has moved by (Y3−Y1) pixels and this result is stored as a delta for frame N at step 1018.

In the event of a correct match of the row at Y2 or Y3 with the row at Y1, further checks are made that the rows below Y2 or Y3 are also identical to the corresponding rows below Y1 (e.g., row (Y2+1)=row (Y1+1) or row (Y3+1)=row (Y1+1)). These comparisons continue for a suitable number of rows to ensure that correct decisions have been made with regard to the delta. In one method, the comparisons are continued for twenty rows, but any number rows may be used for comparisons. The comparison loop is performed for each of the reels in turn, and then N is incremented and the process repeats until all deltas are 0 (i.e., all of the reels have stopped spinning). The output from this process is a set of deltas indicating the movement profile of each reel as it spins from start to finish.

Figure 26:
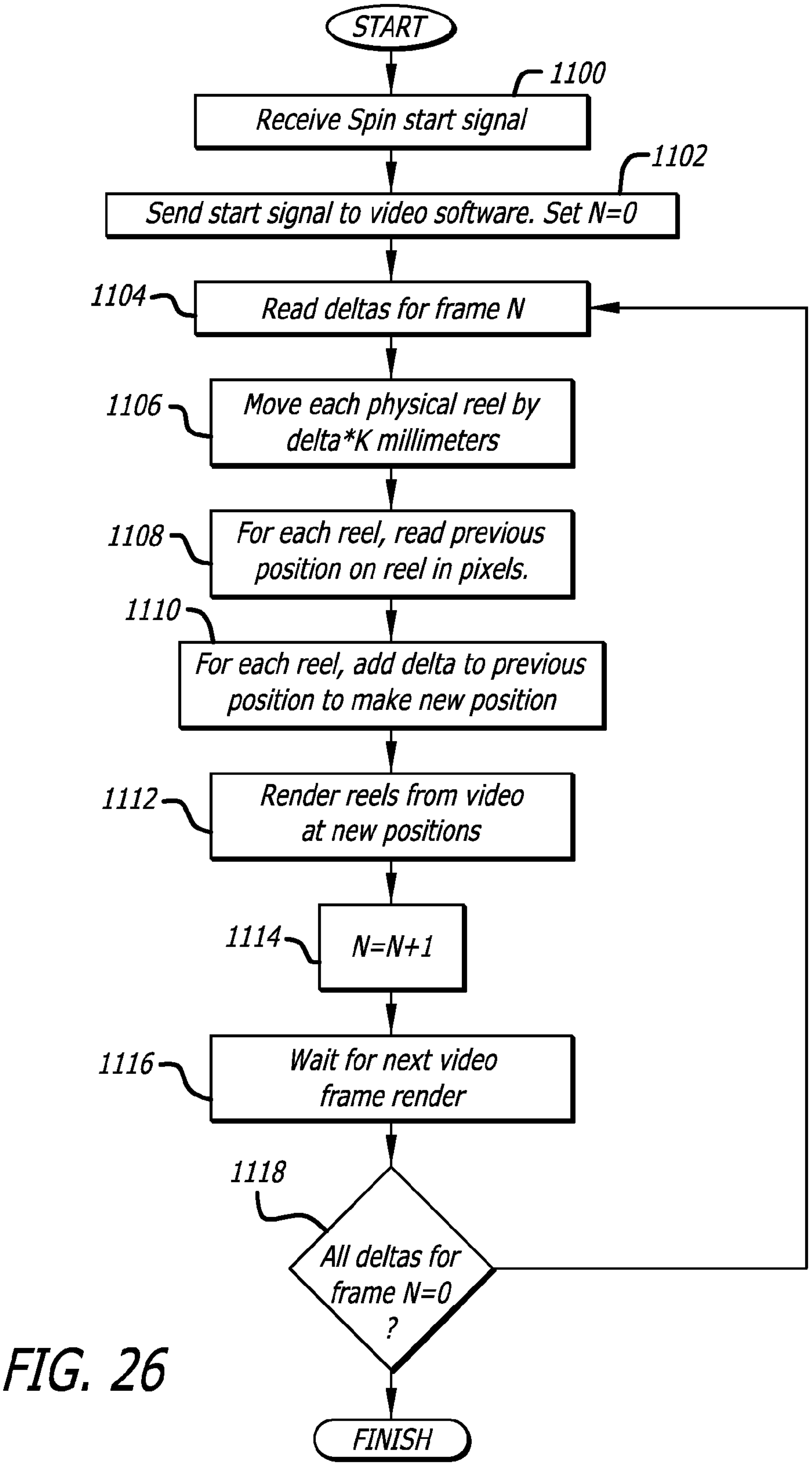
FIG. 26 illustrates one method for capturing and processing data from an original video slots game and presenting that data on a physically spinning reel having a reconfigurable display.

FIG. 26 illustrates one method of using the captured and processed data from the original video game shown in conjunction with a physically spinning reel. During game play, the gaming machine receives player input from one of the physical or touchscreen buttons to initiate a game (i.e., a reel spin) at step 1100. The spin start signal is intercepted by the new software implementing reconfigurable reels, which then passes the signal onto the conventional video reel spinning software. Also, the new software initiates the spinning of the physical reels. At step 1102, the number of frames shown (N) is set to zero (0). At step 1104, the calculated deltas for each reel for frame N are read. Depending on the delta values received, the physical reel is rotated by its motor (delta*K millimeters) at step 1106. Depending on the reel, the constant (K) determines the amount of reel rotation for one delta. Generally, the amount of reel movement is directly proportional to the delta value. For example, if the physical OLED screen wrapped around the physical reel has a dimension of 200×4400, then a delta value of 100 would dictate the reel to rotate by 1/44 (100/4400) of a complete rotation.

For each reel, the previous reel position is read in pixels at step 1108. At the same time, the position on the physical reel to draw the video image is determined by adding the delta for the reel to the previous Y position at step 1110. For example, if the previous Y position was 0 and the delta is 100, the video reel is drawn at Y position 100. At step 1112, the reel is rendered by copying the video data from the previously determined positions and extents to the correct position on the OLED screen. Using the previous example, the rendered video image is presented at (0,100). Optionally, the video image would be stretched horizontally across the full width of the OLED screen attached to the reel. At step 1114, N is incremented by one (1), and the process waits until the next video frame has been drawn in the conventional video game at step 1116. If any deltas are non-zero values, the process continues reading and drawing until all deltas are zero (i.e., until all the reels have stopped spinning at step 1118).

Figure 27:
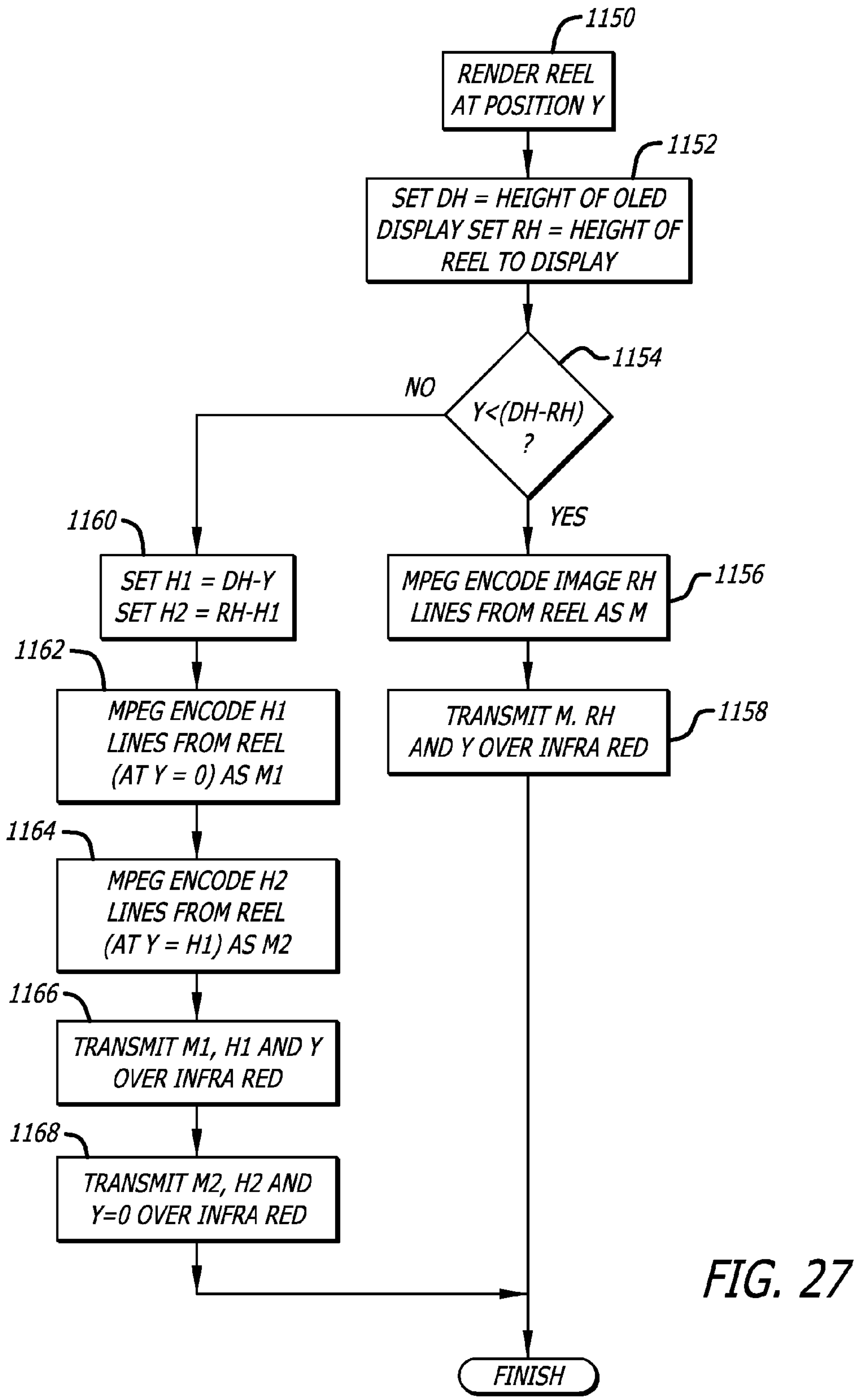
FIG. 27 illustrates on method of a video rendering process for the data captured according to FIG. 26.

FIG. 27 illustrates one method of the video rendering process. In this method, the MPEG decoder which is attached to the physical reel, receives data in the format of (M, H, Y) where M is the MPEG data to decode, H is the height of the image once decoded, and Y is the position on the OLED reel to render the decoded image. At step 1150, the location of the rendered image is determined (i.e., Position Y). At step 1152, the height (DH) of the OLED display is set, and the height (RH) of the reel to display is also set.

At step 1154, a decision is made whether or not the image should be split into two parts (i.e., is Y<(DH−RH)?). If Y is less than (DH−RH), then the MPEG encodes the image RH lines from reel as M at step 1156. The values M, RH, and Y are transmitted over the IR link to the MPEG decoder so that the image may be displayed on the OLED at step 1158. Because the OLED display is wrapped around the physical reel, the top and the bottom of the OLED display are joined together. While the reel is spinning, this joint is part of the display that is visible to the player. Accordingly, a video image may be rendered on the OLED display that will span across the joint of the display. That is, a first portion of the video image is presented on the bottom of the display and a second portion of the video image is presented on the top of the OLED display. As shown in FIG. 27, at step 1160, if Y is not less than (DH−RH), then H1=DY−Y and H2=RH−H1. In other words, the image is split at steps 1162, 1164. Specifically, at steps 1162, 1164, the MPEG encodes H1 lines of the reel image at Y=0 as M1, and H2 lines from reel at Y=H1 as M2. The values M1, H1, and Y are transmitted over the IR link to the MPEG decoder so that the image may be displayed on the bottom of the OLED display at step 1166. The values M2, H2, and Y=0 are transmitted over the IR link to the MPEG decoder so that the image may be displayed on the top of the OLED at step 1168.

In an alternative method, data for the whole OLED reel image is sent to the MPEG decoder (i.e., disregarding the Y value). In this method, the MPEG encoder would fill the remainder of the image with zeroes and send a fixed size image for the whole of the OLED display. In this method, the MPEG decoder requires less understanding of the data. That is, for example, every frame would consist of an image of 2000 pixels high (for a 2000 pixel high OLED display) with the image to be visible correctly positioned within the display. With this method, it is possible that the previously rendered image is not cleared in the decoding phase. Because the player may see a portion of the previously rendered image through the window onto the reel, the player may see near misses below the active play lines.

In either method, the encoded image(s) are sent over the infra red link and received by the MPEG decoder. The MPEG decoder decodes and places the decoded image into video memory accessible by the VGA, DVI or LVDS encoder for transfer to the OLED display.

Figure 28C:
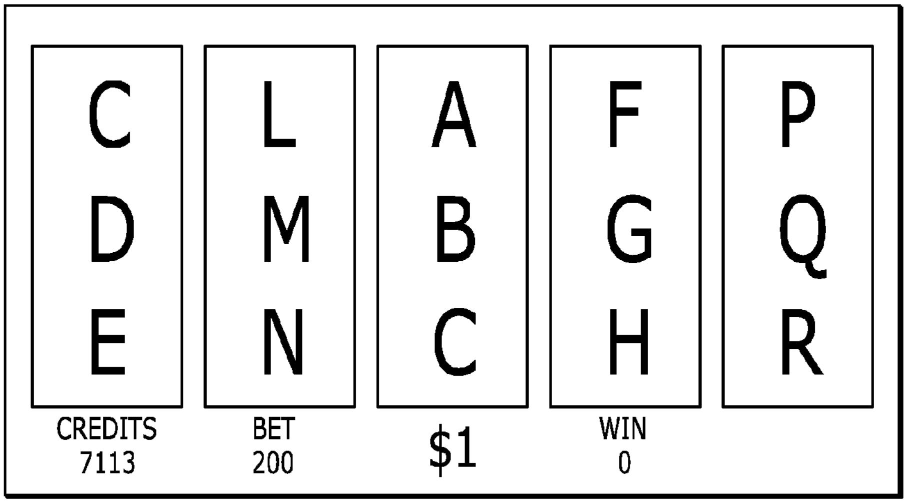
Figure 29:
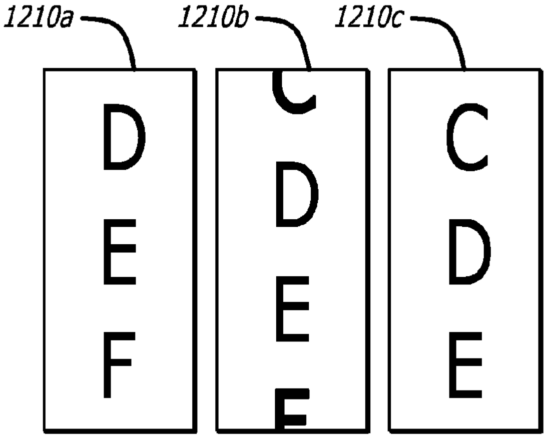
FIG. 29 shows the areas of the video gaming screen as extracted according to the method of FIG. 20.

FIGS. 28A-C illustrate screenshots of a conventional video game 1200. The game is a five-reel 1202*a-c* game with each reel each display three symbols 1204. Additionally, an information display 1206 is provided at the bottom of the video screen. The informational display 1206 presents the number of credits on the gaming machine, the bet size, wager denomination, and win amount. FIGS. 28B and 28C show the left reel 1202*a* moving down by one symbol as symbol "C" is coming into the player's view and symbol "F" is leaving the player's view. FIG. 29 shows the areas 1202*a-c* of the video gaming screen as extracted using the data generated from the process of FIG. 20 for presentation on the OLED displays.

Figure 30:
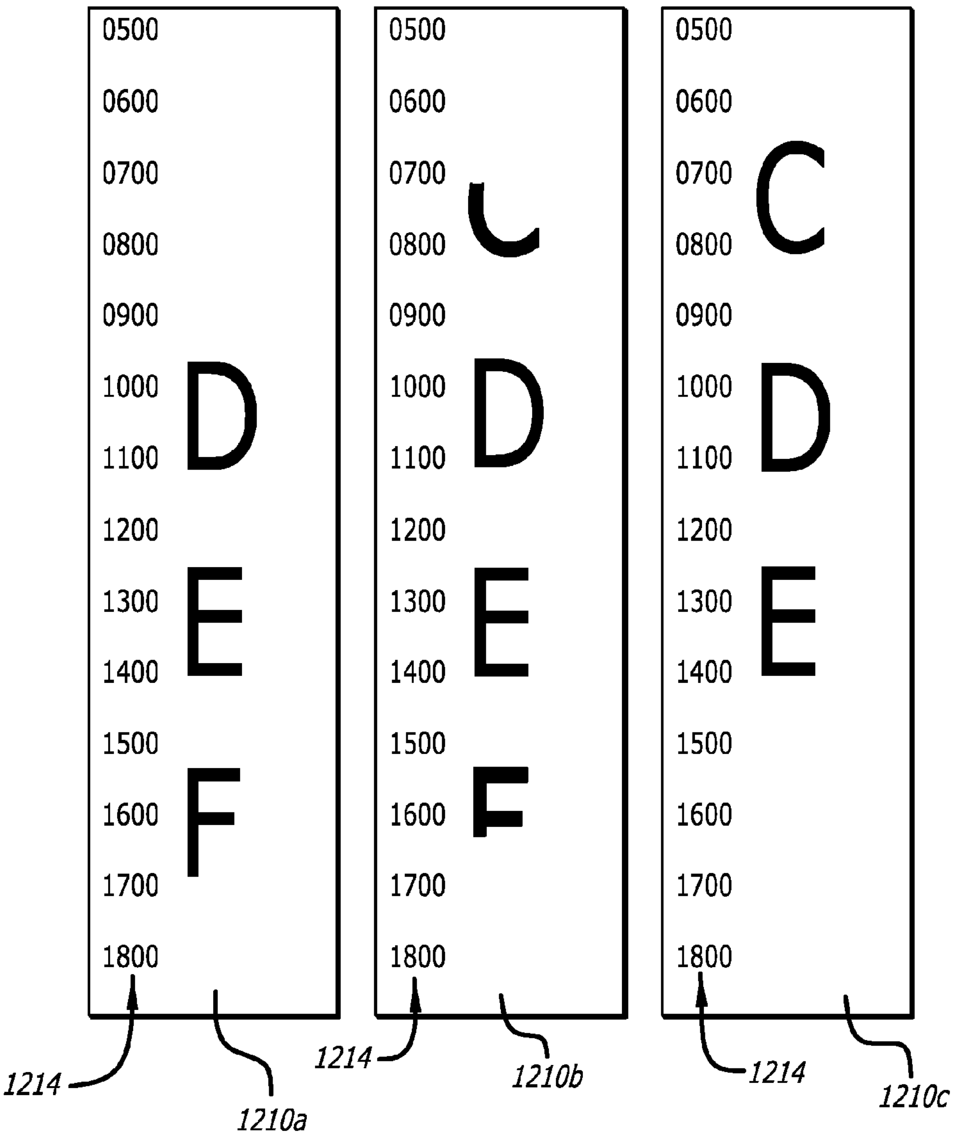
FIG. 30 illustrates the extracted areas according to the method of FIG. 28 as applied to a reconfigurable display.
Figure 31:
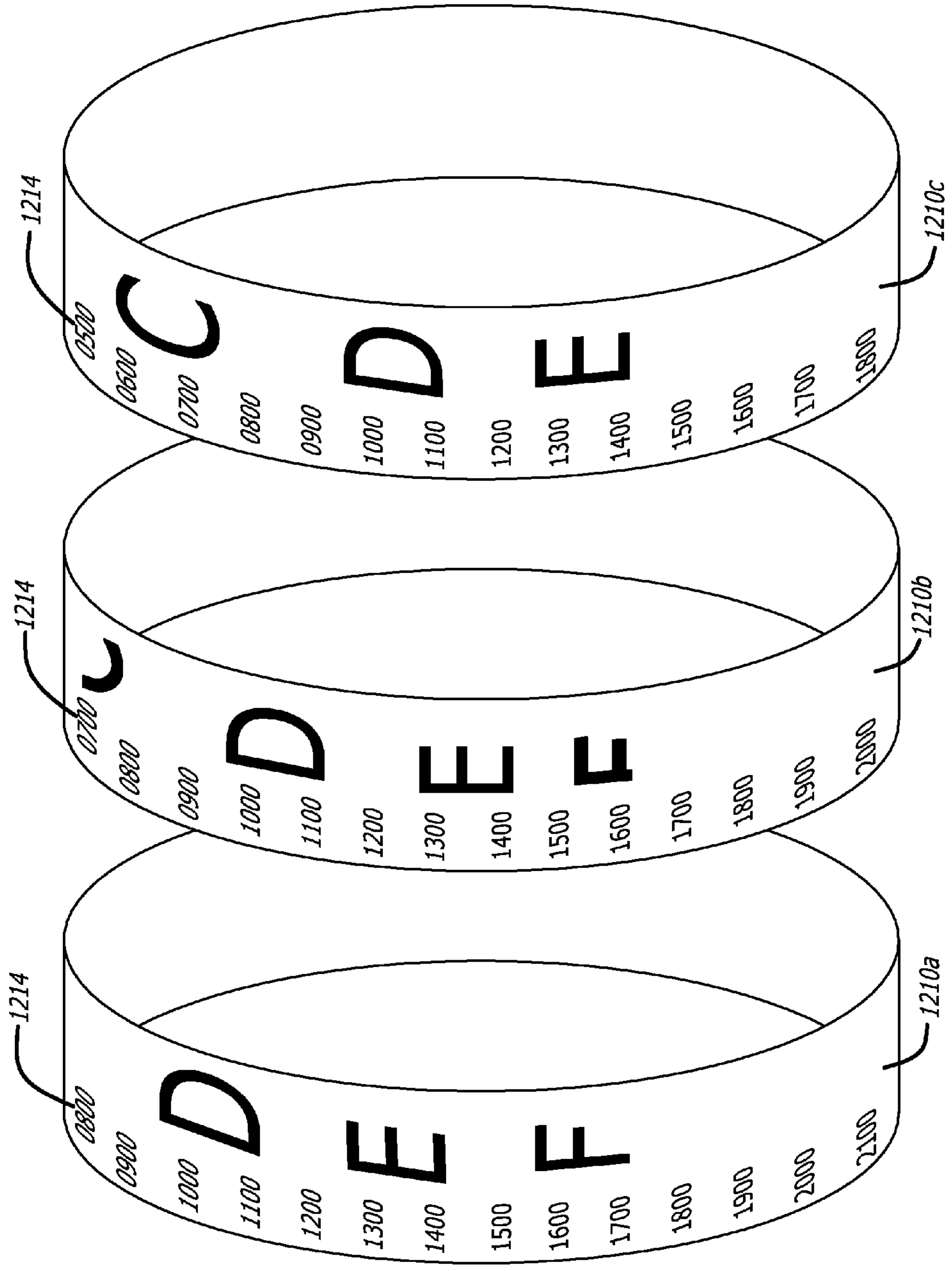
FIG. 31 illustrates the movement of game symbols on the reconfigurable display.

FIG. 30 shows these extracted areas as they are applied to the OLED screens 1210*a-c*. For the sake of explanation and not of limitation, the OLED display is not wrapped around the physical reel, and a ruler 1214 is provided on the OLED display indicating increments of 100 pixels. Normally, the ruler is not shown to a player and is merely used for illustrative purposes. As shown in FIG. 30, frames may be drawn at different positions on the OLED displays 1210*a-c* with each subsequent frame being drawn higher and higher on the OLED display using the method described in FIG. 27. Since the OLED display is attached to a physical reel that spins at the same rate in the opposite direction of the rendered image, the overall visual effect perceived by the player is that the game symbol moves vertically downwards as shown in FIG. 31.

Figure 32:
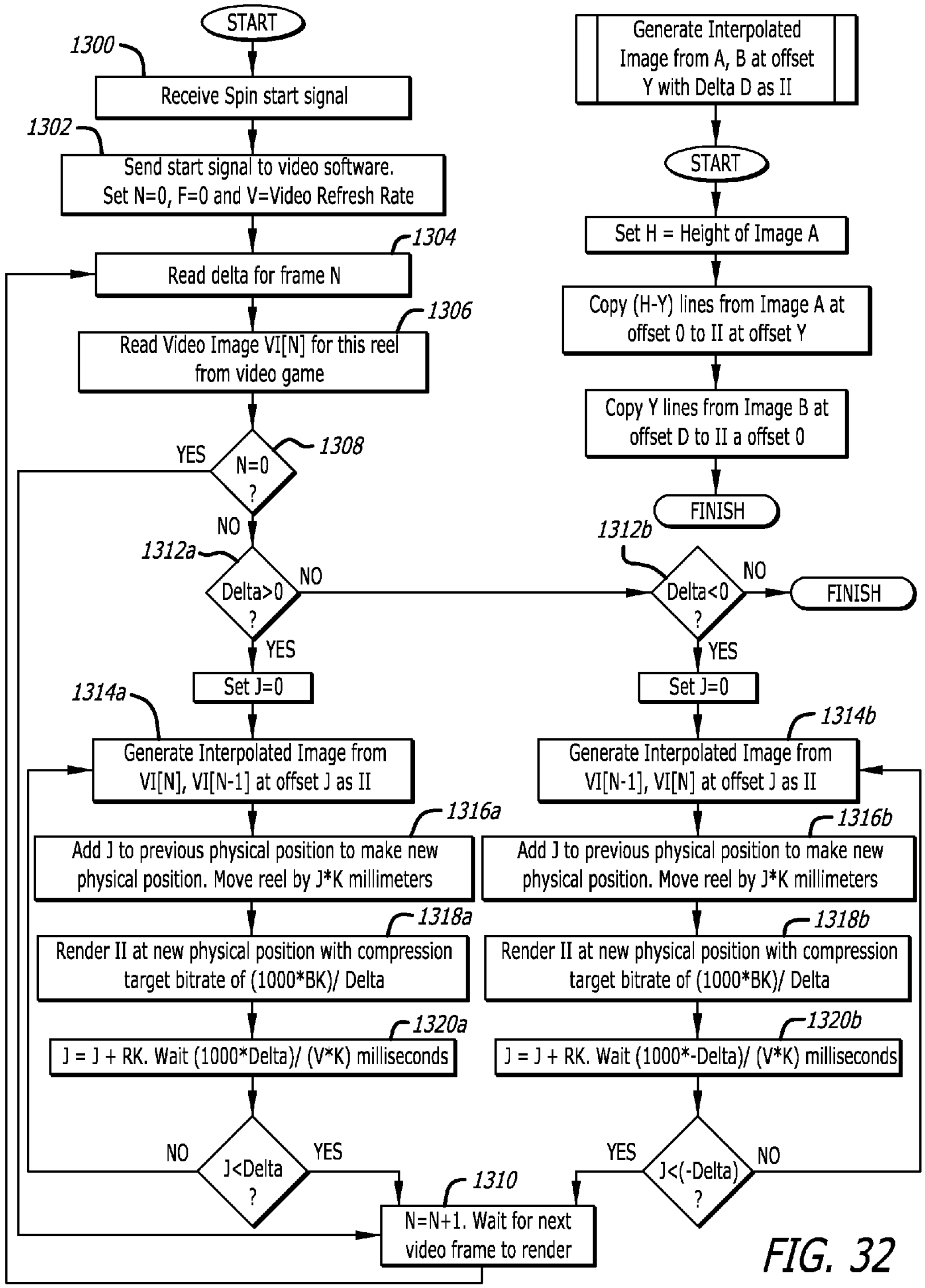
FIG. 32 illustrates one method for rendering a reel spin on a moving reconfigurable display.
Figure 33:
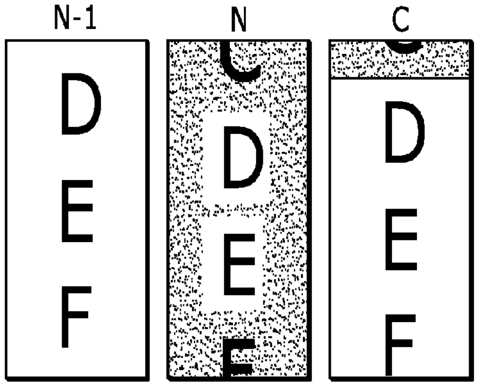
FIG. 33 illustrates one embodiment of an interpolated image presented on a reconfigurable display affixed to a downward spinning mechanical reel.

FIG. 32 illustrates another method for rendering a reel spin on a moving OLED display. Rather than moving each physical reel by the equivalent distance (or delta) to one frame increment of the video game, the physical reels move in smaller, more frequent increments with corresponding faster updates of the video being rendered on the reel. While the frame rate from the source video game is fixed (e.g., 30 frames per second (30 Hz)), images may be rendered to the OLED display at a faster rate (e.g., 120 frames per second (120 Hz). In order to increase the frame rate, the source video display is interpolated. While standard techniques take an arbitrary video and increase the frame rate, these techniques do not take into account the data generated and collected during the method disclosed in FIG. 25. Generally, the method disclosed in FIG. 32 interpolates a reel that is "scrolling" down or up based upon the delta information previously generated.

For the sake of brevity, the interpolation process of FIG. 32 is shown and described for a single reel, but the same method may be used for interpolating multiple reels concurrently. During game play, the gaming machine receives player input from one of the physical or touchscreen buttons to initiate a game (i.e., a reel spin) at step 1300. The spin start signal is intercepted by the new software implementing reconfigurable reels, which then passes the signal onto the conventional video reel spinning software at step 1302. Also, the new software initiates the spinning of the physical reels. At step 1302, the number of frames shown (N) and frames (F) are set to zero (0) and the video refresh rate (V) for the source video is established, which is normally 30 Hz.

At step 1304, the delta for the first frame is read, and the video image for this reel from the video game is read at step 1306. In the first iteration of the loop, no further processing takes place as the image is stored for interpolating to the second frame because N is zero at step 1308 and N is incremented at step 1310. On the second iteration of the loop, the second video image is received and interpolation process can begin. The delta (i.e. the vertical movement between the first and second video image) is noted. If the delta is greater than zero at step 1312*a*, the image has a downward vertical movement and the composite images according to steps 1314*a*, 1316*a*, and 1320*a*. Otherwise, the vertical movement is upwards and the images are rendered according to steps 1314*b*, 1316*b*, and 1320*b*.

For a number of intermediate frames, a composite image is generated from the two video images—the last received (Image N) and the one received prior to the last received (Image N−1) at step 1314*a*. In the case of a downward vertical movement, most of the composite image is copied from image (N−1), with a small amount taken from the Image N placed at the top of the composite image. For example, if a downwardly-moving reel image has a height of 200 rows, a delta of 50 rows, and the interpolation amount is ⅕th of the delta (i.e., 10 rows), the composite image is composed of 10 rows from row 40 of Image N, followed by 190 rows from the top of Image (N−1). FIG. 32 illustrates one example of an interpolated image of a downward moving reel image. As shown in FIG. 32, most of the composite image is compose of Image N−1 and a small portion is taken from Image N (which has been shaded for easier differentiation). In the case of an upward vertical movement, the source images (Image N and Image (N−1)) are swapped, but the process is otherwise identical.

After the interpolated image is generated, the physical reel motor is used to rotate the reel by a calculated amount. The composition image is positioned and drawn according to the method disclosed in FIGS. 27-32. In one method, variable data compression is used to generate MPEG frames. Data compression used to generate the MPEG frame is varied so that large delta values (indicating a fast spinning of the reel) have a lower compression bitrate. In this method, the constant bitrate (BK as shown in FIG. 32) is divided by the Delta value at step 1318*a*, 1318*b*. Lowering the compression bitrate for higher deltas ensures that increasing the frame rate does not exceed the capacity of the infra-red link.

Figure 34A:
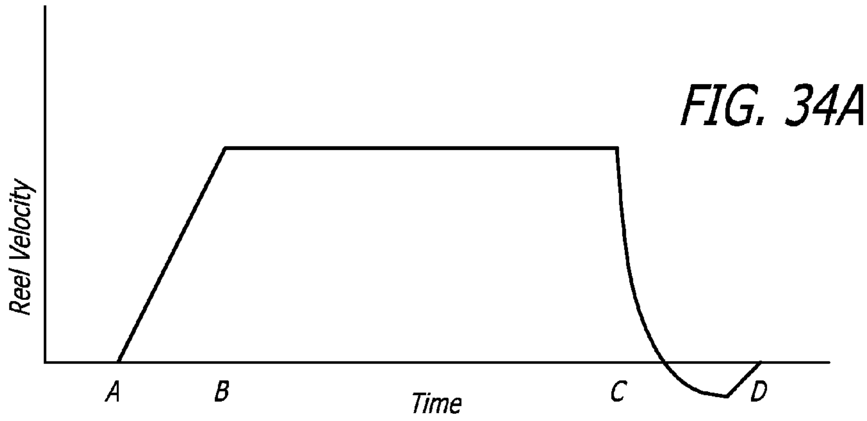
FIGS. 34A-34B are charts illustrating an embodiment of varying video compression on a reconfigurable display based on the underlying velocity of the associated reel.
Figure 34B:
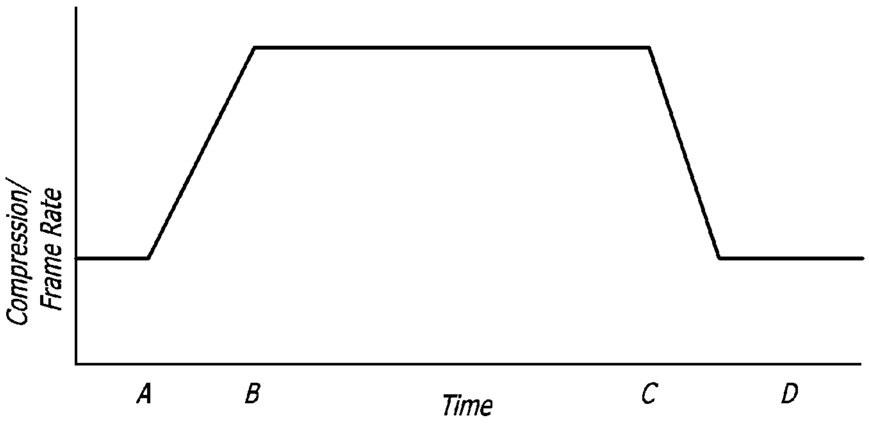

FIGS. 34A-B illustrate one embodiment of varying video compression based upon the underlying velocity of an associated reel during a conventional reel spin over a period of time. Before point A, the game is in idle mode awaiting player input. Point A denotes the instant that a player presses the spin button, thereby causing the reel velocity to increase to a maximum speed and the compression and frame (interpolation) rate to increase correspondingly. At Point B, the reel spin has reached its peak velocity, and this velocity is maintained until point C. At Point C, the reels start to decelerate, and the compression rate/frame rate drops accordingly. Between Points C and D (the end of the reel spin when the game ends), the reel velocity drops below zero as the video reel spin simulates a "kickback" and the reel momentarily reverses direction. The compression rate does not drop below zero because the compression rate is based upon the absolute value of the delta between two frames.

Returning to the method shown in FIG. 32, after an interpolated image is generated, encoded and rendered, a constant is added to the interpolated image. This constant determines the amount of interpolation. For example, a constant value of 1 would have a very high frame rate and high interpolation accuracy (i.e., the reel would move at one row at a time). The constant value is generally based upon the performance characteristics of the OLED reel (maximum refresh rate), MPEG encoder/decoder bandwidth, and IR link bandwidth. At steps 1320*a*, 1320*b*, the method waits for a period of time based on one video game refresh time divided by the number of interpolations of the delta. The method then repeats for every interpolation of Image N and Image N−1. After the interpolations are completed, N is incremented and the whole process repeats until the reel has stopped spinning (i.e., Delta=0).

Figure 35:
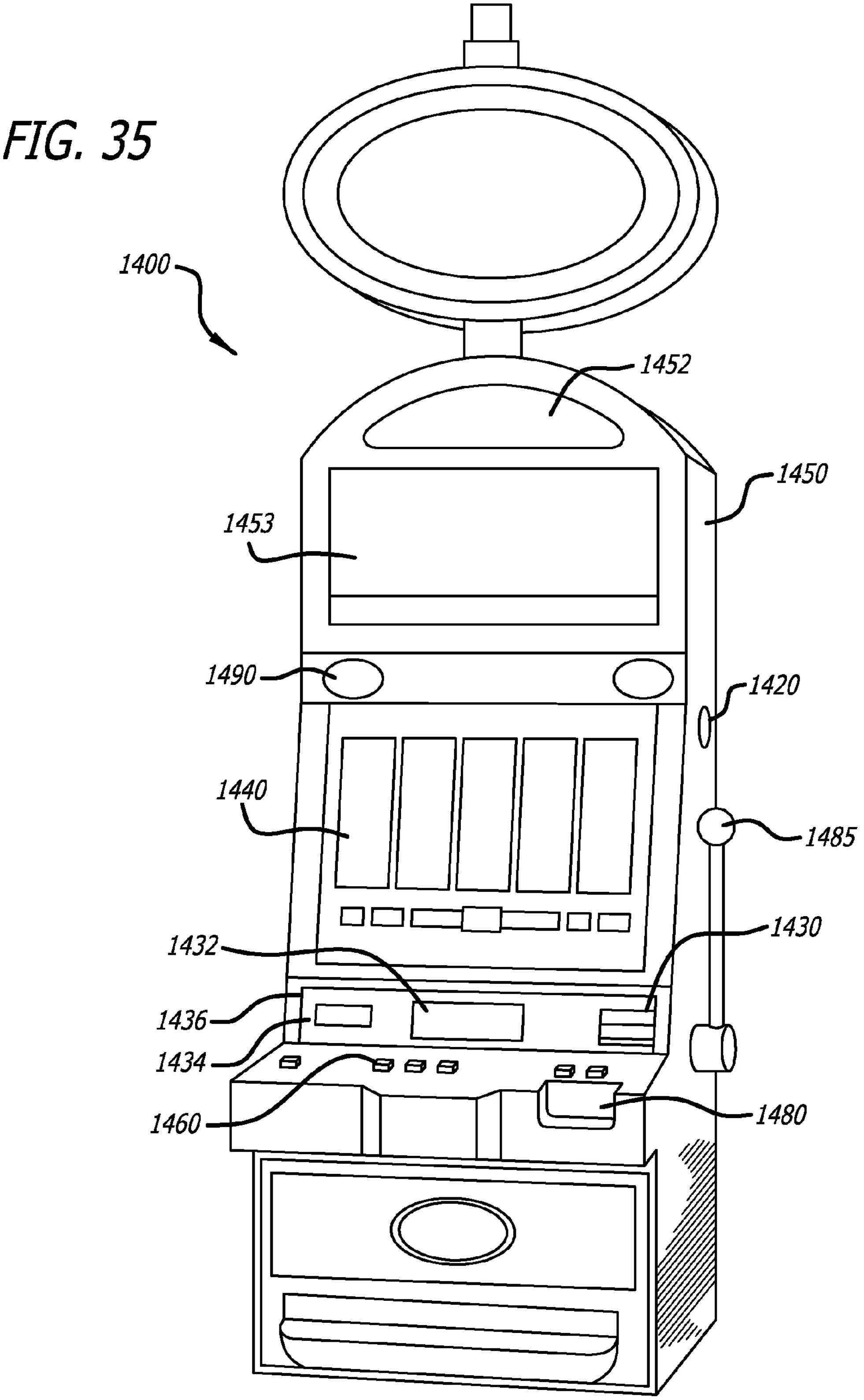
FIG. 35 is a perspective view of one embodiment of a gaming machine in accordance with one or more embodiments.
Figure 36:
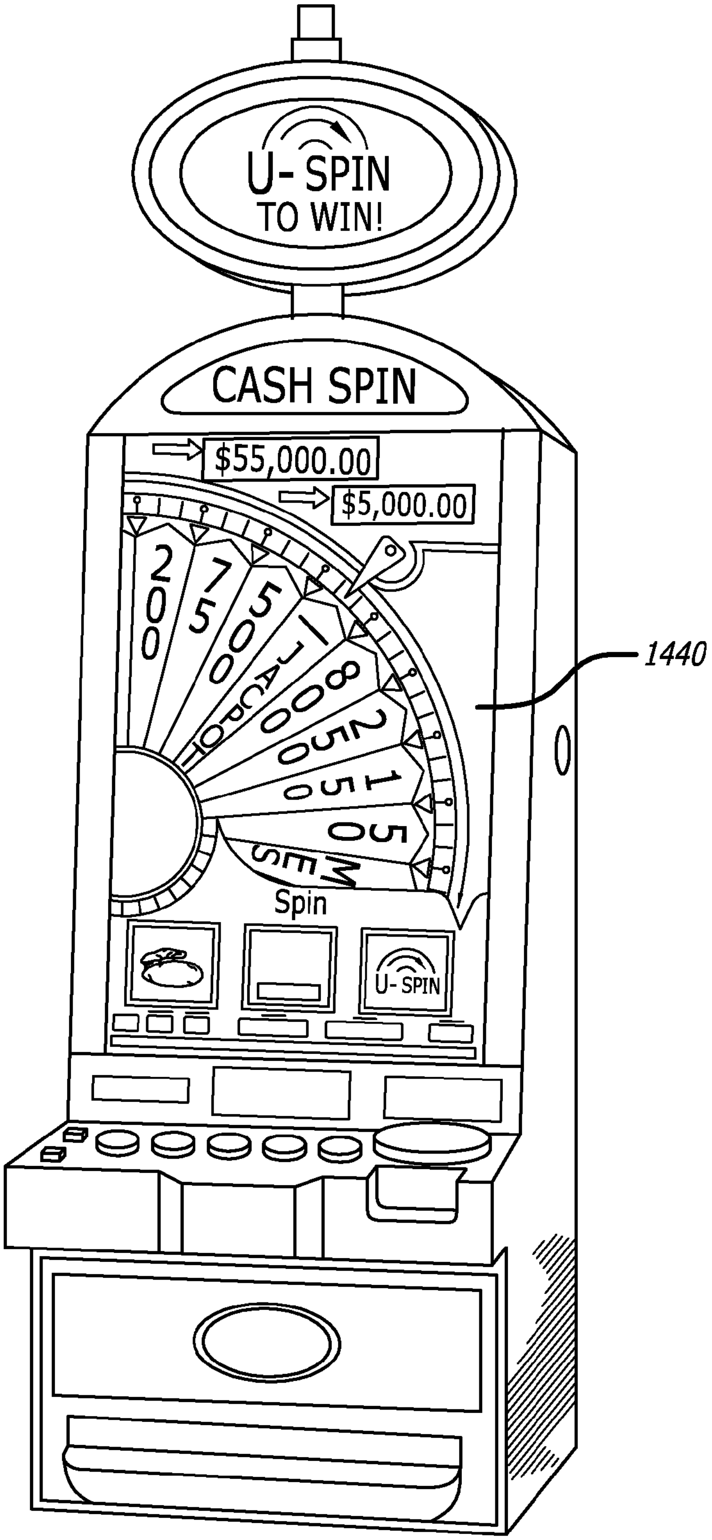
FIG. 36 is a perspective view of one embodiment of a gaming machine in accordance with one or more embodiments.

In accordance with one or more embodiments, FIG. 35 illustrates a gaming machine 1400 including cabinet housing 1420, primary game display 1440 upon which a primary game and feature game may be displayed, top box 1450 which may display multiple progressives that may be won during play of the primary or feature game, player-activated buttons 1460, player tracking panel 1436, bill/voucher acceptor 1480 and one or more speakers 1490. Cabinet housing 1420 is a self-standing unit that is generally rectangular in shape and may be manufactured with reinforced steel or other rigid materials which are resistant to tampering and vandalism. Cabinet housing 1420 houses a processor, circuitry, and software (not shown) for receiving signals from the player-activated buttons 1460, operating the games, and transmitting signals to the respective displays and speakers. Any shaped cabinet may be implemented with any embodiment of gaming machine 1400 so long as it provides access to a player for playing a game. For example, cabinet 1420 may comprise a slant-top, bar-top, or table-top style cabinet. The operation of gaming machine 1400 is described more fully below.

The plurality of player-activated buttons 1460 may be used for various functions such as, but not limited to, selecting a wager denomination, selecting a game to be played, selecting a wager amount per game, initiating a game, or cashing out money from gaming machine 1400. Buttons 1460 function as input mechanisms and may include mechanical buttons, electromechanical buttons or touch screen buttons. Optionally, a handle 1485 may be rotated by a player to initiate a game.

In other embodiments, buttons 1460 may be replaced with various other input mechanisms known in the art such as, but not limited to, a touch screen system, touch pad, track ball, mouse, switches, toggle switches, or other input means used to accept player input. For example, one input means is a universal button module as disclosed in U.S. application Ser. No. 11/106,212, entitled "Universal Button Module," filed on Apr. 14, 2005, which is hereby incorporated in its entirety by reference. Generally, the universal button module provides a dynamic button system adaptable for use with various games and capable of adjusting to gaming systems having frequent game changes. More particularly, the universal button module may be used in connection with playing a game on a gaming machine and may be used for such functions as selecting the number of credits to bet per hand. In other embodiments, a virtual button deck may be used to provide similar capabilities. An example of a virtual button deck is disclosed in U.S. application Ser. No. 11/938,203, entitled, "Game Related Systems, Methods, and Articles That Combine Virtual and Physical Elements," filed on Nov. 9, 2007, hereby incorporated in its entirety by reference.

Cabinet housing 1420 may optionally include top box 1450 which contains "top glass" 1452 comprising advertising or payout information related to the game or games available on gaming machine 1400. Player tracking panel 1436 includes player tracking card reader 1434 and player tracking display 1432. Voucher printer 1430 may be integrated into player tracking panel 1436 or installed elsewhere in cabinet housing 1420 or top box 1450.

Game display 1440 presents a game of chance wherein a player receives one or more outcomes from a set of potential outcomes. For example, one such game of chance is a video slot machine game. In other aspects of the invention, gaming machine 1400 may present a video or mechanical reel slot machine, a video keno game, a lottery game, a bingo game, a Class II bingo game, a roulette game, a craps game, a blackjack game, a mechanical or video representation of a primary wheel game or the like.

Mechanical or video/mechanical embodiments may include game displays such as mechanical reels, wheels, or dice as required to present the game to the player. In video/mechanical or pure video embodiments, game display 1440 is, typically, a CRT or a flat-panel display in the form of, but not limited to, liquid crystal, plasma, electroluminescent, vacuum fluorescent, field emission, or any other type of panel display known or developed in the art. Game display 1440 may be mounted in either a "portrait" or "landscape" orientation and be of standard or "widescreen" dimensions (i.e., a ratio of one dimension to another of at least 16×9). For example, a widescreen display may be 32 inches wide by 18 inches tall. A widescreen display in a "portrait" orientation may be 32 inches tall by 18 inches wide. FIG. 36A illustrates an example of a portrait mode game display 1440 having widescreen dimensions in accordance with one embodiment of the invention. Additionally, game display 1440 preferably includes a touch screen or touch glass system (not shown) and presents player interfaces such as, but not limited to, credit meter (not shown), win meter (not shown) and touch screen buttons (not shown). An example of a touch glass system is disclosed in U.S. Pat. No. 6,942,571, entitled "Gaming Device with Direction and Speed Control of Mechanical Reels Using Touch Screen," which is hereby incorporated by reference. Furthermore, as described above, game display 1440 may include transparent portions which cover and may interact with displays on mechanical reels, as described in U.S. application Ser. No. 12/113,112, entitled, "Mechanical Reels With Interactive Display," filed on Apr. 30, 2008, hereby incorporated in its entirety by reference.

Game display 1440 may also present information such as, but not limited to, player information, advertisements and casino promotions, graphic displays, news and sports updates, or even offer an alternate game. This information may be generated through a host computer networked with gaming machine 1400 on its own initiative or it may be obtained by request of the player using either one or more of the plurality of player-activated buttons 1460; the game display itself, if game display 1440 comprises a touch screen or similar technology; buttons (not shown) mounted about game display 1440 which may permit selections such as those found on an ATM machine, where legends on the screen are associated with respective selecting buttons; or any player input device that offers the required functionality.

Cabinet housing 1420 incorporates a single game display 440. However, in alternate embodiments, cabinet housing 1420 or top box 1450 may house one or more additional displays 1453 or components used for various purposes including additional game play screens, animated "top glass," progressive meters or mechanical or electromechanical devices (not shown) such as, but not limited to, wheels, pointers or reels. The additional displays may or may not include a touch screen or touch glass system.

Figure 37A:
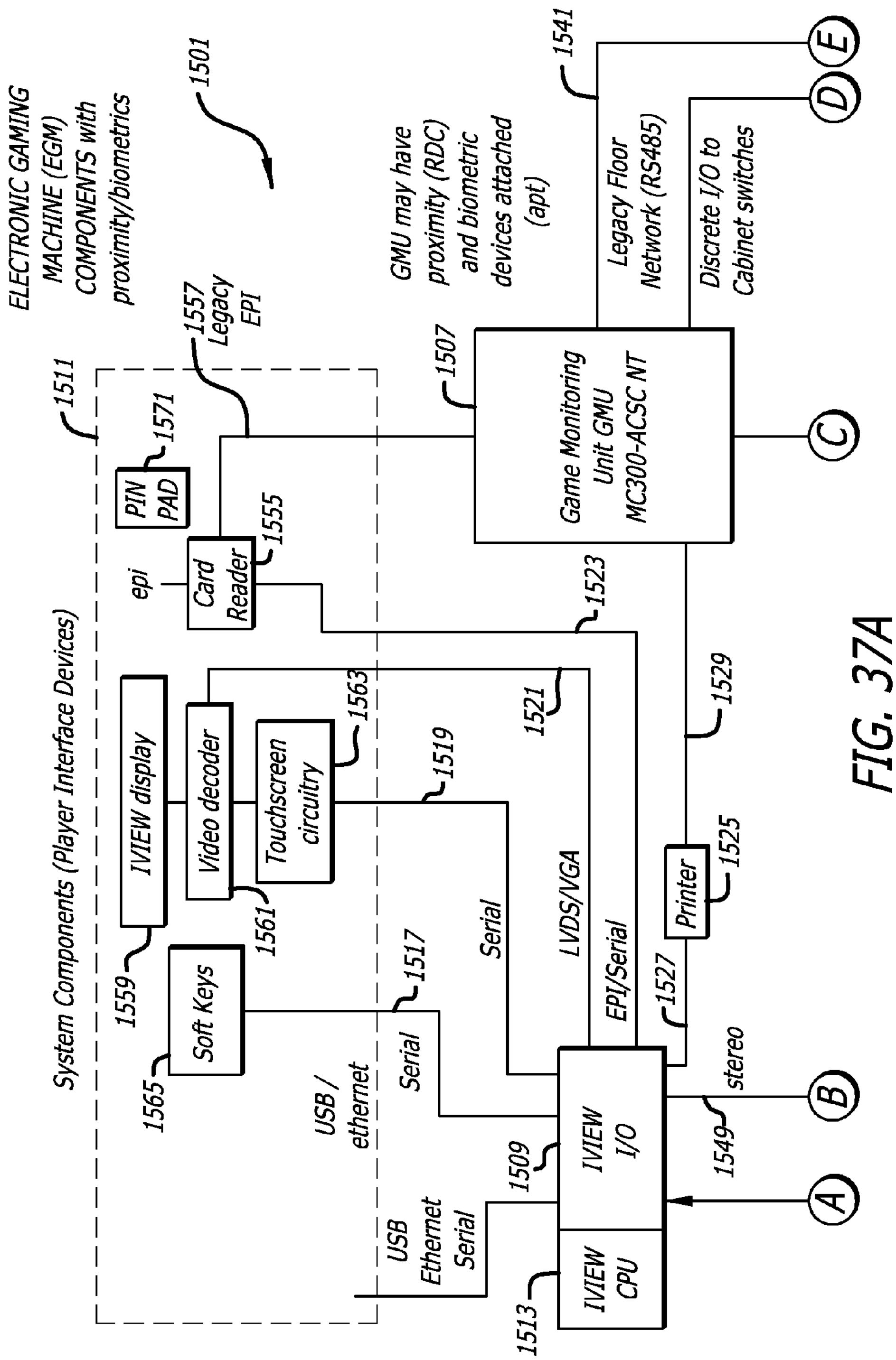
FIGS. 37A-37B are block diagrams of the physical and logical components of one embodiment of a gaming machine.
Figure 37B:
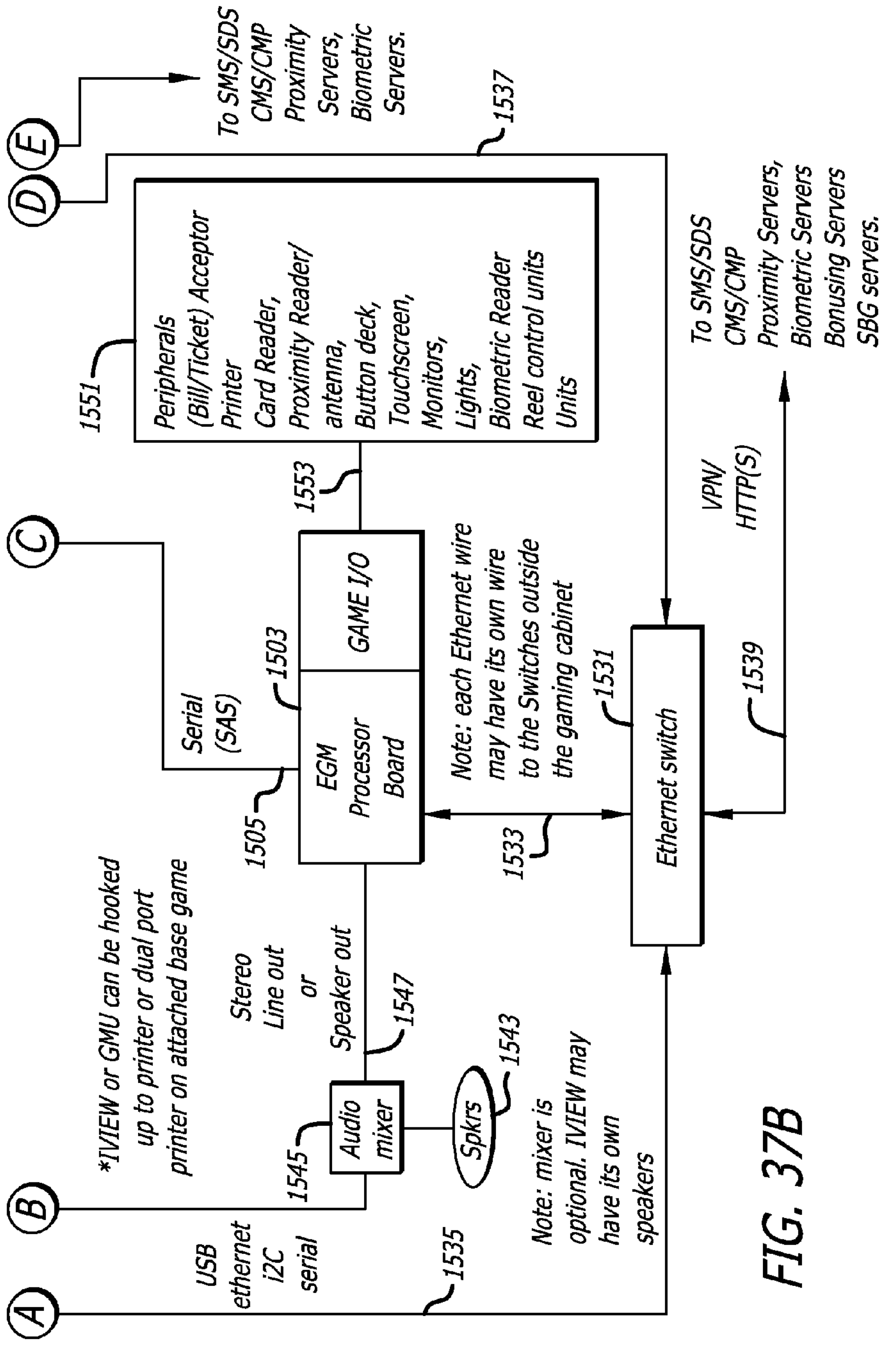

Referring to FIGS. 37A-37B, electronic gaming machine 1501 is shown in accordance with one or more embodiments. Electronic gaming machine 1501 includes base game integrated circuit board 1503 (EGM Processor Board) connected through serial bus line 1505 to game monitoring unit (GMU) 1507 (such as a Bally MC300 or ACSC NT), and player interface integrated circuit board (PIB) 1509 connected to player interface devices 1511 over bus lines 1513, 1515, 1517, 1519, 1521, 1523. Printer 1525 is connected to PIB 1509 and GMU 1507 over bus lines 1527, 1529. EGM Processor Board 1503, PIB 1509, and GMU 1507 connect to Ethernet switch 1531 over bus lines 1533, 1535, 1537. Ethernet switch 1531 connects to a slot management system (SMS) and a casino management system (CMS) network over bus line 1539. GMU 1507 also may connect to the SMS and CMS network over bus line 1541. Speakers 1543 connect through audio mixer 1545 and bus lines 1547, 1549 to EGM Processor Board 1503 and PIB 1509. The proximity and biometric devices and circuitry may be installed by upgrading a commercially available PIB 1509, such as a Bally iView unit. Coding executed on EGM Processor Board 1503, PID 1509, and/or GMU 1507 may be upgraded to integrate a game having an interactive wheel game as is more fully described herein.

Peripherals 1551 connect through bus 1553 to EGM Processor Board 1503. For example, a bill/ticket acceptor is typically connected to a game input-output board 1553 which is, in turn, connected to a conventional central processing unit ("CPU") board 1503, such as an Intel Pentium microprocessor mounted on a gaming motherboard. I/O board 1553 may be connected to CPU processor board 1503 by a serial connection such as RS-232 or USB or may be attached to the processor by a bus such as, but not limited to, an ISA bus. The gaming motherboard may be mounted with other conventional components, such as are found on conventional personal computer motherboards, and loaded with a game program which may include a gaming machine operating system (OS), such as a Bally Alpha OS. Processor board 1503 executes a game program that causes processor board 1503 to play a game. In one embodiment, the game program provides a slot machine game having an interactive wheel feature game. The various components and included devices may be installed with conventionally and/or commercially available components, devices, and circuitry into a conventional and/or commercially available gaming machine cabinet, examples of which are described above.

When a player has inserted a form of currency such as, for example and without limitation, paper currency, coins or tokens, cashless tickets or vouchers, electronic funds transfers or the like into the currency acceptor, a signal is sent by way of I/O board 1553 to processor board 1503 which, in turn, assigns an appropriate number of credits for play in accordance with the game program. The player may further control the operation of the gaming machine by way of other peripherals 1551, for example, to select the amount to wager via electromechanical or touch screen buttons. The game starts in response to the player operating a start mechanism such as a handle or touch screen icon. The game program includes a random number generator to provide a display of randomly selected indicia on one or more displays. In some embodiments, the random generator may be physically separate from gaming machine 1400; for example, it may be part of a central determination host system which provides random game outcomes to the game program. Thereafter, the player may or may not interact with the game through electromechanical or touch screen buttons to change the displayed indicia. Finally, processor board 1503 under control of the game program and OS compares the final display of indicia to a pay table. The set of possible game outcomes may include a subset of outcomes related to the triggering of a feature game. In the event the displayed outcome is a member of this subset, processor board 1503, under control of the game program and by way of I/O Board 1553, may cause feature game play to be presented on a feature display.

Predetermined payout amounts for certain outcomes, including feature game outcomes, are stored as part of the game program. Such payout amounts are, in response to instructions from processor board 1503, provided to the player in the form of coins, credits or currency via I/O board 1553 and a pay mechanism, which may be one or more of a credit meter, a coin hopper, a voucher printer, an electronic funds transfer protocol or any other payout means known or developed in the art.

In various embodiments, the game program is stored in a memory device (not shown) connected to or mounted on the gaming motherboard. By way of example, but not by limitation, such memory devices include external memory devices, hard drives, CD-ROMs, DVDs, and flash memory cards. In an alternative embodiment, the game programs are stored in a remote storage device. In one embodiment, the remote storage device is housed in a remote server. The gaming machine may access the remote storage device via a network connection, including but not limited to, a local area network connection, a TCP/IP connection, a wireless connection, or any other means for operatively networking components together. Optionally, other data including graphics, sound files and other media data for use with the EGM are stored in the same or a separate memory device (not shown). Some or all of the game program and its associated data may be loaded from one memory device into another, for example, from flash memory to random access memory (RAM).

In one or more embodiments, peripherals may be connected to the system over Ethernet connections directly to the appropriate server or tied to the system controller inside the EGM using USB, serial or Ethernet connections. Each of the respective devices may have upgrades to their firmware utilizing these connections.

GMU 1507 includes an integrated circuit board and GMU processor and memory including coding for network communications, such as the G2S (game-to-system) protocol from the Gaming Standards Association, Las Vegas, Nev., used for system communications over the network. As shown, GMU 1507 may connect to card reader 1555 through bus 1557 and may thereby obtain player card information and transmit the information over the network through bus 1541. Gaming activity information may be transferred by the EGM Processor Board 1503 to GMU 1507 where the information may be translated into a network protocol, such as S2S, for transmission to a server, such as a player tracking server, where information about a player's playing activity may be stored in a designated server database.

PID 1509 includes an integrated circuit board, PID processor, and memory which includes an operating system, such as Windows CE, a player interface program which may be executable by the PID processor together with various input/output (I/O) drivers for respective devices which connect to PID 1509, such as player interface devices 1511, and which may further include various games or game components playable on PID 1509 or playable on a connected network server and PID 1509 is operable as the player interface. PID 1509 connects to card reader 1555 through bus 1523, display 1559 through video decoder 1561 and bus 1521, such as an LVDS or VGA bus.

As part of its programming, the PID processor executes coding to drive display 1559 and provide messages and information to a player. Touch screen circuitry interactively connects display 1559 and video decoder 1561 to PID 1509, such that a player may input information and cause the information to be transmitted to PID 1509 either on the player's initiative or responsive to a query by PID 1509. Additionally soft keys 1565 connect through bus 1517 to PID 1509 and operate together with display 1559 to provide information or queries to a player and receive responses or queries from the player. PID 1509, in turn, communicates over the CMS/SMS network through Ethernet switch 1531 and busses 1535, 1539 and with respective servers, such as a player tracking server.

Player interface devices 1511 are linked into the virtual private network of the system components in gaming machine 1501. The system components include the iVIEW processing board and game monitoring unit (GMU) processing board. These system components may connect over a network to the slot management system (such as a commercially available Bally SDS/SMS) and/or casino management system (such as a commercially available Bally CMP/CMS).

The GMU system component has a connection to the base game through a serial SAS connection and is connected to various servers using, for example, HTTPs over Ethernet. Through this connection, firmware, media, operating system software, gaming machine configurations can be downloaded to the system components from the servers. This data is authenticated prior to install on the system components.

The system components include the iVIEW processing board and game monitoring unit (GMU) processing board. The GMU and iVIEW can combined into one like the commercially available Bally GTM iVIEW device. This device may have a video mixing technology to mix the EGM processor's video signals with the iVIEW display onto the top box monitor or any monitor on the gaming device.

Figure 38:
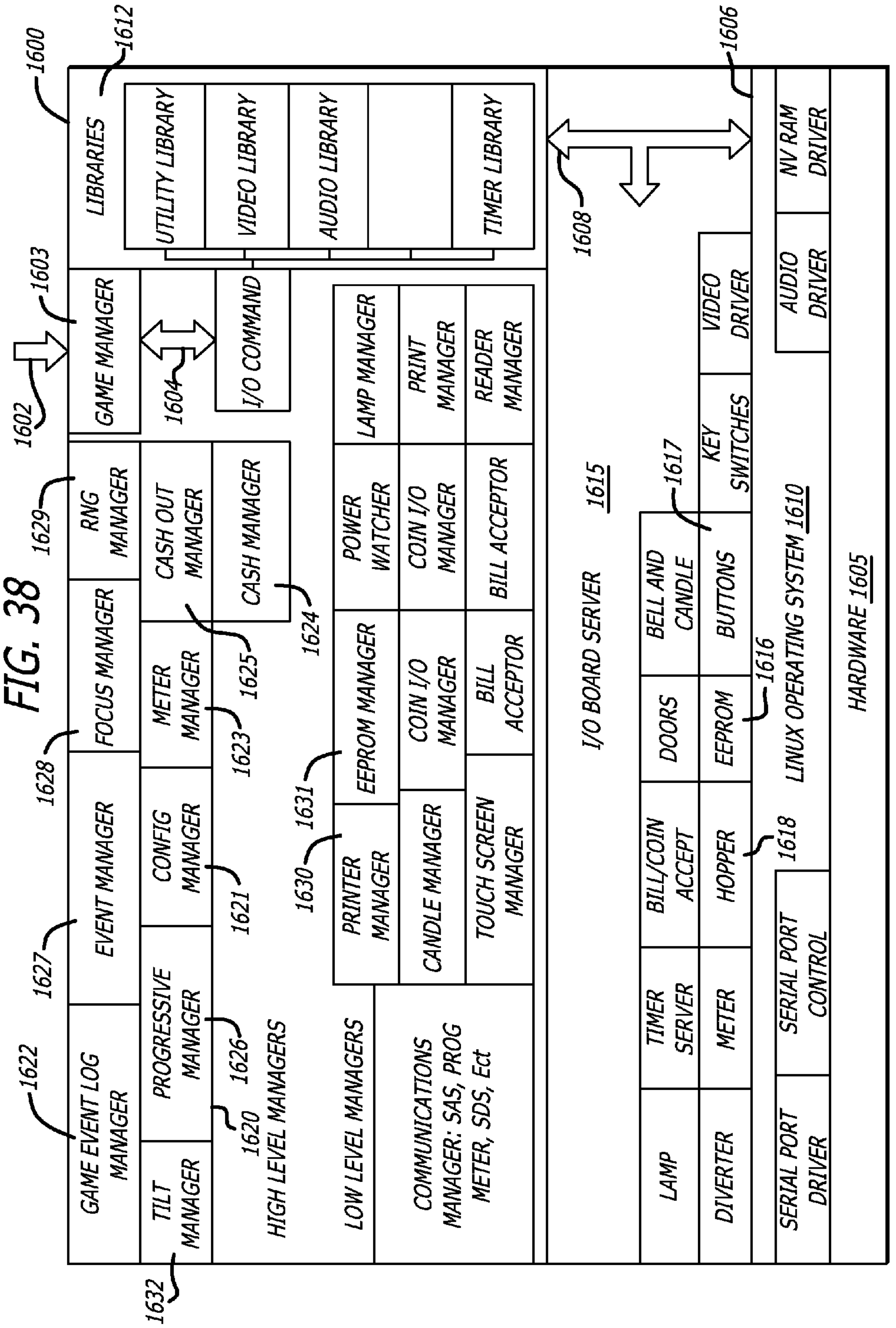
FIG. 38 is a block diagram of the logical components of a gaming kernel in accordance with one or more embodiments of the invention.

In accordance with one or more embodiments, FIG. 38 is a functional block diagram of a gaming kernel 1600 of a game program under control of processor board 1503, uses gaming kernel 1600 by calling into application programming interface (API) 1602, which is part of game manager 1603. The components of game kernel 1600 as shown in FIG. 8 are only illustrative, and should not be considered limiting. For example, the number of managers may be changed, additional managers may be added or some managers may be removed without deviating from the scope and spirit of the invention.

As shown in the example, there are three layers: a hardware layer 1605; an operating system layer 1610, such as, but not limited to, Linux; and a game kernel layer 1600 having game manager 1603 therein. In one or more embodiments, the use of a standard operating system 1610, such a UNIX-based or Windows-based operating system, allows game developers interfacing to the gaming kernel to use any of a number of standard development tools and environments available for the operating systems. This is in contrast to the use of proprietary, low level interfaces which may require significant time and engineering investments for each game upgrade, hardware upgrade, or feature upgrade. The game kernel layer 1600 executes at the user level of the operating system 1610, and itself contains a major component called the I/O Board Server 1615. To properly set the bounds of game application software (making integrity checking easier), all game applications interact with gaming kernel 1600 using a single API 1602 in game manager 1603. This enables game applications to make use of a well-defined, consistent interface, as well as making access points to gaming kernel 1600 controlled, where overall access is controlled using separate processes.

For example, game manager 1603 parses an incoming command stream and, when a command dealing with I/O comes in (arrow 1604), the command is sent to an applicable library routine 1612. Library routine 1612 decides what it needs from a device, and sends commands to I/O Board Server 1615 (see arrow 1608). A few specific drivers remain in operating system 1610's kernel, shown as those below line 1606. These are built-in, primitive, or privileged drivers that are (i) general (ii) kept to a minimum and (iii) are easier to leave than extract. In such cases, the low-level communications is handled within operating system 1610 and the contents passed to library routines 1612.

Thus, in a few cases library routines may interact with drivers inside operating system 1610, which is why arrow 1608 is shown as having three directions (between library utilities 1612 and I/O Board Server 1615, or between library utilities 1612 and certain drivers in operating system 1610). No matter which path is taken, the logic needed to work with each device is coded into modules in the user layer of the diagram. Operating system 1610 is kept as simple, stripped down, and common across as many hardware platforms as possible. The library utilities and user-level drivers change as dictated by the game cabinet or game machine in which it will run. Thus, each game cabinet or game machine may have an industry standard processor board 1505 connected to a unique, relatively dumb, and as inexpensive as possible I/O adapter board 1540, plus a gaming kernel 1600 which will have the game-machine-unique library routines and I/O Board Server 1615 components needed to enable game applications to interact with the gaming machine cabinet. Note that these differences are invisible to the game application software with the exception of certain functional differences (i.e., if a gaming cabinet has stereo sound, the game application will be able make use of API 1602 to use the capability over that of a cabinet having traditional monaural sound).

Game manager 1603 provides an interface into game kernel 1600, providing consistent, predictable, and backwards compatible calling methods, syntax, and capabilities by way of game application API 1602. This enables the game developer to be free of dealing directly with the hardware, including the freedom to not have to deal with low-level drivers as well as the freedom to not have to program lower level managers 1630, although lower level managers 1630 may be accessible through game manager 1603's interface 1602 if a programmer has the need. In addition to the freedom derived from not having to deal with the hardware level drivers and the freedom of having consistent, callable, object-oriented interfaces to software managers of those components (drivers), game manager 1603 provides access to a set of upper level managers 1620 also having the advantages of consistent callable, object-oriented interfaces, and further providing the types and kinds of base functionality required in casino-type games. Game manager 1603, providing all the advantages of its consistent and richly functional interface 1602 as supported by the rest of game kernel 1600, thus provides a game developer with a multitude of advantages.

Game manager 1603 may have several objects within itself, including an initialization object (not shown). The initialization object performs the initialization of the entire game machine, including other objects, after game manager 1603 has started its internal objects and servers in appropriate order. In order to carry out this function, the kernel's configuration manager 1621 is among the first objects to be started; configuration manager 1621 has data needed to initialize and correctly configure other objects or servers.

The upper level managers 1620 of game kernel 1600 may include game event log manager 1622 which provides, at the least, a logging or logger base class, enabling other logging objects to be derived from this base object. The logger object is a generic logger; that is, it is not aware of the contents of logged messages and events. The log manager's (1622) job is to log events in non-volatile event log space. The size of the space may be fixed, although the size of the logged event is typically not. When the event space or log space fills up, one embodiment will delete the oldest logged event (each logged event will have a time/date stamp, as well as other needed information such as length), providing space to record the new event. In this embodiment, the most recent events will thus be found in the log space, regardless of their relative importance. Further provided is the capability to read the stored logs for event review.

In accordance with one embodiment, meter manager 1623 manages the various meters embodied in the game kernel 1600. This includes the accounting information for the game machine and game play. There are hard meters (counters) and soft meters; the soft meters may be stored in non-volatile storage such as non-volatile battery-backed RAM to prevent loss. Further, a backup copy of the soft meters may be stored in a separate non-volatile storage such as EEPROM. In one embodiment, meter manager 1623 receives its initialization data for the meters, during startup, from configuration manager 1621. While running, the cash in (1624) and cash out (1625) managers call the meter manager's (1623) update functions to update the meters. Meter manager 1623 will, on occasion, create backup copies of the soft meters by storing the soft meters' readings in EEPROM. This is accomplished by calling and using EEPROM manager 631.

In accordance with still other embodiments, progressive manager 1626 manages progressive games playable from the game machine. Event manager 1627 is generic, like log manager 1622, and is used to manage various gaming machine events. Focus manager 1628 correlates which process has control of various focus items. Tilt manager 1632 is an object that receives a list of errors (if any) from configuration manager 1621 at initialization, and during game play from processes, managers, drivers, etc. that may generate errors. Random number generator manager 1629 is provided to allow easy programming access to a random number generator (RNG), as a RNG is required in virtually all casino-style (gambling) games. RNG manager 1629 includes the capability of using multiple seeds.

In accordance with one or more embodiments, a credit manager object (not shown) manages the current state of credits (cash value or cash equivalent) in the game machine, including any available winnings, and further provides denomination conversion services. Cash out manager 1625 has the responsibility of configuring and managing monetary output devices. During initialization, cash out manager 1625, using data from configuration manager 1621, sets the cash out devices correctly and selects any selectable cash out denominations. During play, a game application may post a cash out event through the event manager 1627 (the same way all events are handled), and using a callback posted by cash out manager 1625, cash out manager 1625 is informed of the event. Cash out manager 1625 updates the credit object, updates its state in non-volatile memory, and sends an appropriate control message to the device manager that corresponds to the dispensing device. As the device dispenses dispensable media, there will typically be event messages being sent back and forth between the device and cash out manager 1625 until the dispensing finishes, after which cash out manager 1625, having updated the credit manager and any other game state (such as some associated with meter manager 1623) that needs to be updated for this set of actions, sends a cash out completion event to event manager 1627 and to the game application thereby. Cash in manager 1624 functions similarly to cash out manager 1625, only controlling, interfacing with, and taking care of actions associated with cashing in events, cash in devices, and associated meters and crediting.

In a further example, in accordance with one or more embodiments, I/O server 1615 may write data to the gaming machine EEPROM memory, which is located in the gaming machine cabinet and holds meter storage that must be kept even in the event of power failure. Game manager 1603 calls the I/O library functions to write data to the EEPROM. The I/O server 1615 receives the request and starts a low priority EEPROM thread 1616 within I/O server 1615 to write the data. This thread uses a sequence of 8 bit command and data writes to the EEPROM device to write the appropriate data in the proper location within the device. Any errors detected will be sent as IPC messages to game manager 1603. All of this processing is asynchronous.

In accordance with one embodiment, button module 1617 within I/O server 1615, polls (or is sent) the state of buttons every two milliseconds. These inputs are debounced by keeping a history of input samples. Certain sequences of samples are required to detect a button was pressed, in which case the I/O server 1615 sends an inter-process communication event to game manager 1603 that a button was pressed or released. In some embodiments, the gaming machine may have intelligent distributed I/O which debounces the buttons, in which case button module 1617 may be able to communicate with the remote intelligent button processor to get the button events and simply relay them to game manager 1603 via IPC messages. In still another embodiment, the I/O library may be used for pay out requests from the game application. For example, hopper module 1618 must start the hopper motor, constantly monitor the coin sensing lines of the hopper, debounce them, and send an IPC message to the game manager 1603 when each coin is paid.

Further details, including disclosure of lower level fault handling and/or processing, are included in U.S. Pat. No. 7,351,151 entitled "Gaming Board Set and Gaming Kemal for Game Cabinets" and provisional U.S. patent application No. 60/313,743, entitled "Form Fitting Upgrade Board Set For Existing Game Cabinets," filed Aug. 20, 2001; said patent and provisional are both fully incorporated herein by explicit reference.

Figure 39A:
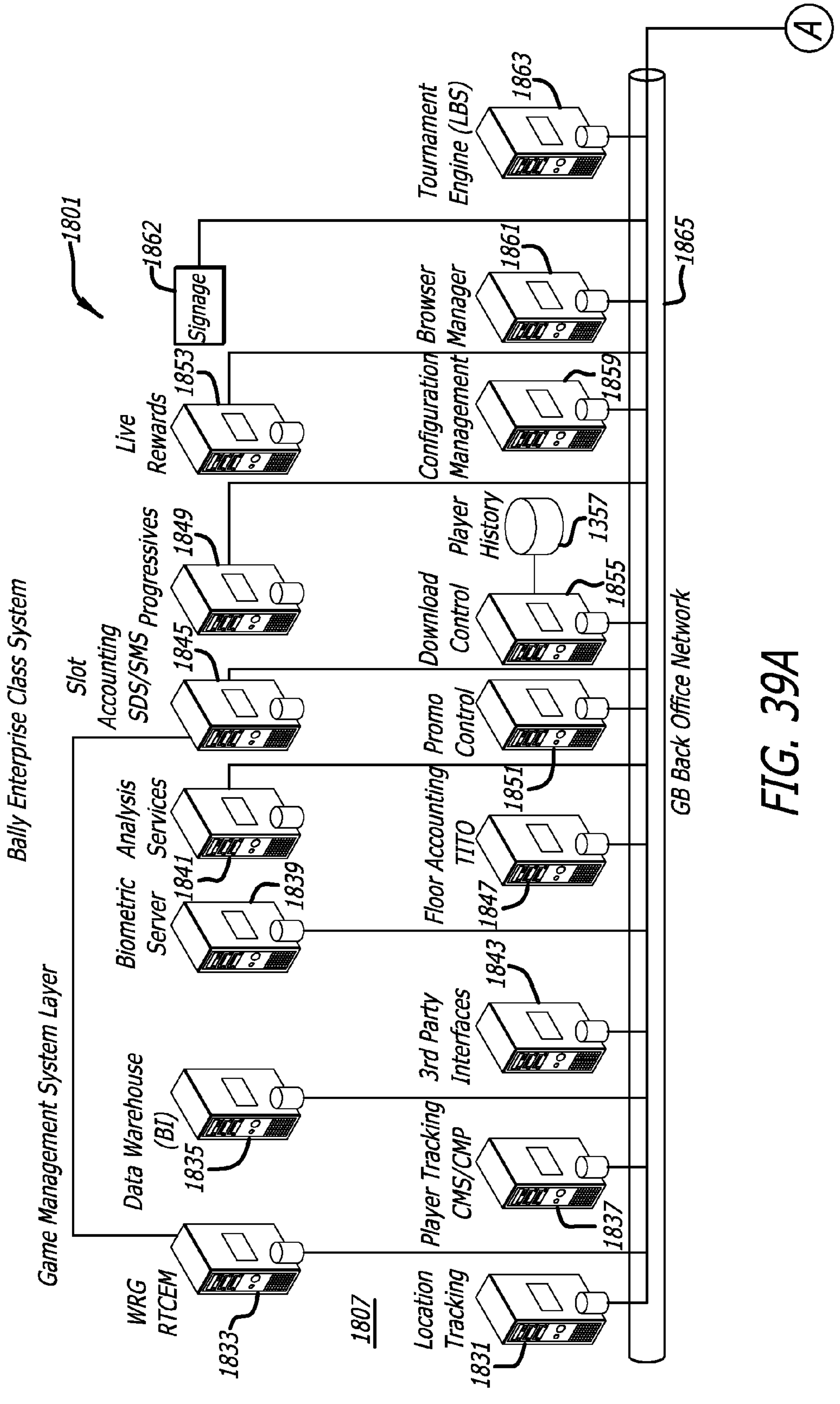
FIGS. 39A-39B are schematic block diagrams showing the hardware elements of a networked gaming system in accordance with one or more embodiments.
Figure 39B:
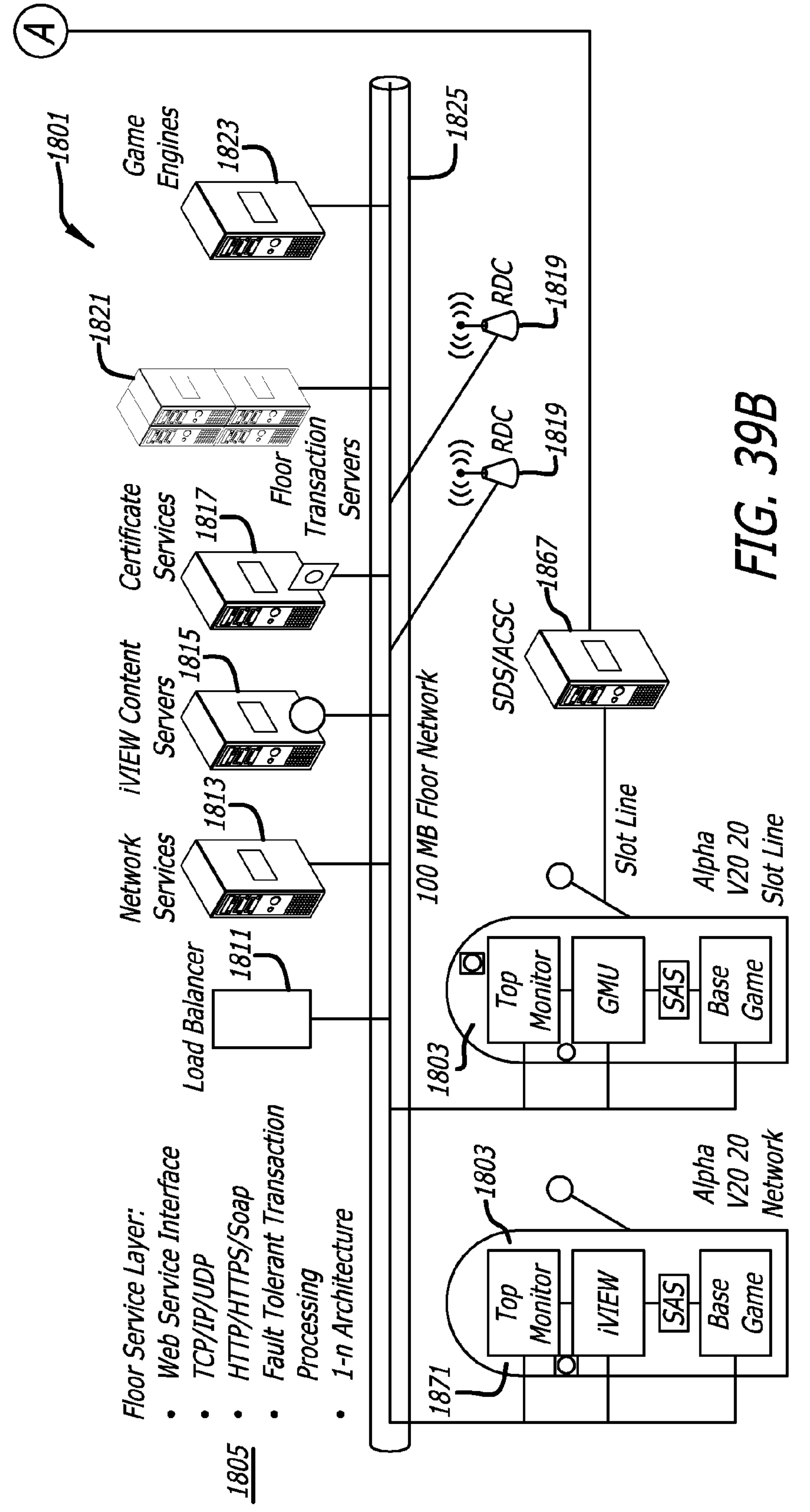

Referring to FIGS. 39A-39B, enterprise gaming system 1801 is shown in accordance with one or more embodiments. Enterprise gaming system 1801 may include one casino or multiple locations and generally includes a network of gaming machines 1803, floor management system (SMS) 1805, and casino management system (CMS) 1807. SMS 1805 may include load balancer 1811, network services servers 1813, player interface (iVIEW) content servers 1815, certificate services server 1817, floor radio dispatch receiver/transmitters (RDC) 1819, floor transaction servers 1821 and game engines 1823, each of which may connect over network bus 1825 to gaming machines 1803. CMS 1807 may include location tracking server 1831, WRG RTCEM server 1833, data warehouse server 1835, player tracking server 1837, biometric server 1839, analysis services server 1841, third party interface server 1843, slot accounting server 1845, floor accounting server 1847, progressives server 1849, promo control server 1851, bonus game (such as Bally Live Rewards) server 1853, download control server 1855, player history database 1857, configuration management server 1859, browser manager 1861, tournament engine server 1863 connecting through bus 1865 to server host 1867 and gaming machines 1803. The various servers and gaming machines 1803 may connect to the network with various conventional network connections (such as, for example, USB, serial, parallel, RS-485, Ethernet). Additional servers which may be incorporated with CMS 1807 include a responsible gaming limit server (not shown), advertisement server (not shown), and a control station server (not shown) where an operator or authorized personnel may select options and input new programming to adjust each of the respective servers and gaming machines 1803. SMS 1805 may also have additional servers including a control station (not shown) through which authorized personnel may select options, modify programming, and obtain reports of the connected servers and devices, and obtain reports. The various CMS and SMS servers are descriptively entitled to reflect the functional executable programming stored thereon and the nature of databases maintained and utilized in performing their respective functions.

Gaming machines 1803 include various peripheral components that may be connected with USB, serial, parallel, RS-485 or Ethernet devices/architectures to the system components within the respective gaming machine. The GMU has a connection to the base game through a serial SAS connection. The system components in the gaming cabinet may be connected to the servers using HTTPs or G2S over Ethernet. Using CMS 1807 and/or SMS 1305 servers and devices, firmware, media, operating systems, and configurations may be downloaded to the system components of respective gaming machines for upgrading or managing floor content and offerings in accordance with operator selections or automatically depending upon CMS 1807 and SMS 1805 master programming. The data and programming updates to gaming machines 1803 are authenticated using conventional techniques prior to install on the system components.

In various embodiments, any of the gaming machines 1803 may be a mechanical reel spinning slot machine, video slot machine, video poker machine, video bingo machine, keno machine, or a gaming machine offering one or more of the above described games including an interactive wheel feature. Alternately, gaming machines 1803 may provide a game with an accumulation-style feature game as one of a set of multiple primary games selected for play by a random number generator, as described above. A gaming system of the type described above also allows a plurality of games in accordance with the various embodiments of the invention to be linked under the control of a group game server (not shown) for cooperative or competitive play in a particular area, carousel, casino or between casinos located in geographically separate areas. For example, one or more examples of group games under control of a group game server are disclosed in U.S. application Ser. No. 11/938,079, entitled "Networked System and Method for Group Gaming," filed on Nov. 9, 2007, which is hereby incorporated by reference in its entirety for all purposes.

It should be noted that the term gaming machine is intended to encompass any type of gaming machine, including handheld devices used as gaming machines such as cellular based devices (e.g. phones), PDAs, or the like. The gaming machine can be represented by any network node that can implement a game and is not limited to cabinet based machines. The system has equal applicability to gaming machines implemented as part of video gaming consoles or handheld or other portable devices. In one embodiment, a geo-location device in the handheld or portable gaming device may be used to locate a specific player for regulatory and other purposes. Geolocation techniques that can be used include by way of example, and not by way of limitation, IP address lookup, GPS, cell phone tower location, cell ID, known Wireless Access Point location, Wi-Fi connection used, phone number, physical wire or port on client device, or by middle tier or backend server accessed. In one embodiment, GPS and biometric devices are built within a player's client device, which in one embodiment, comprises a player's own personal computing device, or provided by the casino as an add-on device using USB, Bluetooth, IRDA, serial or other interface to the hardware to enable jurisdictionally compliant gaming, ensuring the location of play and the identity of the player. In another embodiment, the casino provides an entire personal computing device with these devices built in, such as a tablet type computing device, PDA, cell phone or other type of computing device capable of playing system games.

One of ordinary skill in the art will appreciate that not all gaming machines have all these components and may have other components in addition to, or in lieu of, those components mentioned here. Furthermore, while these components are viewed and described separately, various components may be integrated into a single unit in some embodiments.

The various embodiments described above are provided by way of illustration only and should not be construed to limit the claimed invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed:

1. A gaming machine, comprising:

a plurality of mechanical reels operatively coupled to a stepper motor that spins the reels, wherein each mechanical reel includes a flexible video display affixed to an outer circumference of the mechanical reel and a video encoder converts video data into a format for presentation on the flexible video display;

a main central processing unit for executing instructions for a native mechanical reel game;

a video cut up and multiplexer engine in communication with the main central processing unit, wherein the video cut up and multiplexer engine intercepts native non-video signals from the native mechanical reel game and converts the native non-video signals into video images for multiple reels for presentation on the flexible video displays on the plurality of mechanical reels and wherein the video cut up and multiplexer engine divides the video images for multiple reels into individual reel video images, wherein the video cut up and multiplexer engine transmits the individual reel video images to the flexible video displays on the plurality of mechanical reels for presentation; and a display control system in communication with the flexible video display, wherein the display control system includes a central processing unit for decoding and transmitting processed mechanical reelgame data for display on the flexible video display.

2. The gaming machine of claim 1, further comprising an informational display disposed adjacent to the plurality of mechanical reels.

3. The gaming machine of claim 1, further comprising a network interface associated with each mechanical reel, wherein the network interface is in communication with the video cut up and multiplexer engine and one or more casino management systems.

4. The gaming machine of claim 1, further comprising a touch screen positioned in front of the plurality of mechanical reels.

5. The gaming machine of claim 1, wherein the flexible video display is an organic light emitting diode (OLED) display.

6. The gaming machine of claim 1, wherein the flexible video display is an E-Paper display.

7. A method for presenting an upgraded mechanical reel slots game on a gaming machine, the method comprising:

receiving, by a player input device, player input initiating play of a game on the gaming machine;

sending, by a hardware processing unit, native non-video signals for spinning and illuminating a plurality of mechanical reels to the gaming machine in response to player input initiating game play;

intercepting, by a video cut up and multiplexer engine that is in communication with the hardware processing unit and the plurality of mechanical reels, the native non-video signals;

converting the native non-video signals into video signals for multiple reels;

dividing, by a video cut up and multiplexer engine, the video signals for multiple reels into individual reel video signals;

spinning the mechanical reels of the gaming machine in response to player input initiating game play, the mechanical reels having flexible video displays and video encoders affixed thereto, wherein the video encoders are configured to convert video data into a format for presentation on the flexible video displays; and presenting the individual reel video signals on each of the flexible video displays of the spinning mechanical reels.

8. The method of claim 7, further comprising:

receiving video images from one or more system servers; and presenting the video images for multiple reels received from the one or more system servers on one or more of the flexible video displays affixed to the mechanical reels.

9. The method of claim 8, wherein the video images for multiple reels received from the one or more system servers relate to player tracking data.

10. The method of claim 8, wherein the video images for multiple reels received from the one or more system servers presented on the reels are directed to bonus content.

11. The method of claim 7, wherein intercepting the native non-video signals further comprises dividing the native non-video signal, wherein a first portion of the native non-video signal includes informational data, and wherein a second portion of the native non-video signal includes instructions for spinning the mechanical reels.

12. A method for upgrading a mechanical reel gaming machine, the method comprising:

providing a plurality of mechanical reels within a gaming machine, wherein each of the mechanical reels includes a flexible video display affixed to the outer circumference of the mechanical reel and a video encoder configured to convert video data into a format for presentation on the flexible video display;

intercepting, by a video cut up and multiplexer engine, native non-video signals from a main central processing unit, wherein the native non-video signals include instructions for the mechanical reel gaming machine, wherein the hardware processing unit is in communication;

converting the native non-video signals into video images for multiple reels with the video cut up and multiplexer engine;

dividing, using the video cut up and multiplexer engine, the video images for multiple reels into individual reel video images; and displaying the individual reel video images on each of the flexible video displays of the spinning mechanical reels.

13. The method of claim 12, further comprising decoding and transmitting mechanical reel game data with a display control system, and displaying the mechanical reel game data on the flexible video display using the display control system.

14. The method of claim 12, further comprising sending data from a casino management system to the video cut up and multiplexer engine for display on the flexible video displays.

15. The method of claim 14, wherein the data relates to play tracking data.

16. The method of claim 14, wherein the data relates to bonus content.

17. The method of claim 12, wherein intercepting the native non-video signals further comprises dividing the native non-video signal, wherein a first portion of the native non-video signal includes informational data, and wherein a second portion of the native non-video signal includes instructions for spinning the mechanical reels.

* * * * *